United States Patent [19]

Ohmura et al.

[11] Patent Number: 5,761,531
[45] Date of Patent: Jun. 2, 1998

[54] INPUT/OUTPUT CONTROL APPARATUS AND METHOD FOR TRANSFERING TRACK DATA FROM CACHE MODULE TO CHANNEL UNIT DURING THE STAGING OF THE DATA TRACK FROM DEVICE ADAPTER

[75] Inventors: Hideaki Ohmura; Kazuma Takatsu; Wasako Fueda, all of Kawasaki, Japan

[73] Assignee: Fujitsu Limited, Kanagawa, Japan

[21] Appl. No.: 664,263

[22] Filed: Jun. 7, 1996

[30] Foreign Application Priority Data

Jun. 30, 1995 [JP] Japan ................... 7-165149
Aug. 25, 1995 [JP] Japan ................... 7-217086

[51] Int. Cl.⁶ ........................................... C06F 13/10
[52] U.S. Cl. ..................... 395/841; 711/113; 711/210
[58] Field of Search ........................ 395/403, 445, 395/464, 415, 416, 420, 421.06, 438, 439, 441, 825, 827, 826, 840, 841, 894; 711/113, 112, 121, 130

[56] References Cited

U.S. PATENT DOCUMENTS

| | | | |
|---|---|---|---|
| 4,258,418 | 3/1981 | Heath | 395/873 |
| 5,329,622 | 7/1994 | Belsan et al. | 364/236.2 |
| 5,586,291 | 12/1996 | Lasker et al. | 711/113 |

*Primary Examiner*—Dinh C. Dung
*Attorney, Agent, or Firm*—Helfgott & Karas, P.C.

[57] ABSTRACT

When an input/output request of a channel adapter causes a mishit on a cache and a staging amount by a device adapter reaches a predetermined amount, the cache is set into a hit status and the channel adapter is reactivated. By receiving a hit response, the reactivated channel adapter executes an input and an output for the cache and the staging of the channel adapter in parallel. A defective/alternating track management table which corresponds to track data stored in a cache memory and has each of addresses of a defective track and an alternating track and flag information showing a link state between both of the defective track and the alternating track is provided for an input/output controller. For a retrieving request in which the defective track address is designated, the defective/alternating track management table is retrieved and the corresponding alternating track address is obtained, thereby judging the presence or absence of a registration of a hash table.

19 Claims, 41 Drawing Sheets

| | DEFECTIVE TRACK ADDRESS | ALTERNATING TRACK ADDRESS | FLAG INFORMATION |
|---|---|---|---|
| A00 | | | |
| 01 | | | |
| 02 | | | |
| 03 | | | |
| 04 | | | |
| 05 | | | |

| DEVICE NUMBER | FLAG INFORMATION |
|---|---|
| #00 | VALID |
| #01 | VALID |
| #02 | INVALID |
| #03 | INVALID |
| #04 | INVALID |

FIG. 17A

MODE 1 (LINK DIRECTION : DEFECTIVE TRACK → ALTERNATING TRACK)

| | DEFECTIVE TRACK | ALTERNATING TRACK | FLAG INFORMATION | | |
|---|---|---|---|---|---|
| | | | VALID | INVALID 1 (DEFECTIVE→ ALTERNATING) | INVALID 2 (ALTERNATING →DEFECTIVE) |
| BEFORE UPDATING | A | B | ○ | | |
| AFTER UPDATING | A | D | | ○ | |

FIG. 17B

MODE 2 (LINK DIRECTION : DEFECTIVE TRACK → ALTERNATING TRACK)

| | DEFECTIVE TRACK | ALTERNATING TRACK | FLAG INFORMATION | | |
|---|---|---|---|---|---|
| | | | VALID | INVALID 1 (DEFECTIVE→ ALTERNATING) | INVALID 2 (ALTERNATING →DEFECTIVE) |
| BEFORE UPDATING | A | B | | ○ | |
| AFTER UPDATING | A | D | | ○ | |

FIG. 17C

MODE 3 (LINK DIRECTION : DEFECTIVE TRACK → ALTERNATING TRACK)

| | DEFECTIVE TRACK | ALTERNATING TRACK | FLAG INFORMATION | | |
|---|---|---|---|---|---|
| | | | VALID | INVALID 1 (DEFECTIVE→ ALTERNATING) | INVALID 2 (ALTERNATING →DEFECTIVE) |
| BEFORE UPDATING | A | B | | | ○ |
| AFTER UPDATING | A | D | | ○ | |

FIG. 17D

MODE 6 (LINK DIRECTION : DEFECTIVE TRACK → ALTERNATING TRACK)

| | DEFECTIVE TRACK | ALTERNATING TRACK | FLAG INFORMATION | | |
|---|---|---|---|---|---|
| | | | VALID | INVALID 1 (DEFECTIVE→ ALTERNATING) | INVALID 2 (ALTERNATING →DEFECTIVE) |
| BEFORE UPDATING | A | B | ○ | | |
| AFTER UPDATING | A | B | | ○ | |

FIG. 17E

MODE 7 (LINK DIRECTION : DEFECTIVE TRACK → ALTERNATING TRACK)

| | DEFECTIVE TRACK | ALTERNATING TRACK | FLAG INFORMATION | | |
| --- | --- | --- | --- | --- | --- |
| | | | VALID | INVALID 1 (DEFECTIVE→ ALTERNATING) | INVALID 2 (ALTERNATING →DEFECTIVE) |
| BEFORE UPDATING | A | B | | | ○ |
| AFTER UPDATING | A | B | ○ | | |

FIG. 17F

MODE 9 (LINK DIRECTION : DEFECTIVE TRACK → ALTERNATING TRACK)

| | DEFECTIVE TRACK | ALTERNATING TRACK | FLAG INFORMATION | | |
| --- | --- | --- | --- | --- | --- |
| | | | VALID | INVALID 1 (DEFECTIVE→ ALTERNATING) | INVALID 2 (ALTERNATING →DEFECTIVE) |
| BEFORE UPDATING | A | B | ○ | | |
| AFTER UPDATING | A | D | | | ○ |

FIG. 17G

MODE 10 (LINK DIRECTION : DEFECTIVE TRACK → ALTERNATING TRACK)

| | DEFECTIVE TRACK | ALTERNATING TRACK | FLAG INFORMATION | | |
|---|---|---|---|---|---|
| | | | VALID | INVALID 1 (DEFECTIVE→ ALTERNATING) | INVALID 2 (ALTERNATING →DEFECTIVE) |
| BEFORE UPDATING | A | B | | ○ | |
| AFTER UPDATING | A | D | | | ○ |

FIG. 17H

MODE 11 (LINK DIRECTION : DEFECTIVE TRACK → ALTERNATING TRACK)

| | DEFECTIVE TRACK | ALTERNATING TRACK | FLAG INFORMATION | | |
|---|---|---|---|---|---|
| | | | VALID | INVALID 1 (DEFECTIVE→ ALTERNATING) | INVALID 2 (ALTERNATING →DEFECTIVE) |
| BEFORE UPDATING | A | B | | | ○ |
| AFTER UPDATING | A | D | | | ○ |

FIG. 17I

MODE 14 (LINK DIRECTION : DEFECTIVE TRACK → ALTERNATING TRACK)

| | DEFECTIVE TRACK | ALTERNATING TRACK | FLAG INFORMATION | | |
|---|---|---|---|---|---|
| | | | VALID | INVALID 1 (DEFECTIVE→ ALTERNATING) | INVALID 2 (ALTERNATING →DEFECTIVE) |
| BEFORE UPDATING | A | B | ○ | | |
| AFTER UPDATING | A | B | | | ○ |

FIG. 17J

MODE 16 (LINK DIRECTION : DEFECTIVE TRACK → ALTERNATING TRACK)

| | DEFECTIVE TRACK | ALTERNATING TRACK | FLAG INFORMATION | | |
|---|---|---|---|---|---|
| | | | VALID | INVALID 1 (DEFECTIVE→ ALTERNATING) | INVALID 2 (ALTERNATING →DEFECTIVE) |
| BEFORE UPDATING | A | B | | ○ | |
| AFTER UPDATING | A | B | ○ | | |

FIG. 18A

LINK DIRECTION: DEFECTIVE TRACK → ALTERNATING TRACK

| MODE NO. | DEFECTIVE TRACK COINCIDE | DEFECTIVE TRACK NOT COINCIDE | ALTERNATING TRACK COINCIDE | ALTERNATING TRACK NOT COINCIDE | FLAG INFORMATION BEFORE UPDATING | FLAG INFORMATION AFTER UPDATING | REGISTERED CONTENTS |
|---|---|---|---|---|---|---|---|
| 1 | ○ | | | ○ | VALID | INVALID (DEFECTIVE→ALTERNATING) | CHANGE |
| 2 | ○ | | | ○ | INVALID (DEFECTIVE→ALTERNATING) | INVALID (DEFECTIVE→ALTERNATING) | CHANGE |
| 3 | ○ | | | ○ | INVALID (ALTERNATING→DEFECTIVE) | INVALID (DEFECTIVE→ALTERNATING) | CHANGE |
| 4 | | ○ | | ○ | * | * | NEW REGISTRATION |
| 5 | ○ | | ○ | | * | * | NOT REGISTERED |
| 6 | ○ | | ○ | | VALID | INVALID (DEFECTIVE→ALTERNATING) | CHANGE |
| 7 | ○ | | ○ | | INVALID (DEFECTIVE→ALTERNATING) | INVALID (DEFECTIVE→ALTERNATING) | NOT REGISTERED |
| 8 | ○ | | ○ | | INVALID (ALTERNATING→DEFECTIVE) | VALID | CHANGE |

*: ARBITRARY FLAG STATUS

FIG. 18B

LINK DIRECTION : ALTERNATING TRACK → DEFECTIVE TRACK

| MODE NO. | DEFECTIVE TRACK COINCIDE | DEFECTIVE TRACK NOT COINCIDE | ALTERNATING TRACK COINCIDE | ALTERNATING TRACK NOT COINCIDE | FLAG INFORMATION BEFORE UPDATING | FLAG INFORMATION AFTER UPDATING | REGISTERED CONTENTS |
|---|---|---|---|---|---|---|---|
| 9 | ○ | | | ○ | VALID | INVALID (ALTERNATING →DEFECTIVE) | CHANGE |
| 10 | ○ | | | ○ | INVALID (DEFECTIVE→ ALTERNATING) | INVALID (ALTERNATING →DEFECTIVE) | CHANGE |
| 11 | ○ | | | ○ | INVALID (ALTERNATING →DEFECTIVE) | INVALID (ALTERNATING →DEFECTIVE) | CHANGE |
| 12 | | ○ | | ○ | * | * | NEW REGISTRATION |
| 13 | ○ | | ○ | | * | * | NOT REGISTERED |
| 14 | ○ | | ○ | | VALID | INVALID (ALTERNATING →DEFECTIVE) | CHANGE |
| 15 | ○ | | ○ | | INVALID (DEFECTIVE→ ALTERNATING) | VALID | CHANGE |
| 16 | ○ | | ○ | | INVALID (ALTERNATING →DEFECTIVE) | INVALID (ALTERNATING →DEFECTIVE) | NOT REGISTERED |

* : ARBITRARY FLAG STATUS

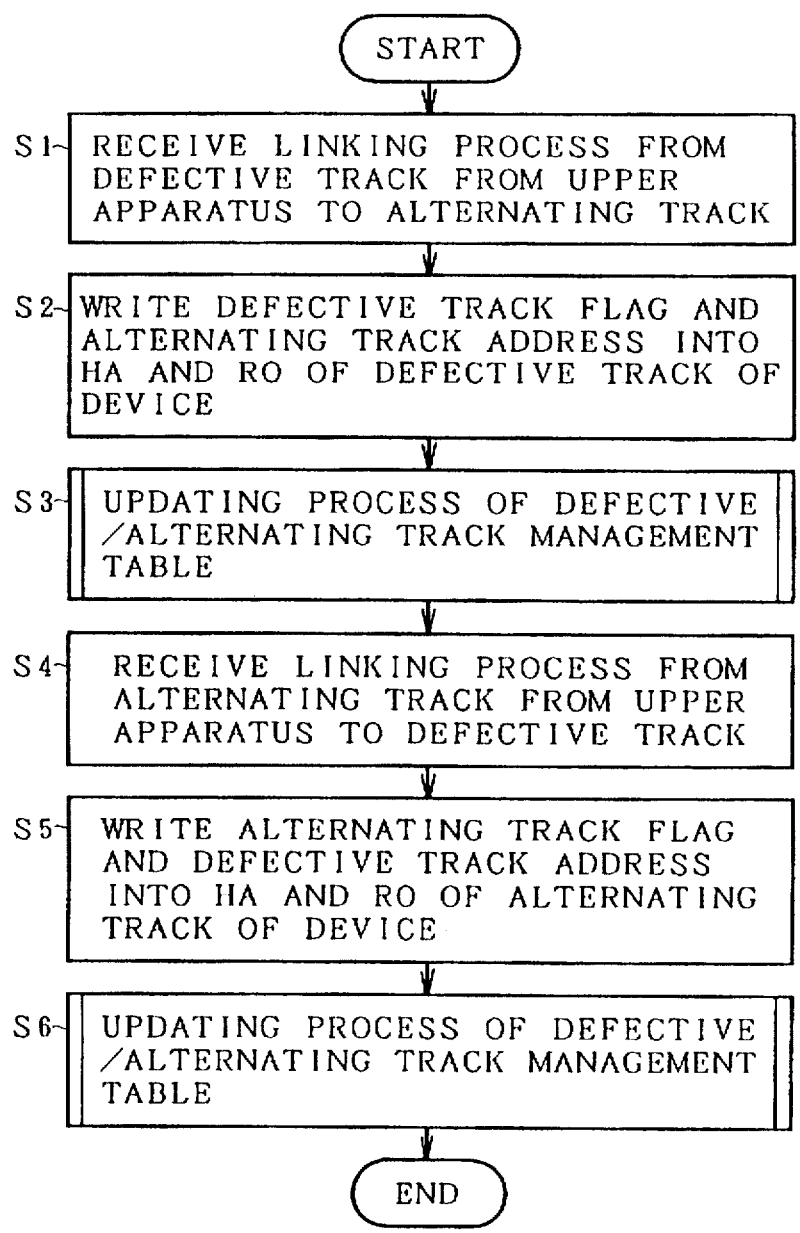

FIG. 27

| DEVICE NUMBER | HASH ADDRESS | CCHD | FLAG | POINTER | JOB IDENTIFIER |
|---|---|---|---|---|---|
| | | | | | |
| | | | | | |
| | | | | | |
| | | | | | |
| | | | | | |

| DEVICE NUMBER | CYLINDER·HEAD VALUE |
|---|---|
| #00 | CCH |
| #01 | CCH |
| #02 | CCH |
| #03 | CCH |
| #04 | CCH |

| HASH ADDRESS | CCHD | FLAG | POINTER | PRECEDING STAGING IDENTIFIER |
|---|---|---|---|---|
| A0 | TRACK TR0 | | | 0 |
| A1 | TRACK TR1 | | | 0 |
| A2 | TRACK TR2 | | | 0 |
| A3 | TRACK TR3 | | | 1 |
| | | | | |

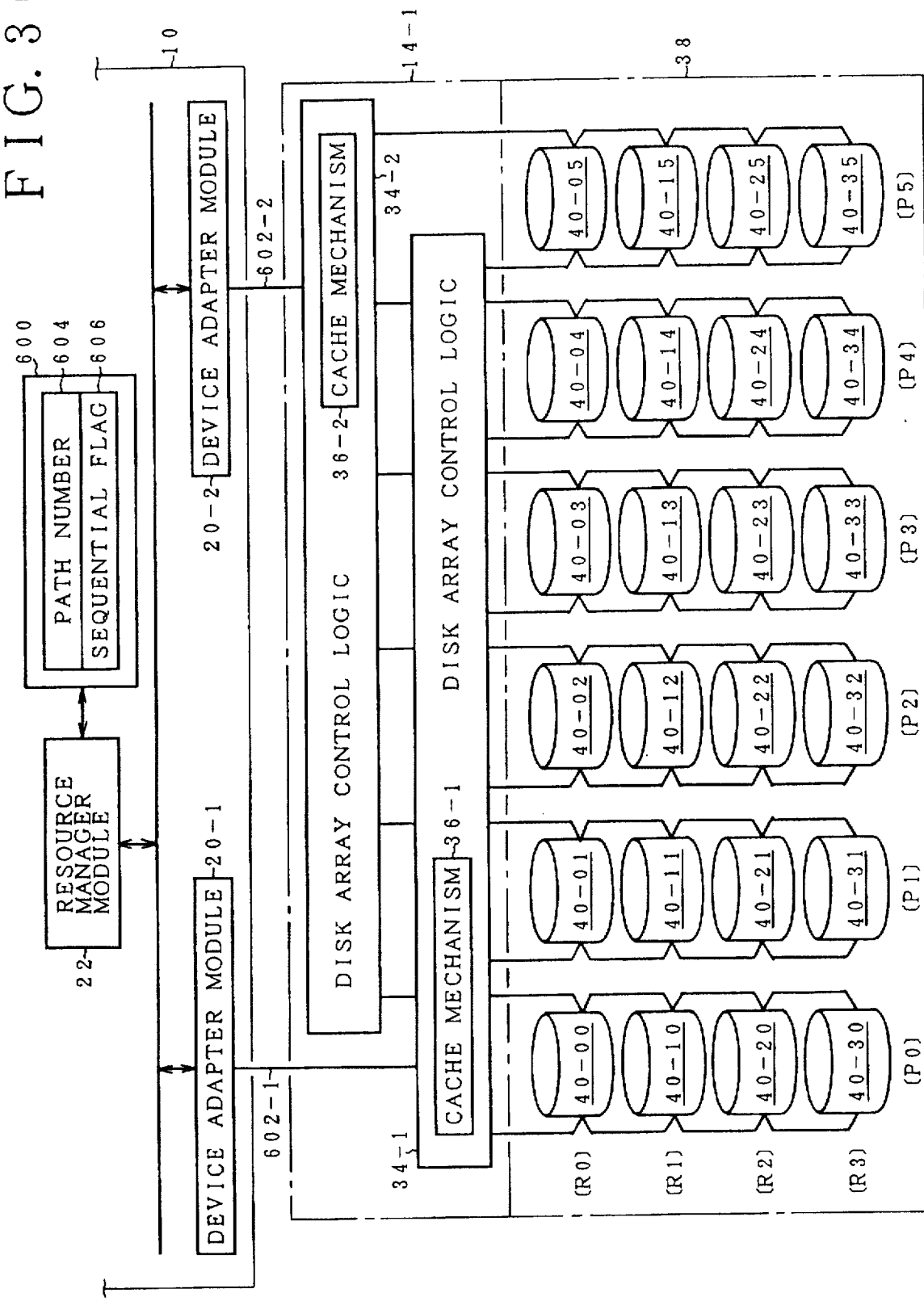

INPUT/OUTPUT CONTROL APPARATUS AND METHOD FOR TRANSFERING TRACK DATA FROM CACHE MODULE TO CHANNEL UNIT DURING THE STAGING OF THE DATA TRACK FROM DEVICE ADAPTER

BACKGROUND OF THE INVENTION

The invention relates to an input/output control apparatus for controlling an input and an output between a channel of a host computer and a device by using a cache mechanism and, more particularly, to an input/output control apparatus in which a channel adapter side and a device adapter side can asynchronously perform an input/output control.

Hitherto, as an input/output control apparatus for asynchronously execute a data transfer between a device and a channel through a cache memory, for example, there is an apparatus as shown in FIG. 1. In FIG. 1, according to a magnetic disk control apparatus 1000, channel adapter modules 1016-1 and 1016-2 are provided for channel units 1018-1 and 1018-2 of a host computer 1012, and device adapter modules 1020-1 and 1020-2 are provided for a device 1014 such as a magnetic disk device or the like. A cache function engine module 1026 and a resource manager module 1022 are provided. The resource manager module 1026 has a job table 1050. The cache function engine module 1026 has a hash table 1058. A memory of each module is constructed by a common memory 1028. In addition to a cache memory 1044, a cache allocation information region 1060 is allocated. The cache allocation information region 1060 becomes a common control information region to which the channel adapter modules 1016-1 and 1016-2 and device adapter modules 1020-1 and 1020-2 refer. Further, each module is connected by a bus, uses the cache memory 1044 on the basis of an internal command, manages data of the device 1014 on a track unit basis, and controls an input and an output.

The writing operation of the conventional apparatus of FIG. 1 will now be described. When an I/O command•write is issued from the channel unit 1018-1, the channel adapter module 1016-1 requests the cache function engine module 1026 to judge a cache status. Namely, a device logic address "CCHD" designated by the I/O command•write is converted into a hash address through a hash function and whether "CCHD" has been registered in the hash address in the hash table 1058 or not is judged. In "CCHD", "CC" denotes a cylinder address, "H" a head address, and "D" a device address. By referring to the hash table 1058, when it is judged that track data designated by the I/O command•write from the channel unit 1018-1 doesn't exist in the cache memory 1044, a writing operation for the device 1014 is executed by a control such that the device adapter module 1020-1 operates by a bypass operation for making the cache inoperative. In a reading operation of the conventional apparatus, an I/O command•read from the channel unit 1018-1 is generated and when no track data exists in the cache memory 1044 and a mishit occurs, a staging is executed from the device 1014 into the cache memory 1044 and, after that, read data is transferred to the channel unit 1018-1.

In such a magnetic disk control apparatus in which the channel adapter module and the device adapter module asynchronously operate as mentioned above, however, when a cache mis occurs on the channel adapter module side for an I/O command, it is always necessary to transmit and receive information to/from the device adapter module. There is, consequently, a problem such that there are many vain processes.

In the conventional input/output control apparatus, when an input/output command is generated from an upper channel apparatus for a defective/alternating track of the device, the same operation as that in case of an ordinary track is executed and only when the track data is actually obtained, it is possible to recognize that such a track is a defective track. Therefore, in case of a hit operation on the cache, when the track data in the cache is once read out and it is recognized that the track is the defective track and the alternating track address is obtained, an operation to again read the alternating track data from the cache memory is needed. Further, when a mishit occurs in the cache, the track data on the device is read. When the defective track is recognized and an alternating track address is obtained, an operation to again read the alternating track data from the device is needed. As mentioned above, unless the track data is read out from the cache memory or device, whether the track is the defective/alternating track or not cannot be known. The processes are complicated and need a long time by an amount corresponding to the necessity of the reading and confirming operations of the defective track data. The existence of the defective/alternating track exerts a large influence on an input/output performance. It is, therefore, demanded to make it possible to perform a caching operation similar to that for the ordinary track even in case of the defective/alternating track. An input/output control apparatus which enables a caching operation in a synonym state in the case where the same hash address as the hash address obtained by transmitting the track address through the hash function is obtained even in a different track address is demanded.

In the conventional input/output control apparatus, further, in the case where a command system of an input/output request of an upper channel unit is a CKD command system, even when requesting the continuous track data, the upper channel unit cannot declare that the input/output request is sequential. On the other hand, in case of a command system such that the upper channel unit can declare that the I/O request is a sequential access, a preceding staging process for staging from the device onto the cache can be performed. Namely, on the basis of the declaration of the sequential access, in the case where the track data exists in the cache memory, the preceding staging process such that the subsequent track data of the number which was declared by the device adapter module is staged from the device onto the cache can be executed. All of a plurality of input/output requests to the channel adapter module can be processed as hit operations at a high speed. In the CKD command system, however, since the sequential access cannot be declared, the continuous preceding staging cannot be performed. The staging is repeated one by one in response to the I/O request and it takes a long processing time. On the other hand, even in the case where the upper channel unit is based on the command system such that the sequential access can be declared, when an excessive preceding staging in which the number of continuous tracks is large is executed, there is a fear such that a busy of a device path is caused and the performance of the whole system deteriorates.

SUMMARY OF THE INVENTION

According to the invention, there are provided input/output control apparatus and method in which by effectively using a point that a channel adapter module and a device adapter module can asynchronously operate, input/output operations of the channel adapter module and device adapter module using a cache memory are set to parallel operations as much as possible, thereby improving a data transfer performance.

(Asynchronous Input/Output Control)

First, the invention relates to an input/output control apparatus which has a channel adapter module connected to a channel unit, a device adapter module connected to a device, and a cache function engine module (cache control module) for managing a cache memory on the basis of a hash table and asynchronously executes an input/output control between the channel unit and the cache memory by the channel adapter module and an input/output control between the cache memory and the device by the device adapter module via a resource manager module. In response to an inquiry from the channel adapter module, when no track data exists in the cache memory, the cache function engine module responds a mishit and, further, newly allocates a storage area of the track data onto the cache memory and stores information in the storage area into an allocation information region only for use by the channel adapter module. In response to an inquiry from the device adapter module, when no track data exists in the cache memory, the cache function engine module responds a mishit and, further, newly allocates a storage area of the track data onto the cache memory and stores the information in the storage area into an allocation information region only for use by the device adapter module. When receiving the mishit response from the cache function engine module, the channel adapter module requests a staging to the device adapter module via the resource manager module and disconnects the channel. When receiving a reactivation request from the device adapter module during the staging, the device adapter module is recoupled with the channel unit and inquires of the cache function engine module. When a hit response and a response indicative of a state during the staging are obtained, the device adapter module executes an input and an output with the channel unit in parallel with the staging of the device adapter module while confirming an amount of staged data with reference to a common control information region of the channel adapter module and the device adapter module. The device adapter module inquires a cache status on the basis of the staging request. When receiving the mishit response from the cache function engine module, the device adapter module requests the device to read the track data and stages into the cache memory. When the data amount in the cache memory reaches a predetermined value by the staging, a reactivation is requested to the channel adapter module via the resource manager module. The device adapter module notifies the end of staging to the cache function engine module, thereby setting the con tents in the hash table corresponding to the track data after completion of the staging into a hit enable status. The channel adapter module notifies the end of the input and output with the channel unit to the cache function engine module, thereby setting link information of an LRU control into the contents of an LRU table corresponding to the track data after completion of the input and output. In this instance, when the other track data in a write hit status is swept out, a writing (write back) of the swept-out data to the device is requested to the device adapter module via the resource manager module.

The channel adapter module, device adapter module, cache function engine module, and resource manager module are connected to a common memory via a bus. The common memory is divided into a basic storage and a cache memory. The channel adapter exclusive-use allocation information region, the device adapter exclusive-use allocation information region, and a CA-DA common control information region are allocated to the basic storage. The cache memory is constructed by a non-volatile memory and a volatile memory. The non-volatile memory is used to store the track data in which a write hit occurred. The volatile memory is used to store the track data in which a read hit occurred.

A data transfer speed between the device adapter module and the device is set to be sufficiently higher than a data transfer speed between the channel unit on the host computer side and the channel adapter module. As such a device, a disk array unit is used. The disk array unit has a plurality of ranks in each of which disk modules connected to a plurality of ports are set to one rank. The disk array unit is connected by two paths through at least two device adapter modules. Further, the disk array unit is constructed by a disk array having a plurality of disk drives and a control module. A cache mechanism is provided for the control module.

The invention provides an input/output control method for asynchronously executes an input/output control between a channel unit and a cache memory by a channel adapter module and an input/output control between the cache memory and a device by a device adapter module via a resource manager module. The input/output control method is executed by the following procedure.

A) In response to an inquiry of a cache status from the channel adapter module based on an input/output request of the channel unit, when no track data exists in the cache memory, the cache function engine module responds a mishit to the channel adapter module and, further, newly allocates a storage area of the track data onto the cache memory and stores information in the storage area into an allocation information region only for use by the channel adapter module.

B) When receiving the mishit response from the cache function engine module, the channel adapter module requests a staging to the device adapter module via the resource manager module and disconnects the channel.

C) When receiving the staging request from the channel adapter module side, the device adapter module inquires of the cache function engine module the cache status.

D) When receiving the inquiry from the device adapter module, in the case where no track data exists in the cache memory, the cache function engine module responds a mishit to the device adapter module and, further, newly allocates the storage area of the track data onto the cache memory and stores allocation information in the storage area into an allocation information region only for use by the device adapter module.

E) When receiving the mishit response from the cache function engine module, the device adapter module requests the device to read the track data and stages to the cache memory and, when a data amount by the staging reaches a predetermined value, the device adapter module requests a reactivation to the channel adapter module via the resource manager module.

F) When receiving the reactivation request from the device adapter module side, the channel adapter module is recoupled with the channel unit and inquires of the cache function engine module the cache status and, when a response indicative of a state during the staging is obtained by a hit response, the channel adapter module executes the input and output with the channel unit in parallel with the staging of the device adapter module while confirming an amount of staged data with reference to a CA-DA common control information region.

According to the input/output control apparatus and method of the invention as mentioned above, since a channel adapter module exclusive-use region and the device adapter module exclusive-use region are provided as a cache allocation information region which is managed by one job table, the channel adapter module and the device adapter module can recognize the allocation state of the cache memory for the job without being mutually interfered and can execute the cache operation in parallel. After completion of the staging of the device adapter module for the cache memory, the hash table is set into the hit enable status. Therefore, when inquiring the cache status, since a hit response is obtained, the channel adapter module which was reactivated can perform the input and output between the channel unit and the cache memory, namely, the cache write or the cache read. Further, since a response indicative of a state during the staging is made simultaneously with the hit response, the channel adapter module confirms that the staging amount of the track data has reached a predetermined amount with reference to the staging state for the CA-DA common control information region and can execute the cache write or cache read in parallel with the staging. Therefore, even if a cache mishit occurs, the input/output control at a high speed can be performed in a state that is almost near the cache hit by the parallel operations of the channel adapter module and the device adapter module.

(Input/Output Control of Defective/Alternating Track)

According to the invention, an input/output control apparatus which enables the caching operation that is almost equivalent to that of the ordinary track even in case of the defective/alternating track is provided. Namely, the invention is characterized in that with respect to the input/output control apparatus, a defective/alternating track management table corresponding to the track data stored in the cache memory and having each address of a defective track and an alternating track and flag information indicative of a link state between those tracks is provided for the cache function engine module (cache control module), and in response to a retrieval request in which the defective track address is designated, the corresponding alternating track address is obtained by retrieving the defective/alternating track management table, thereby judging the presence or absence of the registration of the hash table. Since the input/output control apparatus has such a defective/alternating track management table, the defective track can be immediately recognized and the address of the alternating track in the cache can be obtained by the retrieval of the defective/alternating track management table by the track address designated by the input/output request, and it is possible to immediately access to the alternating track data without needing a process for reading the defective track data from the cache memory. This point shall also similarly apply to the case where no alternating track data exists in the cache memory and the alternating track data can be immediately staged without needing a process for staging the defective track data from the device into the cache memory. Therefore, even in the defective track, by merely adding the retrieval of the defective/alternating track management table, processes which are almost similar to those of the ordinary track can be performed. Even if the defective track exists, the input/output performance is not largely influenced.

Any one of the following three flag statuses has been registered as flag information in the defective/alternating track management table: namely, a valid status in which a link relation between the defective track on the device and alternating track has been mutually registered; a first invalid status in which a link relation from the defective track on the device to the alternating track has been registered; and a second invalid status in which a link relation from the alternating track on the device to the defective track has been registered. When a defective flag and the alternating track address are written into the defective track on the device on the basis of a request of the channel unit, the cache function engine module updates the defective track address, alternating track address, and flag information for making the link state from the defective track to the alternating track valid into the defective/alternating track management table. A table registering process for making a link from the defective track to the alternating track is executed as follows. Namely, when receiving a notification in association with the registration of the link state from the defective track of the device to the alternating track, the cache function engine module executes the following processes of A) to C).

A) In the case where the present defective track address and the notified defective track address are the same and the present alternating track address doesn't coincide with the notified alternating track address, the present alternating track address is changed to the notified alternating track address and any one of the following flag information is registered.

I. When the present flag information indicates the valid status, it is changed to the first invalid status in which only the link from the defective track to the alternating track is made valid.

II. When the present flag information indicates the first invalid status in which only the link from the defective track to the alternating track is made valid, the flag status is maintained.

III. When the present flag information indicates the second invalid status in which only the link from the alternating track to the defective track is made valid, it is changed to the first invalid status in which only the link from the defective track to the alternating track is made valid.

B) In the case where both of the present defective track address and alternating track address don't coincide with the notified defective track address and alternating track address, each of the track addresses and the flag status are newly registered.

C) In the case where both of the present defective track address and the alternating track address coincide with the notified defective track address and alternating track address, any one of the following flag information is registered without changing each of the track addresses.

I. When the present flag status and the notified flag status are the same, the flag status is maintained.

II. When the present flag information indicates the second invalid status in which only the link from the alternating track to the defective track is made valid, it is changed to the valid status.

On the other hand, when the alternating flag and the defective track address are written into the alternating track on the device on the basis of a request of the channel unit, the cache function engine module updates the defective track address, alternating track address, and flag information for making the link state from the alternating track to the defective track valid into the defective/alternating track management table. A table registering process for making a link from the alternating track to the defective track is as follows. Namely, when receiving a notification in association with the registration of the link state from the alternating track of the device to the defective track, the cache function engine module executes the following processes of A) to C).

A) In the case where the present defective track address and the notified defective track address are the same and the present alternating track address doesn't coincide with the notified alternating track address, the present alternating track address is changed to the notified alternating track address and any one of the following flag information is registered.

I. When the present flag information indicates the valid status, it is changed to the second invalid status in which only the link from the alternating track to the defective track is made valid.

II. When the present flag information indicates the first invalid state in which only the link from the defective track to the alternating track is made valid, it is changed to the second invalid status in which only the link from the alternating track to the defective track is made valid.

III. When the present flag information indicates the second invalid status in which only the link from the alternating track to the defective track is made valid, the flag status is maintained.

B) In the case where both of the present defective track address and the alternating track address don't coincide with the notified defective track address and alternating track address, each of the track addresses and the flag status are newly registered.

C) In the case where both of the present defective track address and the alternating track address coincide with the notified defective track address and alternating track address, any one of the following flag information is registered without changing each of the track addresses.

I. When the present flag status and the notified flag status are the same, the flag status is maintained.

II. When the present flag information indicates the first invalid status in which only the link from the defective track to the alternating track is made valid, it is changed to the valid status.

Upon leading of the apparatus, the device adapter module retrieves the defective track from the alternating tracks of all of the devices and confirms the link states between both of them and notifies the result of the confirmation to the cache function engine module, thereby forming the defective/alternating track management table. In this case, the device adapter module further forms a device status management table in which flag information indicating whether the defective/alternating track management table is valid or invalid has been registered every device. In response to an input/output request from an upper apparatus, first, whether the defective/alternating track management table is valid or invalid is judged with reference to the device status management table. Only when it is valid, the caching operation by the retrieval of the defective/alternating track management table is executed.

When receiving a judging request of the track address designated by an input/output request from the channel adapter module, the cache function engine module retrieves the defective/alternating track management table. When the flag information indicates the valid status or when the second invalid status in which only the link from the alternating track to the defective track is made valid is obtained, the cache function engine module retrieves the hash table by the alternating track address. When the registration of the track data is recognized by the retrieval of the hash table, the hit status is notified to the channel adapter module, thereby allowing the inputting/outputting process for the cache memory to be executed.

(Synonym Control)

According to the invention, an input/output control apparatus which enables the caching operation even in a synonym state of the hash table is provided.

For the synonym control, the cache function engine module is provided with a spare hash table every device other than the hash table. When a synonym state of the hash table occurs by the hash function which arithmetically operated on the basis of the designated track address of the input/output request, the allocating registration of the cache memory is performed by using the spare hash table, thereby enabling the caching operation to be performed. The cache registration of the spare hash table is deleted when the process of the input/output request is finished. In this case, an identifier of a job is provided for the spare hash table and the registration of the spare hash table of the job identifier corresponding to the end of the job is deleted. When the channel adapter module rewrites the track data in which the cache allocation was performed to the non-volatile memory of the cache memory on the basis of the registration of the spare hash table, a write through control such that the device adapter module is activated and the track data after the rewriting is written from the cache memory in-to the device is executed. Thus, even if the registration of the spare hash table is deleted, a coherence between the cache memory and the device is maintained. Further, in the case where the previous cache registration exists at the time of the registration of the spare hash table, since it is the unnecessary registration due to a preceding processing error, the cache function engine module deletes the previous cache registration and, after that, executes the present cache registration.

(Preceding Staging)

Further, according to the invention, there is provided an input/output control apparatus such that even in a command system in which the upper apparatus doesn't declare the sequential access, a sequential performance is detected and a preceding staging is enabled and, further, an excessive preceding staging is suppressed and a performance of the apparatus is improved.

For this purpose, the invention is characterized in that when the device adapter module of the input/output control apparatus receives a staging request in which a track address value (cylinder head value CCH) of the device is designated, in the case where a continuity of the track address value is discriminated in comparison with the track address value designated by the preceding staging request, after completion of the staging of the track data which was requested at present, the device adapter module executes a preceding staging process for staging a predetermined number (N) of track data into the cache memory. The resource manager module has a device operation table into which the staged track address value is stored on a device unit basis each time the staging process is executed by the device adapter module. The device adapter module discriminates a continuity of the track address value with reference to the track address value in the device operation table. In the updating of the device operation table, in the case where the track data requested by the upper channel unit exists in the cache memory, when the channel adapter module finishes the transfer of the cache data, the track address value in the device operation table is updated. When the track data requested by the upper apparatus doesn't exist in the cache memory, after the device adapter module finished the staging, the track address value in the device operation table is updated. When receiving a staging end notification of the Nth track data from the device adapter module, the cache function engine module registers a preceding staging identifier indicating that the Mth track data is the cache data transferred by the preceding staging into the hash table. When receiving a registration notification of the preceding staging identifier in the hash table by the judging request to the cache control module in response to the input/output request of the upper apparatus, the channel adapter module requests the channel adapter module to perform the preceding staging via the resource manager module.

According to the preceding staging control of the invention, even in case of an input/output request of the CKD command system such that the sequential access cannot be declared, the track address values of the preceding and present staging operations are compared and, when the present value is larger than the preceding value by +1, namely, in case of the continuous track addresses, it is judged that the access is the sequential access The continuous preceding staging is enabled and the processing time can be reduced under a condition such that no track data exists in the cache memory. The number of track data which is transferred by the activation of one preceding staging is limited to a predetermined number, for example, M=3 tracks, so that the number of times of staging of the unnecessary tracks can be minimized, thereby suppressing that the excessive preceding staging is performed and the device path becomes busy. Further, the identifier of the preceding staging is registered into the hash table area of the track data which was subjected to the preceding staging at the Mth time. When this identifier is discriminated by a cache judging request of the channel adapter module, an activation of the preceding staging process is requested to the channel adapter module, thereby allowing the preceding staging of the next (M) track data to be executed. Therefore, even if the number of continuous input/output requests exceeds the number (M) of tracks of one preceding staging, it is possible to properly cope with such a situation.

The above and other objects, features, and advantages of the present invention will become more apparent from the following detailed description with reference to the drawings.

BRIEF DESCRIPTION OF THE DRAWINGS

FIG. 15 is an explanatory diagram of a defective/alternating track management table in FIG. 14;

FIG. 16 is an explanatory diagram of a device status management table in FIG. 14;

FIGS. 17A to 17J are explanatory diagrams of an updating process of the defective/alternating track management table;

FIGS. 18A and 18B are explanatory diagrams of modes of the updating process of the defective/alternating track management table in FIGS. 17A to 17J;

FIG. 19 is a flowchart for a process for linking a defective track and an alternating track by an instruction of an upper apparatus;

FIG. 27 is an explanatory diagram of the spare hash table in FIG. 26;

FIG. 31 is an explanatory diagram of a device operation table in FIG. 30;

FIG. 32 is an explanatory diagram of a preceding staging identifier added to the hash table in FIG. 30;

FIG. 36 is a block diagram for a selection of a device path to efficiently use a cache mechanism on the device side.

DETAILED DESCRIPTION OF THE PREFERRED EMBODIMENT

[Operation environment]

Figure 1:
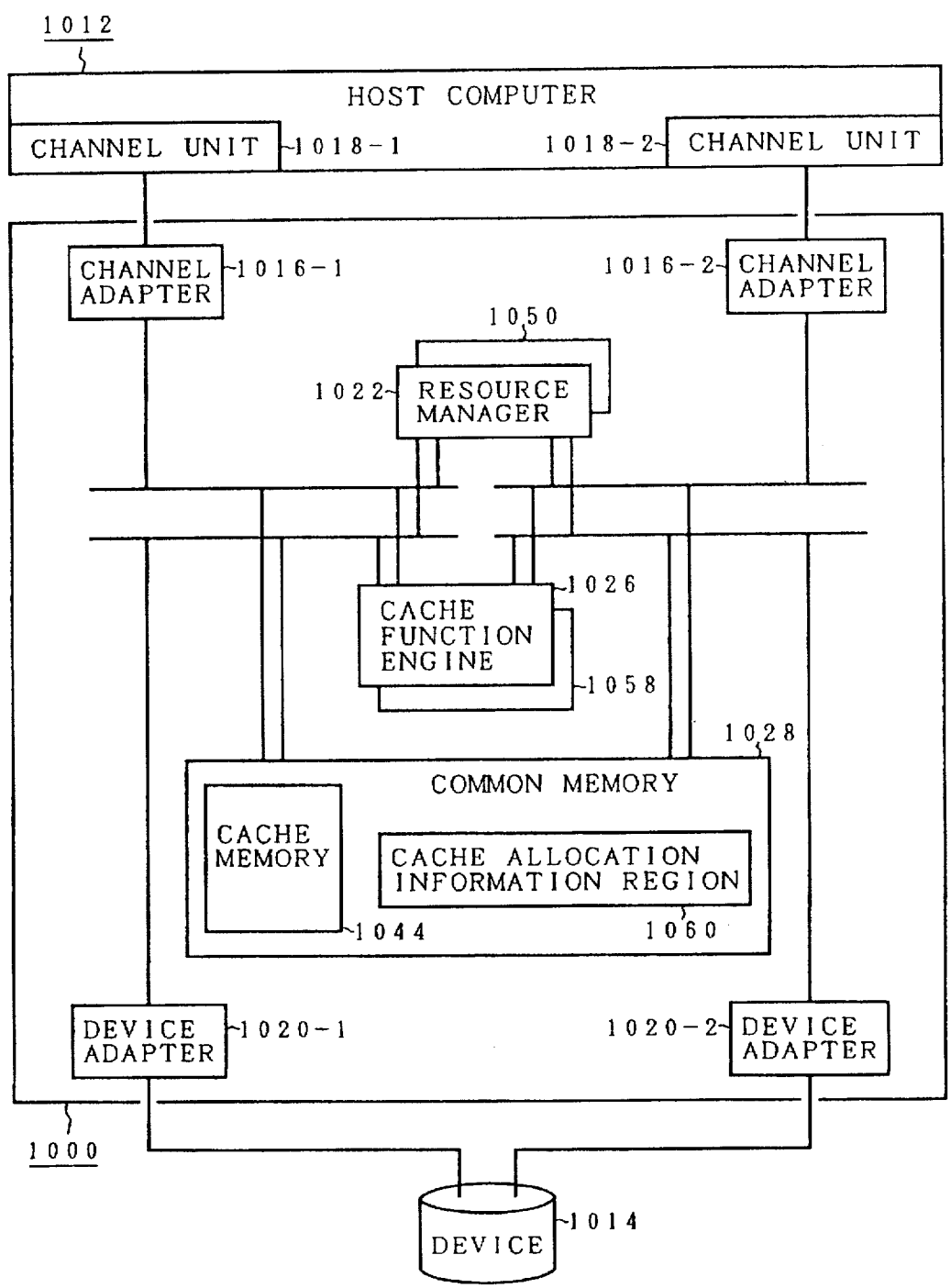
FIG. 1 is a block diagram of a conventional apparatus.
Figure 2:
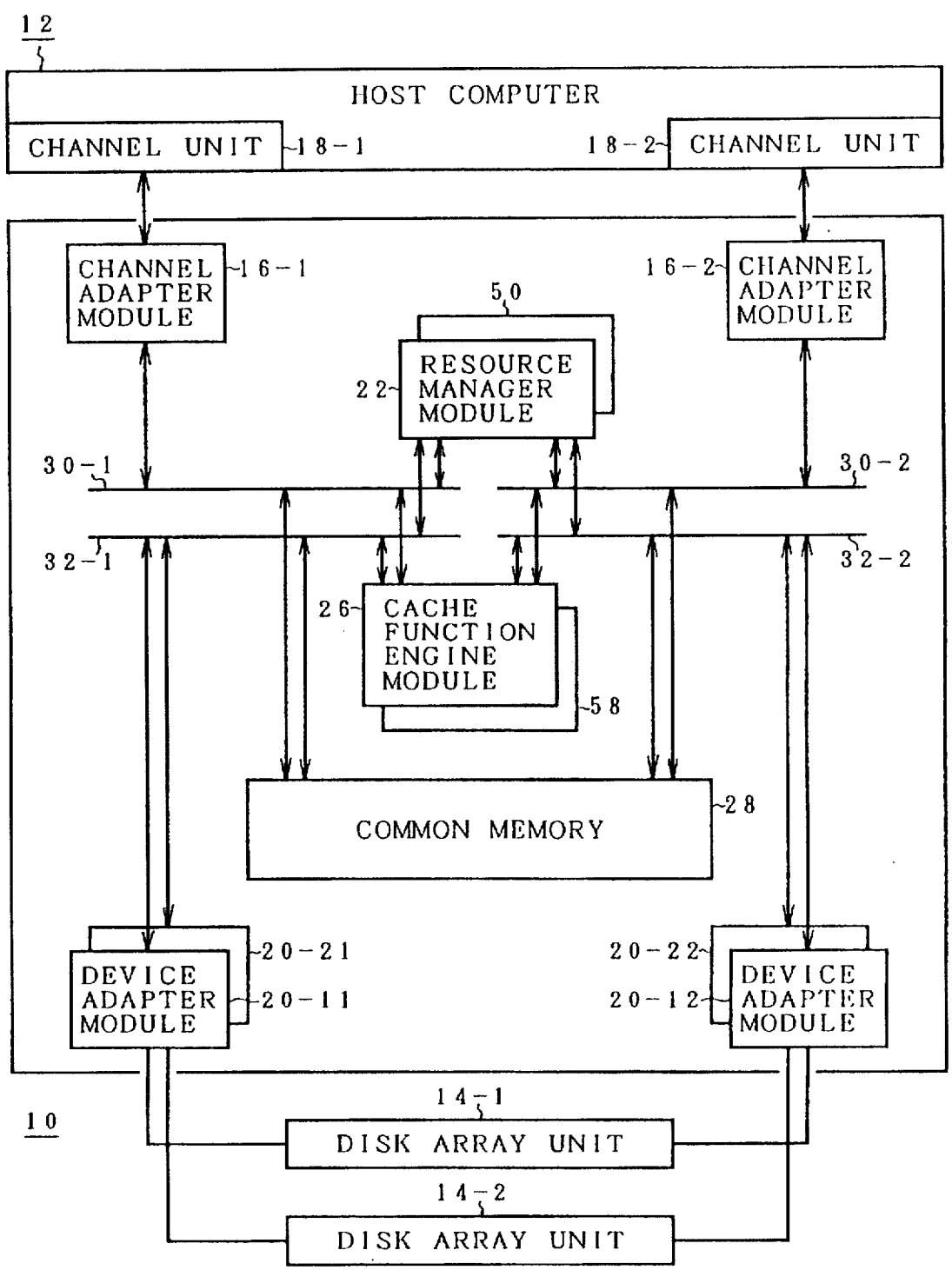
FIG. 2 is a block diagram of an operation environment of the invention.

FIG. 2 is a block diagram of a hardware construction serving as an operation environment of an input/output control apparatus of the invention and shows an example of a disk controller as an input/output control apparatus. In FIG. 2, channel adapter modules 16-1 and 16-2 are provided for a disk controller 10 and are connected to channel units 18-1 and 18-2 of a host computer 12 through a channel path.

respectively. As devices which are controlled by the disk controller 10, in the embodiment, disk array units 14-1 and 14-2 are connected. Device adapter modules 20-11 and 20-12 are provided for the disk array unit 14-1 and are connected through two device paths. Similarly, device adapter modules 20-21 and 20-22 are provided for the disk array unit 14-2 and are connected through two device paths. A resource manager module 22, a cache function engine module (cache control module) 26, and a common memory 28 are provided between the channel adapters 16-1 and 16-2 and the device adapters 20-11, 20-12, 20-21, and 20-22. The resource manager module 22 has a job table 50. The cache function engine module 26 has a hash table 58 and an LRU table (not shown). The modules provided for the disk controller 10 are mutually connected through internal buses 30-1, 30-2, 32-1, and 32-2, respectively, and execute input/output controls between the channel units 18-1 and 18-2 of the host computer 12 and the disk array units 14-1 and 14-2 by using a cache memory built in the common memory 28 on the basis of transmission and reception of internal commands.

Figure 3:
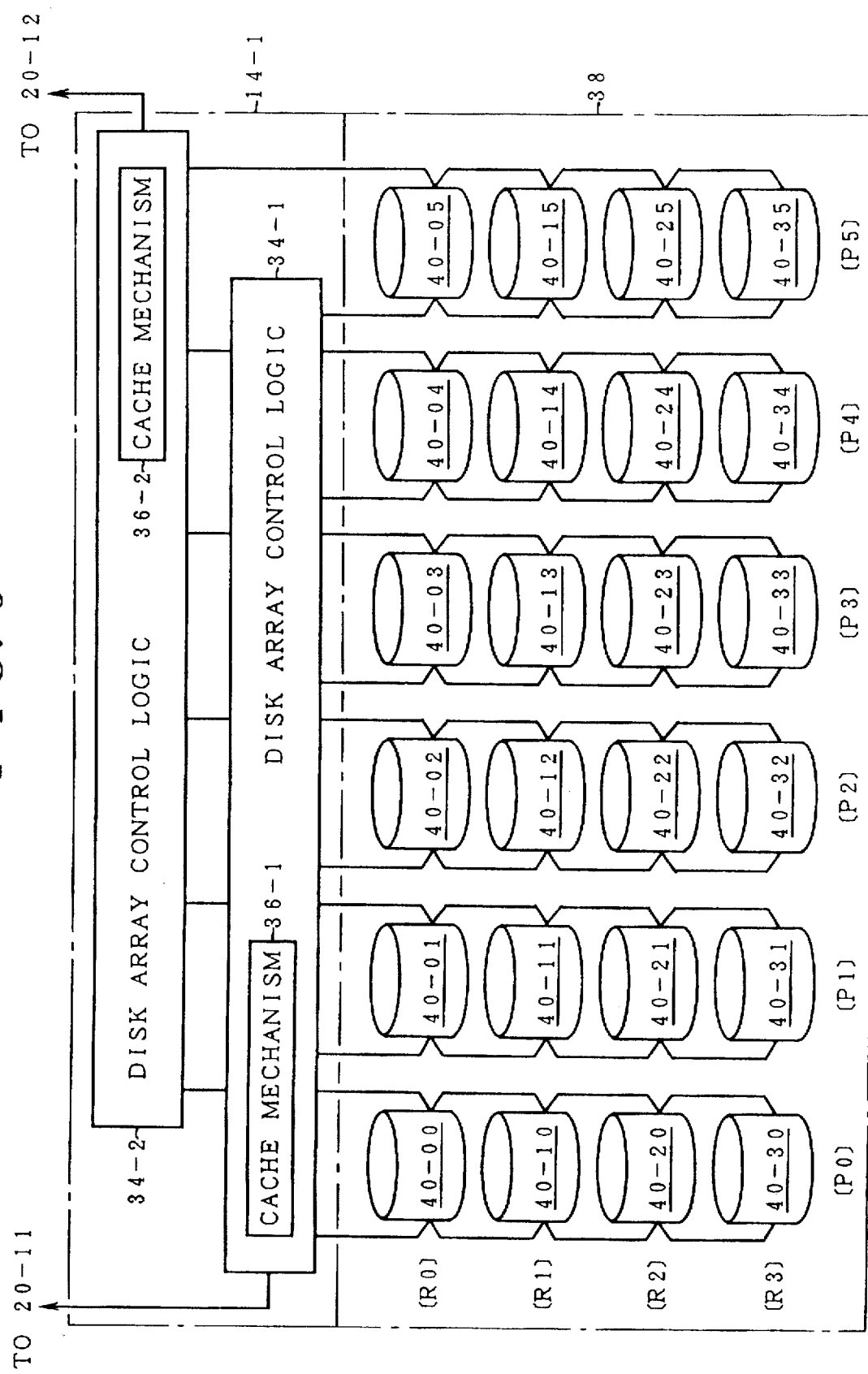
FIG. 3 is an explanatory diagram of a disk array unit in FIG. 2.

FIG. 3 shows an embodiment of the disk array unit 14-1 in FIG. 2. The disk array unit 14-1 has disk array control logics 34-1 and 34-2. The disk array control logics 34-1 and 34-2 have cache mechanisms 36-1 and 36-2, respectively. A disk array 38 is provided under the domination of the disk array control logics 34-1 and 34-2. The disk array 38 has a construction of four ranks such as ranks R0 to R3. Six disk drives are provided for each rank. For example, disk drives 40-00 to 40-05 are provided for the rank R0. The five disk drives 40-00 to 40-05 are connected to ports P0 to P5 from the disk array control logics 34-1 and 34-2 by two paths. With respect to the other remaining ranks R1, R2, and R3, six disk drives 40-10 to 40-15, 40-20 to 40-25, or 40-30 to 40-35 are similarly provided for each rank. Among the disk drives 40-00 to 40-35, with regard to any one of the ranks R0 to R3, the five disk drives of the ports P0 to P4 are used as a disk array of, for example, RAID3 or RAID5 and the disk drives 40-05, 40-15, 40-25, and 40-35 provided for the port P5 become spare disk drives. The disk array 38 with a construction of 4 ranks and 6 ports is called one cluster. In the disk array of FIG. 2, two clusters are constructed by the disk array units 14-1 and 14-2. The number of cluster constructions of the disk array units can be set to a proper number as necessary. It is sufficient to provide the disk adapter modules corresponding to two paths every cluster for the disk controller 10 side. As such a disk array unit 14-1 in FIG. 3, for example, a disk array apparatus of F6493 made by Fujitsu Ltd. can be used.

Figure 4:
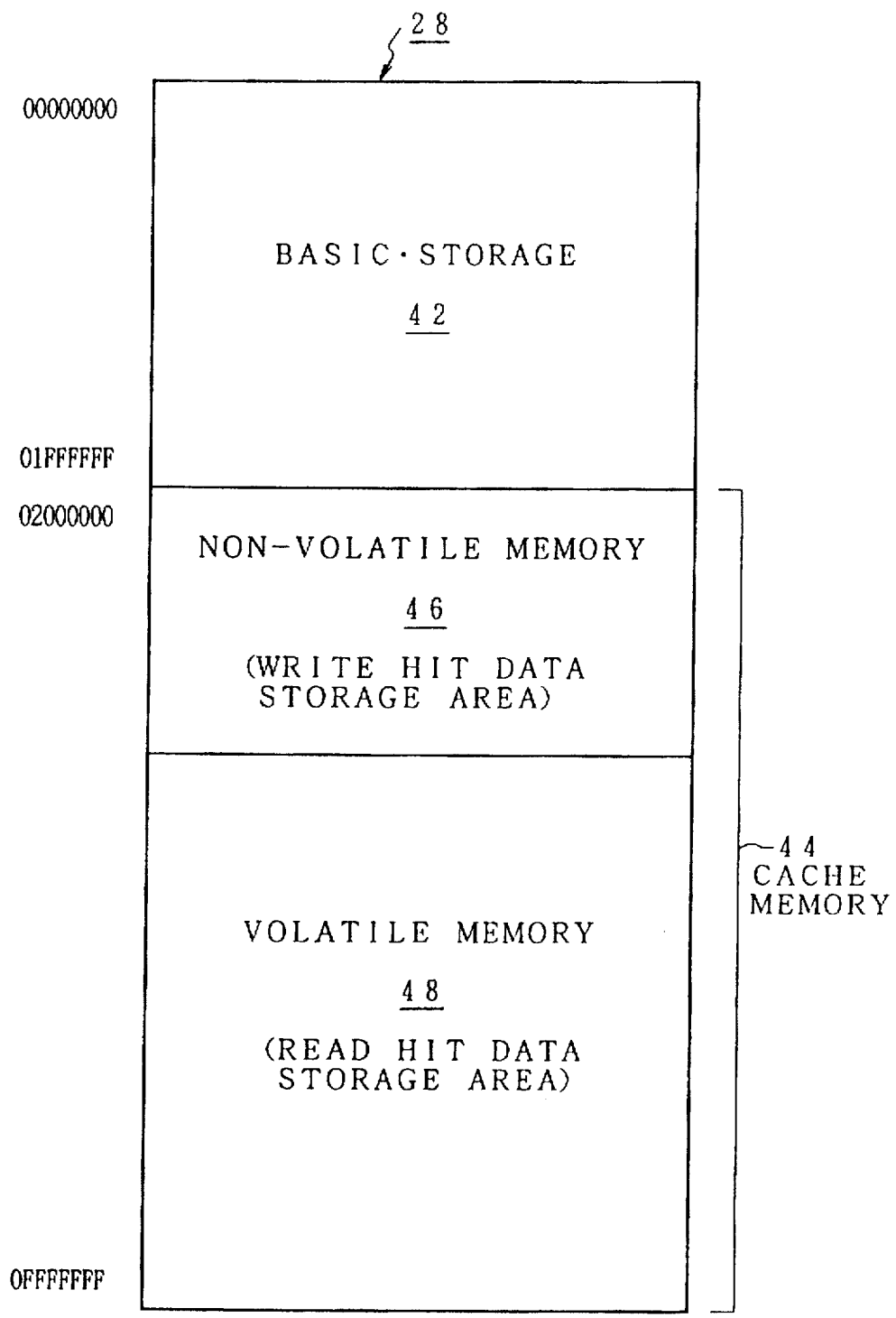
FIG. 4 is an explanatory diagram of a memory map of a common memory in FIG. 2.

FIG. 4 is an explanatory diagram of a memory map of the common memory 28 provided for the disk controller 10 in FIG. 2. The common memory 28 is constructed by a basic storage 42 and a cache memory 44. The common memory 28 has a 32-bit address space. "00000000" to "01FFFFFF" are allocated to the basic storage 42 and remaining memory areas are used as an address space of the cache memory 44. The cache memory 44 is constructed by a non-volatile memory 46 and a volatile memory 48. An area of the non-volatile memory 46 is set to, for example, ⅓ of that of the cache memory 44. The non-volatile memory 46 is used as a storage area of write hit data. Therefore, even if a power source of the apparatus is shut off in a state in which the updating of the track data by the cache write is performed in the cache memory 44 and the updated data is not written back to the disk array unit side, the updated track data is preserved in the non-volatile memory 46. Even after the power source was turned on, the updated track data effectively remains and the rewritten data can be guaranteed. The volatile memory 48 is used as a storage area of read hit data. Namely, in the case where the track data is staged from the disk array unit as a device side by the reading operation by an I/O command from the channel unit of the host computer, it is staged into the volatile memory 48. In the case where the track data stored in the volatile memory 48 becomes a target to be rewritten by the writing operation by the I/O command from the channel unit, the cache block is allocated to the non-volatile memory 46 and the memory transfer is performed and, after that, the data is rewritten. It is also obviously possible to construct such that after the track data was rewritten in the area of the volatile memory 48, it is transferred to the area in the non-volatile memory.

Figure 5:
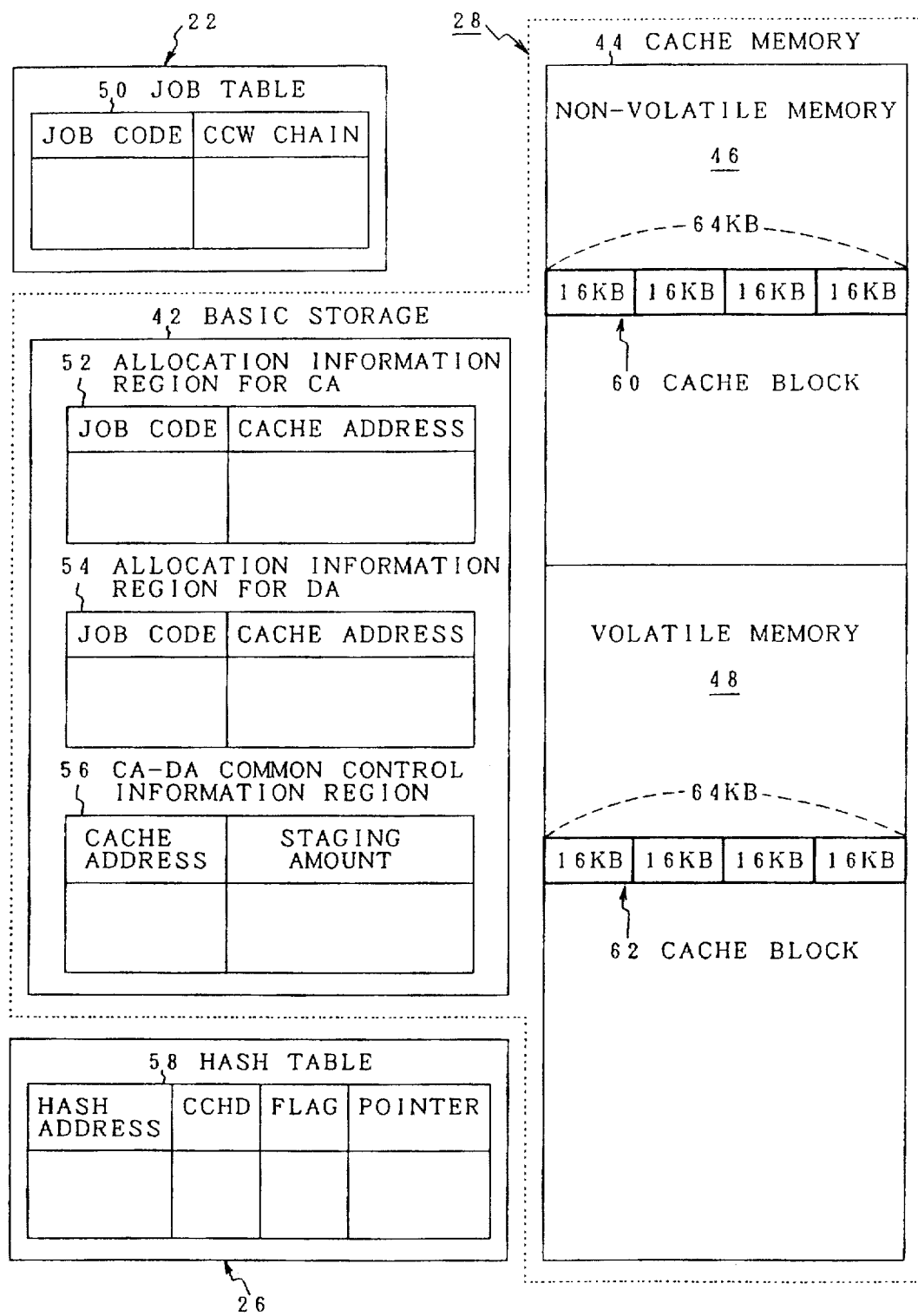
FIG. 5 is an explanatory diagram of a basic storage and a cache memory in FIG. 2.

FIG. 5 is an explanatory diagram of storage contents in the basic storage 42 in the common memory 28 and cache blocks in the non-volatile memory 46 and volatile memory 48 in the cache memory 44. FIG. 5 also shows a job table 50 of the resource manager module 22 and the hash table 58 of the cache function engine module 26. When an I/O command is generated from the channel unit 18-1 or 18-2 of the host computer 12, a job code is registered into the job table 50 which is managed by the resource manager module 22. Ordinarily, one I/O command is constructed by a series of CCW chain (channel command word chain). A corresponding relation of the CCW chain corresponding to the job code is registered into the job table 50. Therefore, the I/O command included in one CCW chain is managed as one job code by the job table 50. The cache block to store the track data in the cache memory 44 is allocated to one job code. In correspondence to the job table 50, an allocation information region 52 for CA in which the cache memory allocation information only for use by the channel adapter modules 16-1 and 16-2 has been stored is provided for the basic storage 42. A cache address of the cache block allocated in correspondence to the job code which is designated by the job table 50 is registered into the allocation information region 52 for CA. Therefore, when the I/O command is received from the channel unit 18-1 or 18-2, the job code is recognized with reference to the job table 50 and the allocation information region 52 for CA is referred to by the job code, so that the cache address indicative of the position of the cache block allocated to the job code, namely, an allocation state of the cache memory 44 can be known. In correspondence to the job table 50, an allocation information region 54 for DA in which the allocation information of the cache memory 44 only for use by the device adapter modules 20-11 to 20-22 has been stored is provided for the basic storage 42. An address in the cache memory 44 of the cache block allocated in correspondence to the job code of the job table 50 is also registered into the allocation information region 54 for DA. Further, a CA-DA common control information region 56 in which control information which can be commonly referred to by the channel adapter modules 16-1 and 16-2 and device adapter modules 20-11 to 20-22 is provided for the basic storage 42. For example, an amount of data of the staging by the reading operation of the disk array unit for the cache block of the cache address which was allocated is registered into the CA-DA common control information region 56. Therefore, the channel adapter modules 16-1 and 16-2 and device adapter modules 20-11 to 20-22 can recognize the input/output state of the cache memory 44 which individually operates by referring to the CA-DA common control information region 56, respectively.

In the hash table 58 which is managed by the cache function engine module 26, an address indicative of the track data as a target for caching, namely, a track address is defined by "CCHD" when it is assumed that, for example, a cylinder address in the case where the disk array units 14-1 and 14-2 are seen as logic devices from the host computer 12 side is set to "CC" and a head address is set to "H" and a device number is set to "D". The cache function engine module 26 obtains a hash address by transmitting the track address "CCHD" through a hash function and discriminates whether the obtained hash address exists in the hash table 58 or not. At the time of a mishit in which no hash address exists in the hash table 58, the region of the obtained hash address is assured and the track address "CCHD" is registered there. At the same time, in case of the write command, a cache block 60 is allocated to the non-volatile memory 46 in the cache memory 44 and, in case of a read command, a cache block 62 is allocated to the volatile memory 48. As for the allocation information of the cache block 60 or 62, for example, in case of a judging request of the cache status from the channel adapter module side, the cache address of the allocated cache block is registered into the allocation information region 52 for CA. On the other hand, in case of a judging request of the cache status from the device adapter module side, the cache address of the allocated cache block is registered into the allocation information region 54 for DA. Further, a region to register a flag and a pointer is provided in the region of the hash address in the hash table 58. A flag is set into the flag region when the cache block allocated by the hash address effectively exists in the cache memory 44 and is in a cache hit enable status. Since the track data which is managed by the hash address has been LRU controlled in accordance with the LRU table (not shown), pointer information to link to the LRU table in the LRU control is stored into the pointer region. Specifically speaking, pointer information for the LRU table is registered in a manner such that the hash address which was last referred is set to the head position of the link of the LRU control. When there is no vacancy in the hash table 58 at the time of setting of the pointer information of the LRU control, the old cache block which is attached to the end of the LRU table and was not referred for the longest period of time is swept out. When the cache block is swept out, if the swept cache block is a write block in the non-volatile memory 46, since the data differs from the track data on the disk array unit side, a writeback control to write back to the disk array unit is executed with respect to the cache block which was swept out from the non-volatile memory 46.

The cache blocks 60 and 62 are allocated to the non-volatile memory 46 and volatile memory 48 in the cache memory 44 in FIG. 5 in order to store the track data. Each of the cache blocks 60 and 62 has a size of, for example, 64 kbytes. Each of the cache blocks 60 and 62 is divided into sub blocks of every 16 kbytes. Therefore, each of the cache blocks 60 and 62 can input and output data to/from the disk array unit on a block unit basis of 16 kbytes. On the other hand, the data transfer between the channel adapter modules 16-1 and 16-2 and the channel units 18-1 and 18-2 of the host computer 12 is executed while setting a host block of 4 kbytes to a minimum unit. A data transfer speed on the channel adapters 16-1 and 16-2 side is equal to, for example, 4 Mbps. On the other hand, a data transfer speed between the device adapter modules 20-11 to 20-22 and the disk array units 14-1 and 14-2 by the device adapter modules 20-11 to 20-22 is set to an enough high speed such as 20 Mbps. Since the data transfer speed on the device side is sufficiently high as mentioned above, according to the invention, even in the case where a mishit occurs in the cache memory 44 by the input/output request from the channel unit, after the corresponding track data was staged from the disk array units 14-1 and 14-2 side, the cache write or cache read can be apparently enabled in a manner similar to the cache hit status. Since the channel adapter modules 16-1 and 16-2 side and the device adapter modules 20-11 to 20-22 side can asynchronously operate, by executing the input/output control of the track data using the cache memory 44 by parallel processes as much as possible, the input/output control using the cache memory at a higher speed can be realized.

[Asynchronous Input/Output Control]

Figure 6:
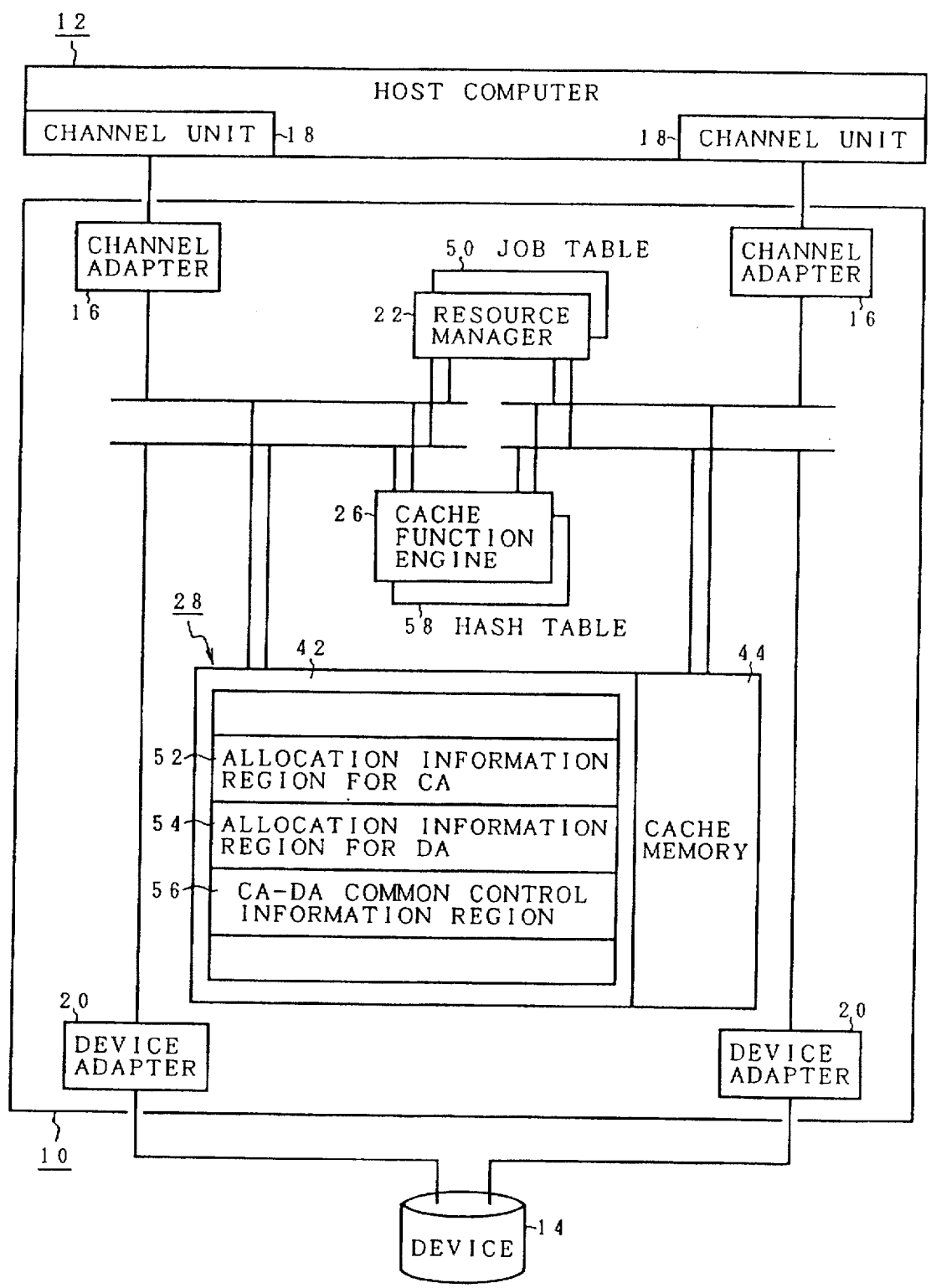
FIG. 6 is a functional block diagram of the invention.

The input/output control in the disk controller 10 of the invention will now be described divisionally with respect to the writing operation and the reading operation. FIG. 6 shows the contents of the common memory 28 with respect to the disk controller 10 in FIG. 2 in correspondence to FIG. 5 in order to explain the operation of the input/output control of the disk controller 10. Further, a case where the input/output control by the channel unit, channel adapter module, and device adapter module on the left side is allocated by the resource manager module 22 will be described as an example. For simplicity of explanation, reference numerals are also simply written such as channel unit 18, channel adapter module 16, and device adapter module 20. Moreover, the disk array units 14-1 and 14-2 are simply shown as a device 14.

Figure 7:
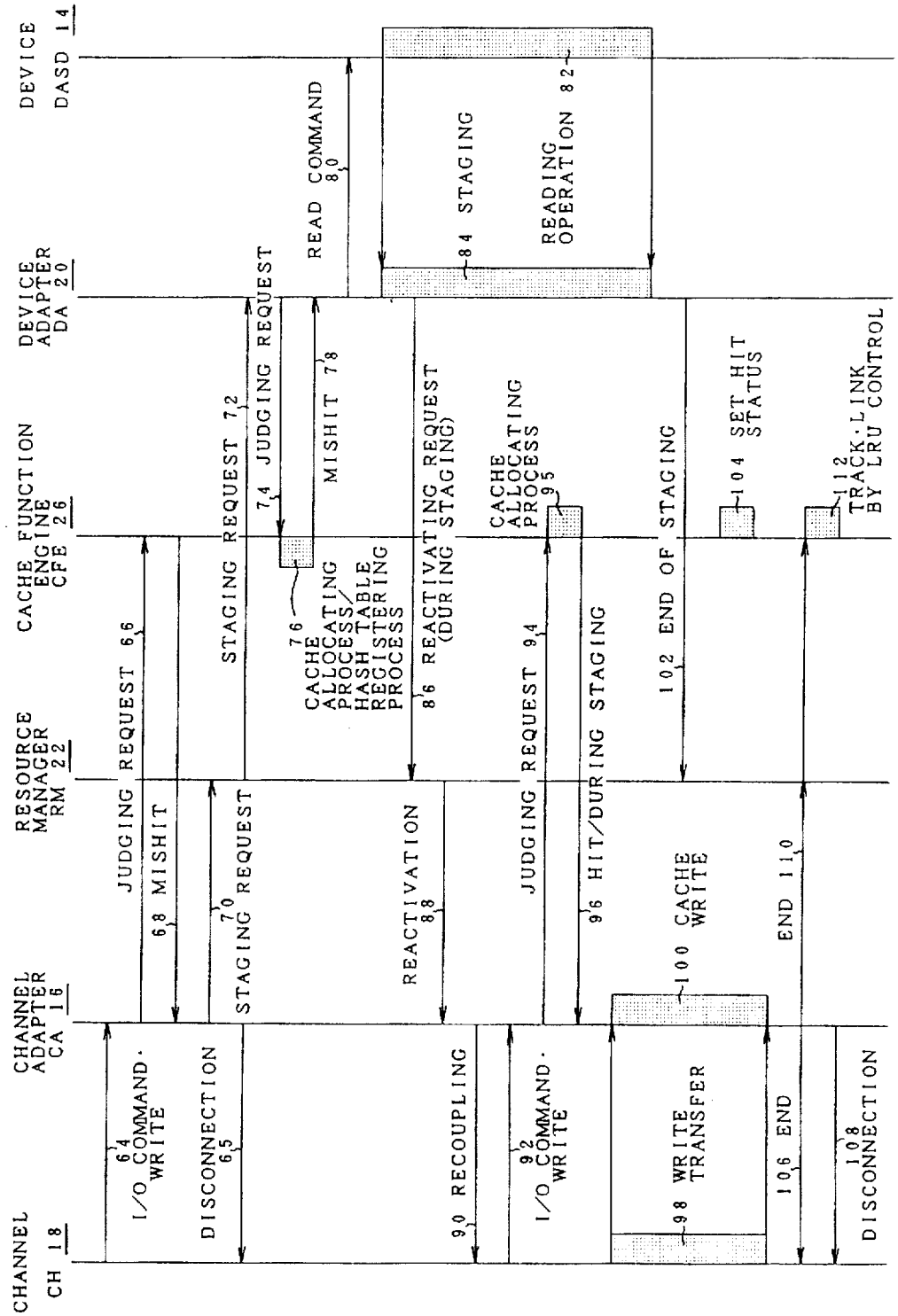
FIG. 7 is a time chart for the writing operation in FIG. 6.
Figure 8:
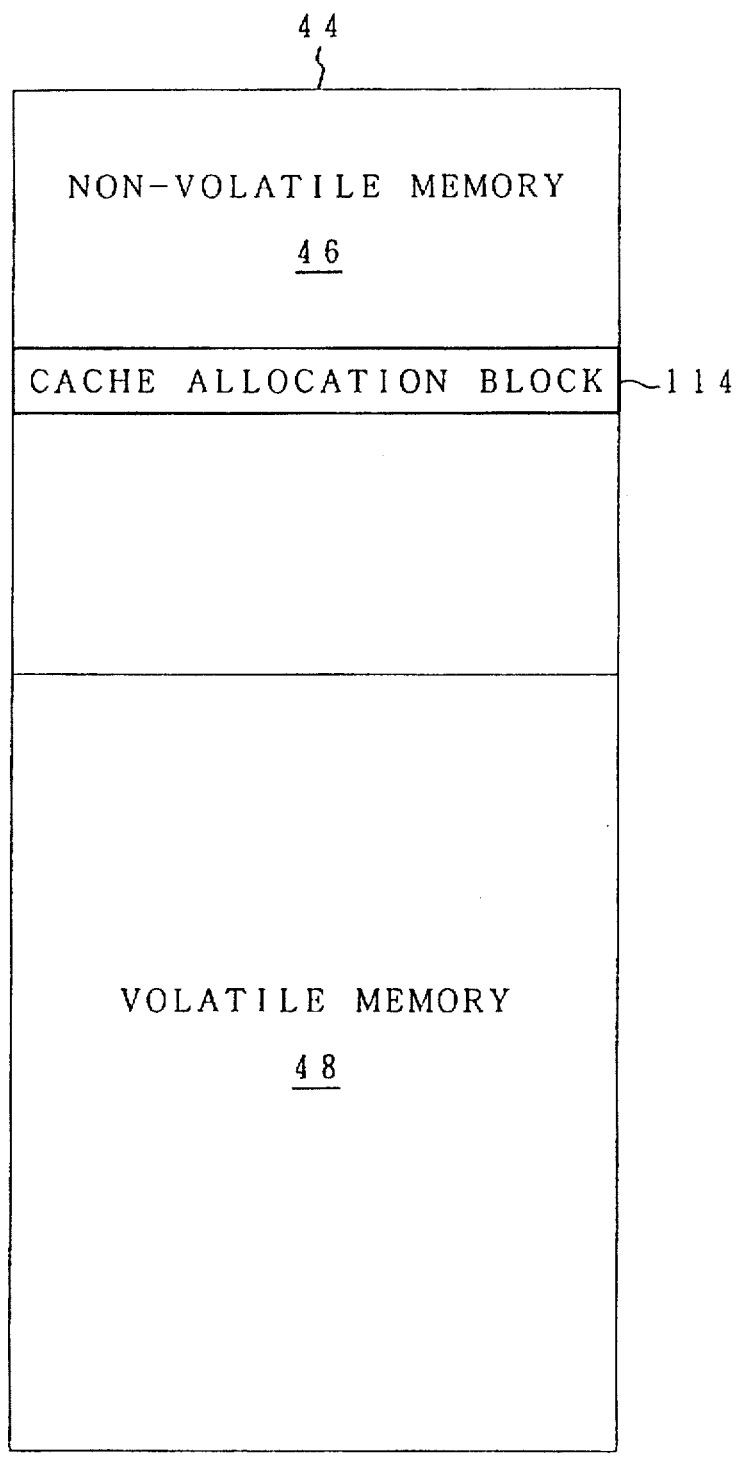
FIG. 8 is an explanatory diagram of an allocation of a cache block in the writing operation in FIG. 7.

FIG. 7 is a time chart for the writing operation of the disk controller 10 in FIG. 6. First, it is assumed that the channel unit 18 of the host computer 12 generates an I/O command•write 64. When receiving the I/O command•write 64, the channel adapter module 16 notifies it to the resource manager module 22. When the I/O command•write 64 is the first command of the CCW chain, the resource manager module 22 registers a new job code and a relation of the CCW chain into the job table 50. Since a logic track address of the device 14 is received by the I/O command•write 64, the channel adapter module 16 performs a judging request 66 about whether the requested track data exists in the cache memory 44 or not to the cache function engine module 26. The track address is a logic track address to which the device 14 is allocated as a logic device from the host computer 12 and is given by "CCHD". When receiving the judging request 66 from the channel adapter module 16, the cache function engine module 26 obtains a cache address by transmitting the track address "CCHD" through the cache function and refers to the hash table 58 by the hash address obtained. In this instance, a mishit 68 is responded in the case where the corresponding track address "CCHD" is not registered in the hash table 58 and no track data exists in the cache memory 44. When receiving the response of the mishit 68 from the cache function engine module 26, the channel adapter module 16 performs a staging request 70 of the track data in which a mishit occurred to the resource manager module 22. When the staging request 70 is performed, the channel adapter module 16 performs a disconnection 65 from the channel unit 18. When receiving the staging request 70, the resource manager module 22 performs a staging request 72 to the device adapter module 20. When receiving the staging request 72, the device adapter module 20 performs a judging request 74 to see whether the track data of the designated track address "CCHD" exists in the cache memory 44 or not to the cache function engine module 26. The cache function engine module 26 obtains the cache address by transmitting the track address "CCHD" given in response to the cache judging request 74 through the cache function and refers to the hash table 58. In this instance, a mishit 78 is responded since the track address "CCHD" is not registered in the hash table 58. At the same time, the cache function engine module 26 executes a cache allocating process 76 to assure the cache block to store the storage area of the track data by the staging from the device adapter module 20 and a registering process to the hash table 58. When the cache allocating process/hash table registering process 76 is executed, the cache address of the cache block allocated in correspondence to the job code as shown in FIG. 5 is registered into the allocation information region 54 for DA. In this case, since the command is an I/O command of a cache·write, as shown in FIG. 8, a cache block 114 is allocated to a region of the non-volatile memory 46. When receiving the response of the mishit 78 from the cache function engine module 26, the device adapter module 20 generates a read command 80 of the track data to the device 14. By receiving the read command 80, a reading operation 82 of the track data is executed from the device 14. By referring to the allocation information region 54 for DA, the device adapter module recognizes the address of the allocated cache block in the cache memory 44 and executes a staging of the track data transferred from the device 14 for the cache memory. In a staging 84 for the cache memory 44, when a data amount of the staging reaches a predetermined amount, the device adapter module 20 executes a reactivating request 86 of the channel adapter module 16 to the resource manager module 22. Therefore, the resource manager module 22 instructs a reactivation 88 to the channel adapter module 16. The channel adapter module 16 again performs a recoupling 90 with the channel unit 18 by the reactivation. An I/O command·write 92 is again generated from the channel unit 18. In response to the I/O command·write 92, the reactivated channel adapter module 16 executes a judging request 94 to the cache function engine module 26 in order to discriminate whether the track data exists in the cache memory 44 or not. In this instance, the track address "CCHD" has already been registered in the hash table 58 at the time of the cache allocating process 76 prior to the staging process of the device adapter module 20. However, since the flag status in the hash table 58 is not in a hit enable status, a state during the staging of the track data is recognized and a (hit/during staging) 96 is responded. In this instance, the cache function engine module 26 executes a cache allocating process 95 and registers a cache address of the cache block which is at present during the staging and has already been allocated into the allocation information region 54 for DA. When receiving a response of the (hit/during staging) 96 from the cache function engine module 26, the channel adapter module 16 refers to the common control information region 56 for CA-DA and discriminates whether the data amount of the staging for the allocated cache block in the cache memory 44 has reached a predetermined amount by the staging 84 by the device adapter module 20 or not. When the data amount of the staging reaches the predetermined amount, the cache address in the cache memory 44 which was allocated is recognized with reference to the allocation information region 54 for DA. The track data by a write·transfer 98 from the channel unit 18 is received and cache·write 100 is executed. In this state, the staging 84 by the device adapter module 20 and the cache·write 100 by the channel adapter module 16 are simultaneously executed in parallel for the allocation region of the same cache block allocated to the cache memory 44. Namely, when the data amount of the staging for the allocated cache block reaches a predetermined amount, for example, 16 kbytes, the cache·write by the channel adapter module 16 is started from the head of the block to be staged. When the reading operation 82 of the device 14 is finished and the staging 84 by the device adapter module 20 is finished, an end of staging 102 is notified to the cache function engine module 26 and resource manager module 22. By receiving the end of staging 102, the cache function engine module 26 performs a flag set 104 for setting a flag of the corresponding hash address in the hash table 58 into a hit status. Further, when the cache·write 100 by the channel adapter module 16 is finished by the end of the write·transfer 98 from the channel unit 18, an end 106 is responded to the channel unit 18 and a disconnection 108 is performed. An end 110 is also notified to the resource manager module 22 and cache function engine module 26. By receiving the notification of the end 110, the cache function engine module 26 executes a track link 112 for an LRU control to link the corresponding hash address in the hash table 58 after completion of the writing operation to the head position of the LRU table.

Figure 9:
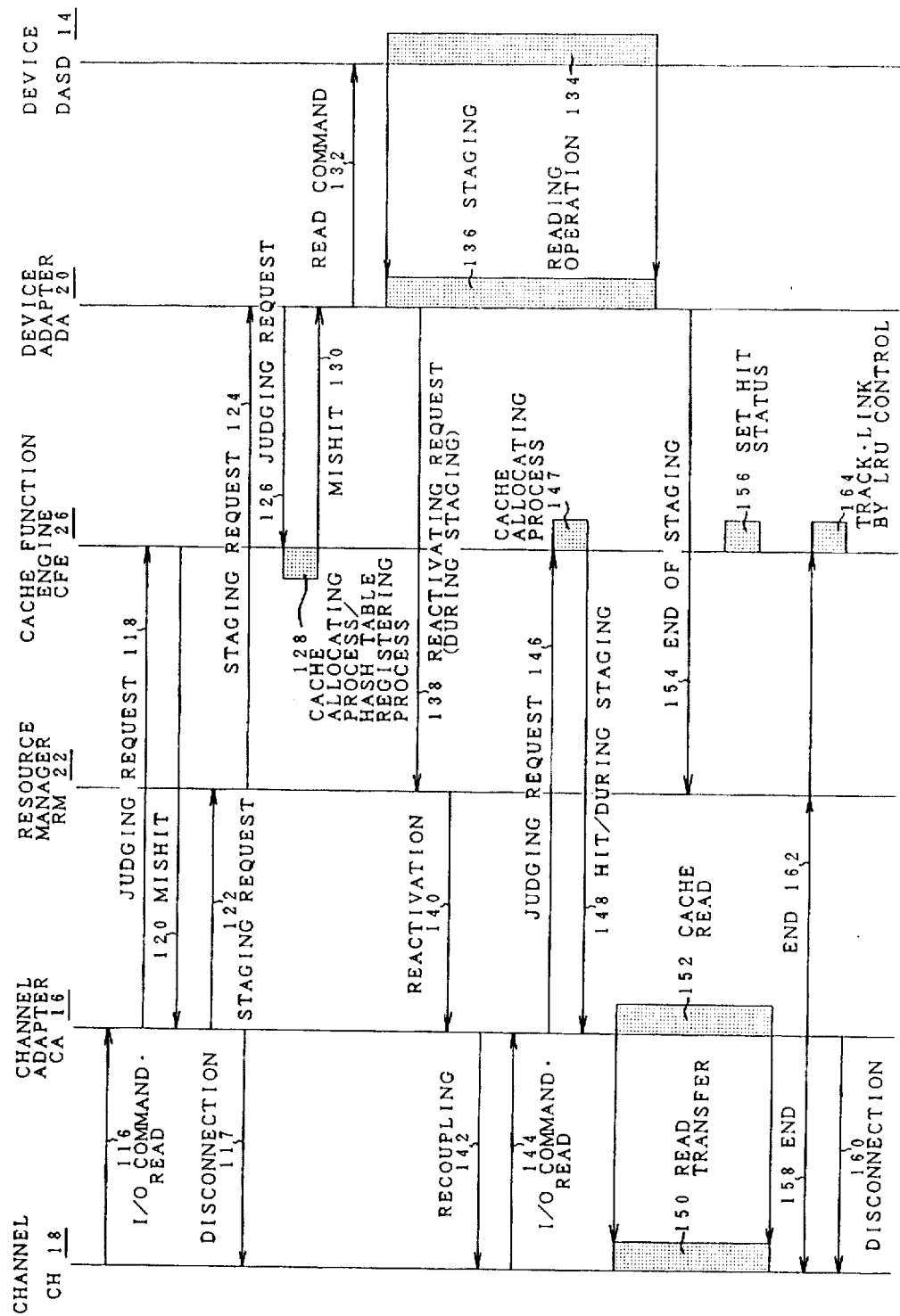
FIG. 9 is a time chart for the reading operation in FIG. 6.

FIG. 9 is a flowchart for the reading operation of the disk controller 10 in FIG. 6. In the reading operation, an I/O command read 116 is received from the channel unit 18, a mishit occurs in the cache memory 44 in response to a judging request 118 of the channel adapter module 16, a staging is performed by the device adapter module 20, the channel adapter module 16 is reactivated by a reactivating request 138 when the staging amount reaches a predetermined amount, a cache status is discriminated, and after that, a cache·read 152 is performed by a read·transfer 150 from the channel unit. Therefore, the operation is fundamentally similar to the writing operation in FIG. 7 except that the reading operation in association with a read command is performed between the channel unit 18 and the channel adapter module 16. Even in the reading operation of FIG. 9, the cache·read 152 by the reactivation of the channel adapter module 16 is executed in parallel from the midway of a staging 136 by the device adapter module 20. The reading operation accompanied with the staging at the time of a cache mishit can be finished at a higher speed.

Figure 10:
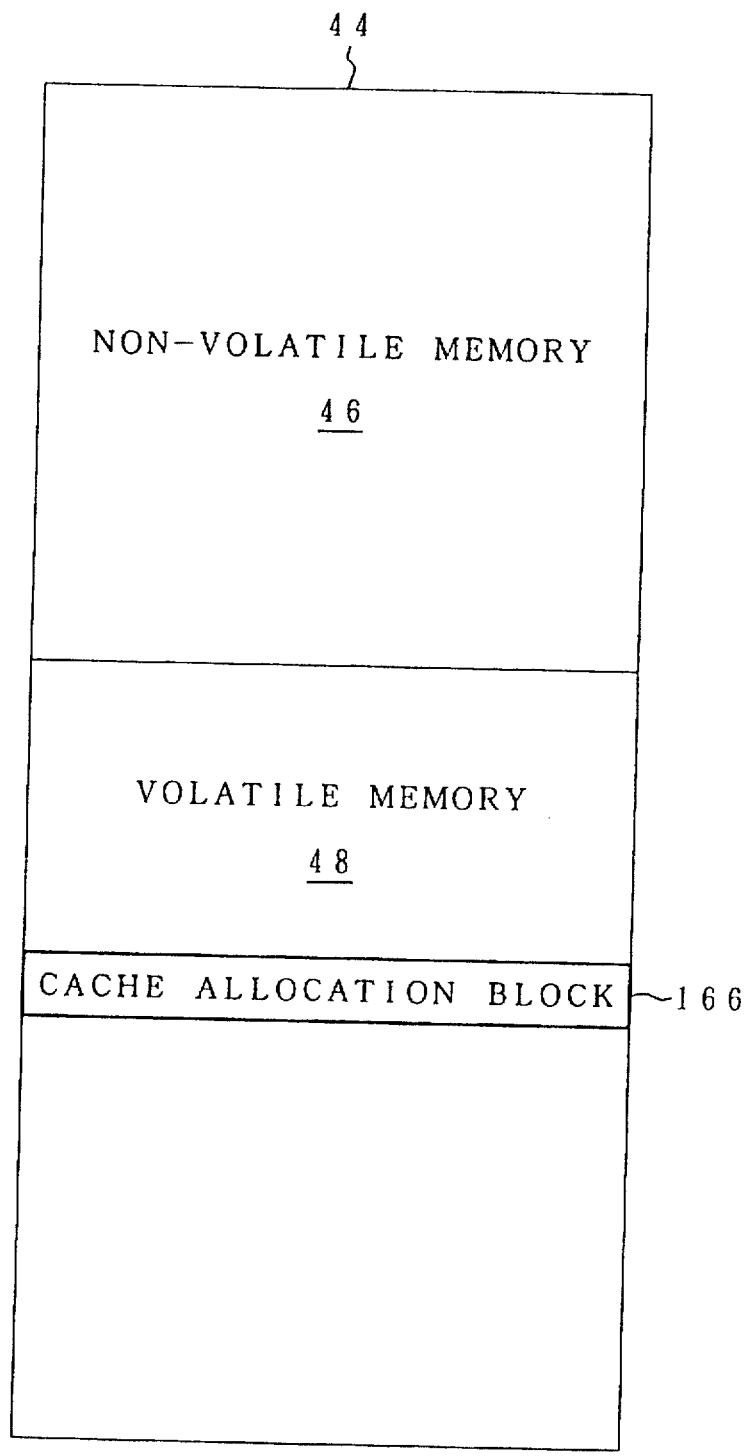
FIG. 10 is an explanatory diagram of an allocation of a cache block in the reading operation in FIG. 9.

FIG. 10 is a diagram showing a cache block allocating state of the cache memory 44 in the reading operation in FIG. 9. In the reading operation, a cache allocation block 166 is assured in the volatile memory 48 provided in the cache memory 44.

Figure 11:
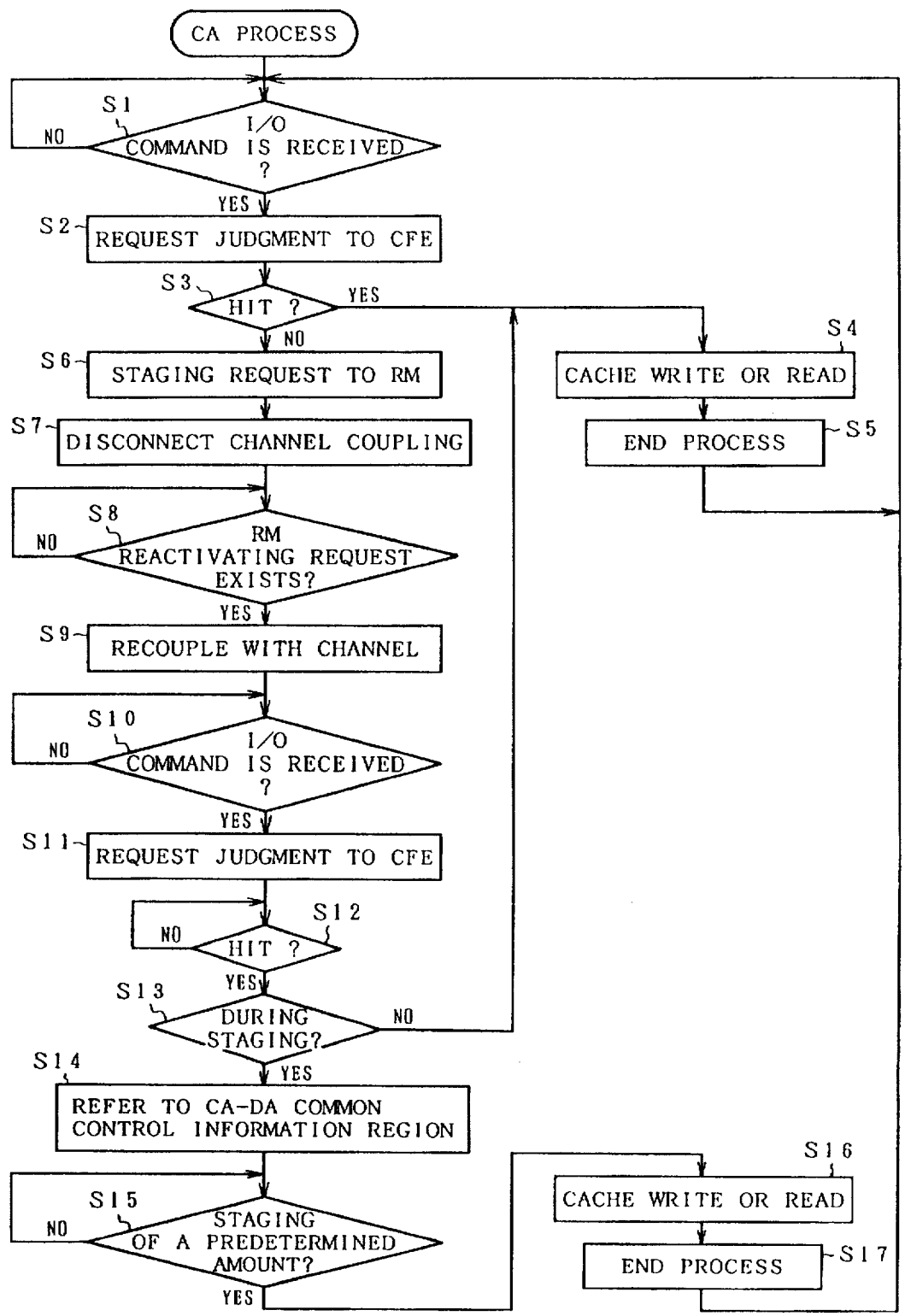
FIG. 11 is a flowchart for a control process of a channel adapter module in FIG. 7.

A control process in each of the channel adapter module 16, device adapter module 20, and cache function engine module 26 to realize the writing operation in FIG. 7 and the reading operation in FIG. 9 will now be described. FIG. 11 is a flowchart for the control process of the channel adapter module 16 in FIG. 6. First in step S1, a check is made to see if the I/O command from the channel unit 18 has been received. When the I/O command is received, a judgment about the cache status is requested to the cache function engine module 26 in step S2. In step S3, when a hit response is obtained from the cache function engine module 26, the cache·write or cache·read is performed in step S4. An end process is executed in step S5. In case of a mishit, the staging is requested to the resource manager module 22 in step S6. A channel coupling is disconnected in step S7. In this state, the apparatus waits for a reactivation request from the resource manager module 22 in step S8. When the reactivation request is received, a recoupling with the channel unit 18 is performed in step S9. The apparatus waits for the reception of the I/O command in step S10. A judgment about the cache status is again requested to the cache function engine module 26 in step S11. When a hit response is obtained in step S12 for the judging request, a check is made in step S13 to see if the staging is being executed. If YES, the common control information region 56 for CA-DA is referred in step S14. When a data amount of the staging reaches a predetermined amount, a cache•write or cache•read is executed in step S16. After completion of the cache•write or cache•read, an end process is performed in step S17 and the processing routine is again returned to step S1.

Figure 12:
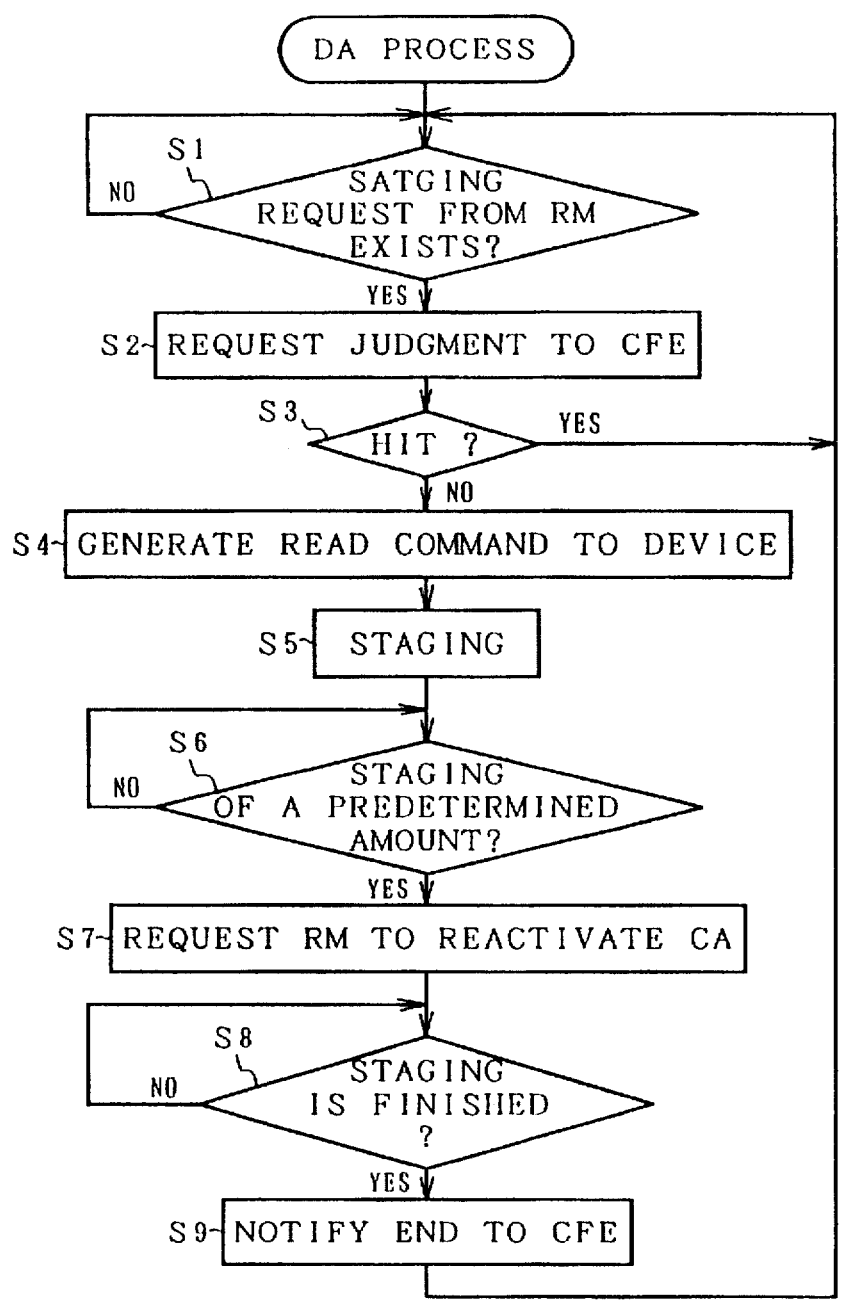
FIG. 12 is a flowchart for a control process of a device adapter module in FIG. 7.

FIG. 12 is a flowchart for the control process of the device adapter module 20. First in step S1, a check is made to see if there is a staging request from the resource manager module 22. When there is the staging request, a judgment about the cache status is requested to the cache function engine module 26 in step S2. Subsequently, the presence or absence of a hit is judged in step S3. When a mishit occurs, a read command is generated to the device 14 in step S4. The staging is performed to the cache address recognized with reference to the allocation information region 54 for DA in step S5. In step S6, a check is made to see if the data amount of the staging has reached a predetermined amount. If YES, a reactivation of the channel adapter module 16 is requested to the resource manager module 22 in step S7. In step S8, a check is made to see if the staging has been finished. After completion of the staging, in step S7, an end is notified to the cache function engine module 26 and resource manager module 22.

Figure 13:
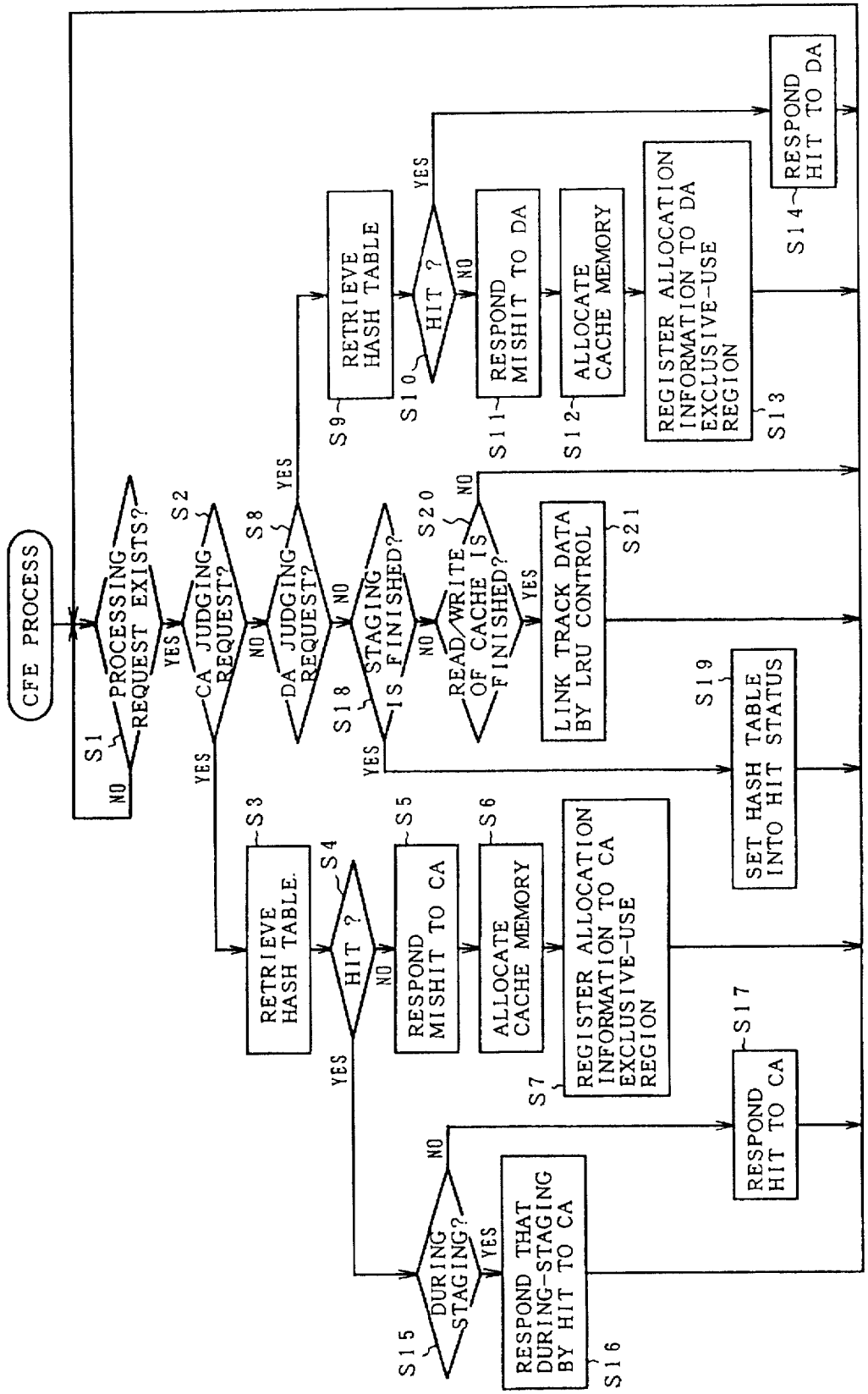
FIG. 13 is a flowchart for a control process of a cache function engine module in FIG. 7.

FIG. 13 is a flowchart for the control process of the cache function engine module 26 in FIG. 6. First in step S1, the presence or absence of a processing request from another module is judged. When there is the processing request, a check is made in step S2 to see if the processing request is a judging request from the channel adapter module 16. If YES, step S3 follows and the hash table is retrieved. A check is made in step S4 to see if there is a hit. When the hit occurs, a check is made in step S15 to see if the staging is being performed. Since the staging is not being performed at present, the hit is responded to the channel adapter module in step S17, thereby allowing the cache•write or cache•read to be executed for the cache memory. When a mishit occurs in step S4, the mishit is responded to the channel adapter module in step S5. The cache memory is allocated in step S6. In step S7, the allocation information, namely, the address of the allocated cache block is registered into the allocation information region 52 for CA. When the hit occurs in the hash table and the staging is being performed in step S5, since this means that the processing request is the judging request from the channel adapter module by the reactivating request from the channel device module side, step S16 follows. A fact that the status is the hit status and the staging is being performed is responded to the channel adapter module. When the processing request is not the judging request from the channel adapter module in step S2, a check is made in step S8 to see if it is a judging request from the device adapter module. In case of the judging request from the device adapter module 20, step S9 follows and the hash table 58 is retrieved. A check is made in step S10 to see if a hit has occurred. When a mishit occurs, the mishit is responded to the device adapter module in step S11. In step S12, the allocation of the cache memory 44 is performed. After completion of the allocation, the allocation information is registered into the allocation information region 54 for DA in step S13. Upon allocation of the cache memory in step S12, the track data is obviously registered into the hash address obtained by transmitting the track address "CCHD" through the hash function. When the hit status occurs by the retrieval of the hash table 58 for the judging request from the device adapter module 20 in step S10, the hit is responded to the device adapter module in step S14. In step S8, when the processing request is not the judging request from the device adapter module 20, a check is made in step S18 to see if the staging has been finished. When the end of the staging is judged, a flag of the corresponding hash address in the hash table 58 is set into the hit status in step S9. In step S18, if the staging is not finished, a check is made in step S20 to see if the reading or writing operation of the cache memory has been finished. If YES, a link registration of the track data for the LRU control to link the hash address after completion of the access to the head position of the LRU table is performed.

Further, in the resource manager module 22 in FIG. 6, an overall management of each module such as registration to the job table 50 when the I/O command is received on the channel adapter side, selection of the device adapter module when the staging request is executed, selection of the channel adapter module when the reactivating request is received, and the like is executed.

[Input/Output Control of Defective/Alternating Track]

Figure 14:
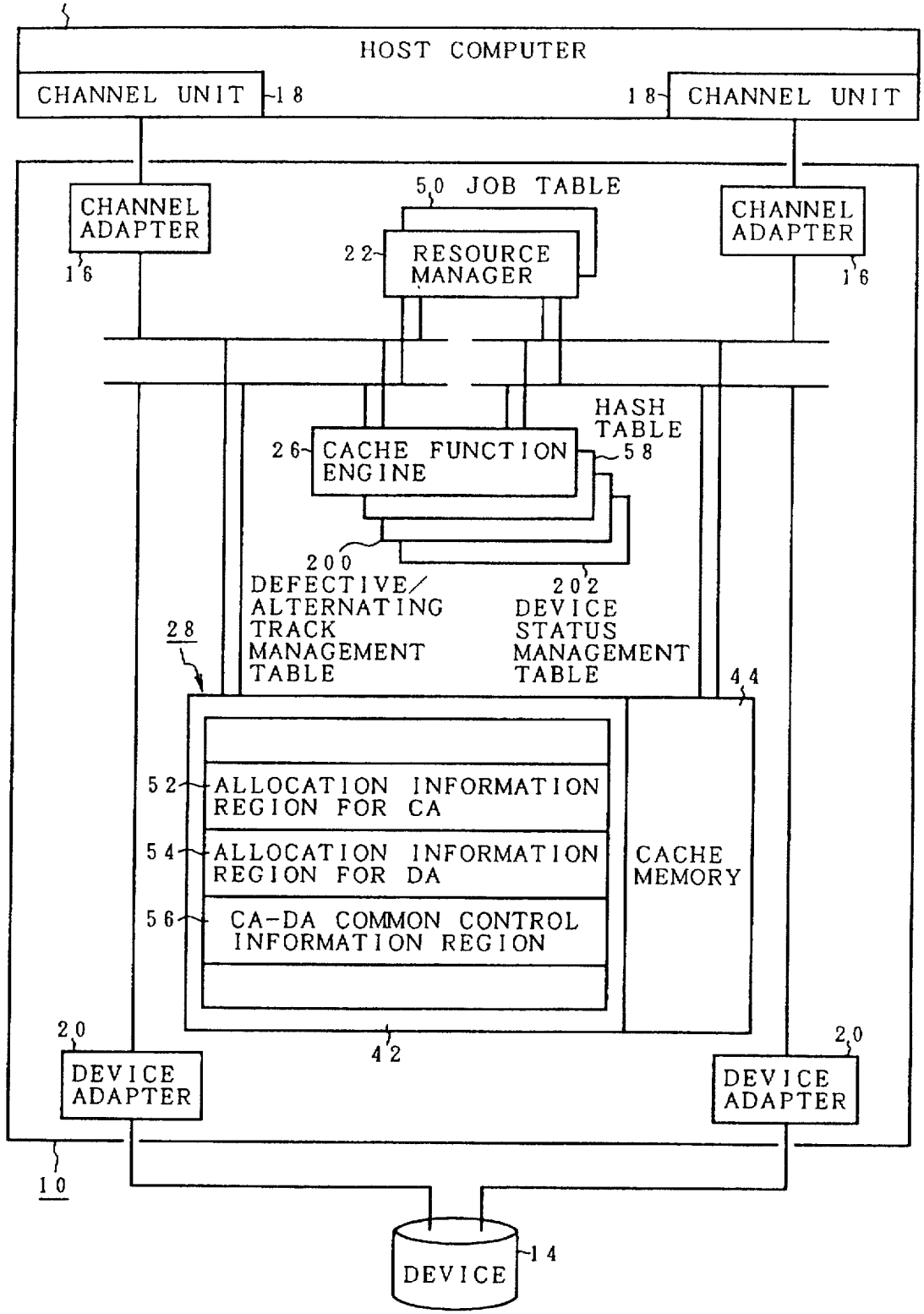
FIG. 14 is a block diagram of an input/output function of a defective/alternating track.

FIG. 14 is a functional block diagram of an input/output control in association with the caching operation with respect to a defective/alternating track in the input/output control apparatus of the invention. When there is a defective track in the device 14, a medium error occurs at the time of the reading or writing operation from the device adapter module 20 for the defective track and is notified to the host computer 12 side. In response to the notification of the defective track of the device 14 as mentioned above, the host computer 12 side allocates the corresponding alternating track from a predetermined alternating track region and requests the disk controller 10 to perform a registering process of the defective/alternating track of the device 14. The registering process for the device 14 is divided into a process by a write command chain of a defective track flag and an alternating track address for each of a home address HA and the R0 record of the defective track and a process by a write command chain of the alternating track flag and defective track address for each of the home address HA and the R0 record of the defective track. By the writing to the defective track and alternating track of the device 14, a state in which a link is mutually connected between the defective track and the alternating track is formed.

In the disk controller 10 of the invention, a defective/ alternating track management table 200 and a device status management table 202 are newly provided for the cache function engine module 26. When a link connection between the defective track and the alternating track for the device 14 is executed, the defective track address, alternating track address, and flag information indicative of the link state are registered. The defective track data and alternating track data as targets for registration in the defective/alternating track management table 200 obviously exist in the cache memory 44, respectively. Therefore, after completion of the registration of the defective/alternating track management table 200, when the same defective/alternating track address is accessed, the alternating track address can be soon known by referring to the defective/alternating management table 200. Therefore, the caching operation for the alternating track data corresponding to the defective track in the cache memory can be immediately executed without reading out the alternating track data from the cache memory 44.

FIG. 15 is an explanatory diagram of the defective/ alternating management table 200 provided for the cache function engine module 26 in FIG. 14. The defective/ alternating track management table 200 has the defective track address, alternating track address, and flag information. The track address of the defective track as a target existing in the cache memory 44 is stored into the defective track address. The track address of the alternating track allocated to the corresponding defective track is stored into the alternating track address. The flag information shows a state of a link connection between the defective track and the alternating track. The flag information includes the following three statuses.

I. Valid status

II. First invalid status (invalid 1) indicating that only a link connection from the defective track to the alternating track is valid III. Second invalid status (invalid 2) indicating that only a link connection from the alternating track to the defective track is valid Actually, the three flag information can be expressed by using 2-bit information, for example, in a manner such that the valid status V is set to 00 and the first invalid status IV1 is set to 10 and the second invalid status IV2 is set to 11.

Referring again to FIG. 14, the device status management table 202 is provided for the cache function engine module 26. As shown in FIG. 16, the device status management table 202 has registration contents of a device number and flag information. As a device number, a device number allocated to each of the disk drives constructing the disk array 38 in FIG. 3 is used. As for the flag information, upon leading of the apparatus, the defective tracks are retrieved from the alternating tracks of all of the devices, the link states of the retrieved defective tracks and the alternating track are checked, and when the defective/alternating track management table 200 in FIG. 15 is formed, flag information indicating whether the formed defective/alternating track management table 200 is valid or invalid every device has been stored. Therefore, when the track address is notified from the host computer 12 via the channel adapter module 16, first, by referring to the device status management table 202, whether the link state between the defective track and the alternating track is valid or invalid can be immediately judged without needing to retrieve the track address in the defective/alternating track management table 200 of the device. When the link state is valid, the operation is shifted to the caching operation by the reference to the defective/alternating track management table 200. When the link state is invalid, the operation can be shifted to the caching operation by the device access in the case where the link state between the defective track and the alternating track is invalid.

A registering process of the defective/alternating track management table 200 in FIG. 15 will now be described in detail. It is assumed that a defective track A and an alternating track B have been linked in the defective/alternating track management table 200 at present. In this state, a process for re-connecting a link of the defective and alternating tracks is requested from an upper apparatus and a link is connected to another alternating track D for the defective track A. For such a link re-connection, it is now assumed that each of the following addresses has been registered into the defective/alternating track management table 200.

(1) Defective track address A and alternating track address B (2) Defective track address A and alternating track address C In this case, however, two same defective tracks A exist in the defective/alternating track management table 200 and whether the defective track A has been linked to which one of the alternating tracks B and C cannot be judged in the table. According to the invention, therefore, the addresses of the defective and alternating tracks based on the link re-connecting process from the upper apparatus and a notification of information of the link connection from the defective track to the alternating track or the link connection from the alternating track to the defective track are received from the channel adapter module 16, and a control regarding the table registration and management in FIGS. 17A to 17J is performed in the cache function engine module 26.

FIGS. 17A to 17E separately show states before and after the updating of the defective/alternating track management table 200 in the case where the addresses of the defective and alternating tracks and the notification indicating that the link was performed from the defective track to the alternating track were received from the channel adapter module 16 to the cache function engine module 26 with respect to modes 1, 2, 3, 6, and 7. Modes 1 to 8 in the link from the defective track to the alternating track in FIGS. 17A to 17E are as shown in FIG. 18A. Among them, the modes 4 and 5 are omitted in FIGS. 17A to 17E.

First, the mode 1 of FIG. 17A shows the case where the present registration state before updating is set such that the defective track is A and the alternating track is B and the flag information indicates the valid status and where the track addresses of the same defective track A and different alternating track D were notified by the link connection from the defective track to the alternating track. In this case, the alternating track B is changed to the alternating track D which was newly notified and the flag information sets "invalid 1" indicating that only the link from the defective track to the alternating track is valid.

The mode 2 of FIG. 17B shows the case where the registration state is set such that the defective track is A and the alternating track is B and the flag information indicates "invalid 1" in which only the link from the defective track to the alternating track is valid and where the notification of the link re-connection from the same defective track A to the different alternating track D is received. In this case, after the alternating track B was changed to the alternating track D, the flag information maintains "invalid 1" in which only the link from the defective track to the alternating track is valid.

The mode 3 of FIG. 17C shows the case where the registration state is set such that the defective track is A and the alternating track is B and the flag information indicates "invalid 2" in which only the link from the alternating track to the defective track is valid and where the notification of the link re-connection from the defective track A to the alternating track D is received. In this case, after the alternating track B was changed to the alternating track D, the flag information is changed to "invalid 1" in which only the link from the defective track to the alternating track is valid.

The mode 6 of FIG. 17D shows the case where the registration state is set such that the defective track is A and the alternating track is B and the flag information indicates the valid status and where the notification of the link re-connection between the same defective track A and alternating track B is received. The defective track A and alternating track B are maintained and the flag information is changed from the valid status to "invalid 1" in which only the link from the defective track to the alternating track is valid.

The mode 7 of FIG. 17E shows the case where the registration state is set such that the defective track is A and the alternating track is B and the flag information indicates "invalid 2" in which only the link from the alternating track to the defective track is valid and where the notification of the link re-connection between the same defective track A and alternating track B is received. In this case, the link re-connection from the alternating track B to the defective track A has already been valid and the link re-connection from the defective track A to the alternating track B has newly been performed with respect to an interval between the same track addresses, so that the flag information is changed to the valid status.

The other modes 4 and 5 are as shown in FIG. 18A. FIG. 18A shows the coincidence and dissidence between the defective track and the alternating track when the notification of the link connection from the defective track to the alternating track is received, the statuses before and after the updating of the flag information, and further the registration contents at that time. The mode 4 shows the case where the defective tracks don't coincide and the alternating tracks also don't coincide. In this case, the flag status of the notification of the link connection at that time is set and the novel registration is performed as for the registration contents. The mode 5 relates to the case where the defective track and alternating track coincide and, further, the flag information also indicates an arbitrary same flag status. In this case, the registration is not performed since there is no need to change the contents in the table.

FIGS. 17F to 17J show the details of the registration of the defective/alternating track management table 200 when the notification of the link connection from the alternating track to the defective track is received in the case opposite to that in FIGS. 17A to 17E. Modes 9, 10, 11, 14, and 16 are shown here. The modes 9 to 16 in this case are as shown in FIG. 18B.

First, the mode 9 of FIG. 17F shows the case where the registration state is set such that the defective track is A and the alternating track is B and the flag information indicates the valid status and where the notification of the link connection from the alternating track to the defective track in case of the same defective track A and the different alternating track D is performed. In this case, after the alternating track B was changed to the alternating track D, the flag information is changed to "invalid 2" in which only the link connection from the alternating track to the defective track is valid.

The mode 10 of FIG. 17G shows the case where the registration state is set such that the defective track is A and the alternating track is B and the flag information indicates "invalid 1" in which only the link from the defective track to the alternating track is valid and where the notification of the link reconnection from the different alternating track D to the same defective track A is received. In this case, the defective track A is remained and the alternating track B is changed to the alternating track D, and further the flag information is changed to "invalid 2" in which only the link from the alternating track to the defective track is valid.

The mode 11 of FIG. 17H shows the case where the registration state is set such that the defective track is A and the alternating track is B and the flag information indicates "invalid 2" in which only the link from the alternating track to the defective track is valid and where the notification of the link connection from the different alternating track D to the same defective track A is received. In this case, the defective track A is maintained and the alternating track B is changed to the alternating track D and the flag information is held in the same status "invalid 2".

The mode 14 of FIG. 17I shows the case where the registration state is set such that the defective track is A and the alternating track is B and the flag information indicates the valid status and where the notification of the link connection from the same alternating track B to the defective track A is received. In this case, since the interval between the tracks is an interval between the same tracks, the defective track A and the alternating track B are maintained and the flag information is changed from the valid status to "invalid 2" in which only the link from the alternating track to the defective track is valid.

The mode 16 of FIG. 17J shows the case where the registration state is set such that the defective track is A and the alternating track is B and the flag information indicates "invalid 1" in which only the link from the defective track to the alternating track is valid and where the notification of the link connection from the same alternating track B to the same defective track A is received. In this case, since the link connection from the defective track A to the alternating track B has already been finished, the link connection is completed by the notification of the new link connection from the alternating track A to the defective track B, so that the flag information is changed to the valid status.

The modes 12 and 13 in the notification of the link connection from the alternating track to the defective track in FIGS. 17F to 17J are as shown in FIG. 18B. The mode 12 shows the case where the defective tracks don't coincide and the alternating tracks also don't coincide in the notification of the link connection from the alternating track to the defective track. In this case, the flag information corresponding to the notification of a new link connection is set and a novel registration is performed. The mode 13 shows the case where the defective tracks coincide and the alternating tracks also coincide and the flag information indicates an arbitrary same flag. Therefore, the registration is not performed in this case.

A flowchart of FIG. 19 shows an updating process of the defective/alternating track management table 200 by the cache function engine module 26 in FIG. 14 in association with the linking process between the defective track and the alternating track for the device 14 from an upper apparatus. The upper host computer 12 allows the disk controller 10 to generate from the channel unit 18: a command chain of a defective track writing process for executing the link connection from the defective track of the device 14 to the alternating track; and a command chain of an alternating track writing process for executing the link connection from the alternating track to the defective track. In response to such a processing request of the link connection between the defective track and the alternating track from the upper apparatus, first in step S1, when the channel adapter module 16 receives the process for connecting a link from the defective track to the alternating track, the channel adapter module 16 requests the device adapter module 20 via the resource manager module 22 so as to write the defective track flag and the alternating track address into the home address HA and R0 record of the defective track of the device 14 in step S2. After completion of the writing to the defective track of the device 14 by the device adapter module 20, an updating process of the defective/alternating track management table is performed in step S3. The updating process of the defective/alternating track management table has processing contents of a flowchart of FIG. 20. In step S4, when the channel adapter module 16 subsequently receives a process for linking from the alternating track to the defective track from the upper apparatus, the channel adapter module 16 requests the device adapter module 20 via the resource manager module 22 so as to write the alternating track flag and the defective track address into the home address HA and R0 record of the alternating track of the device 14. After completion of the writing to the alternating track of the device 14 by the device adapter module 20, the updating process of the defective/alternating track management table is again executed in step S6. The updating process of the defective/alternating track management table in step S6 has processing contents of a flowchart of FIG. 21.

Figure 20:
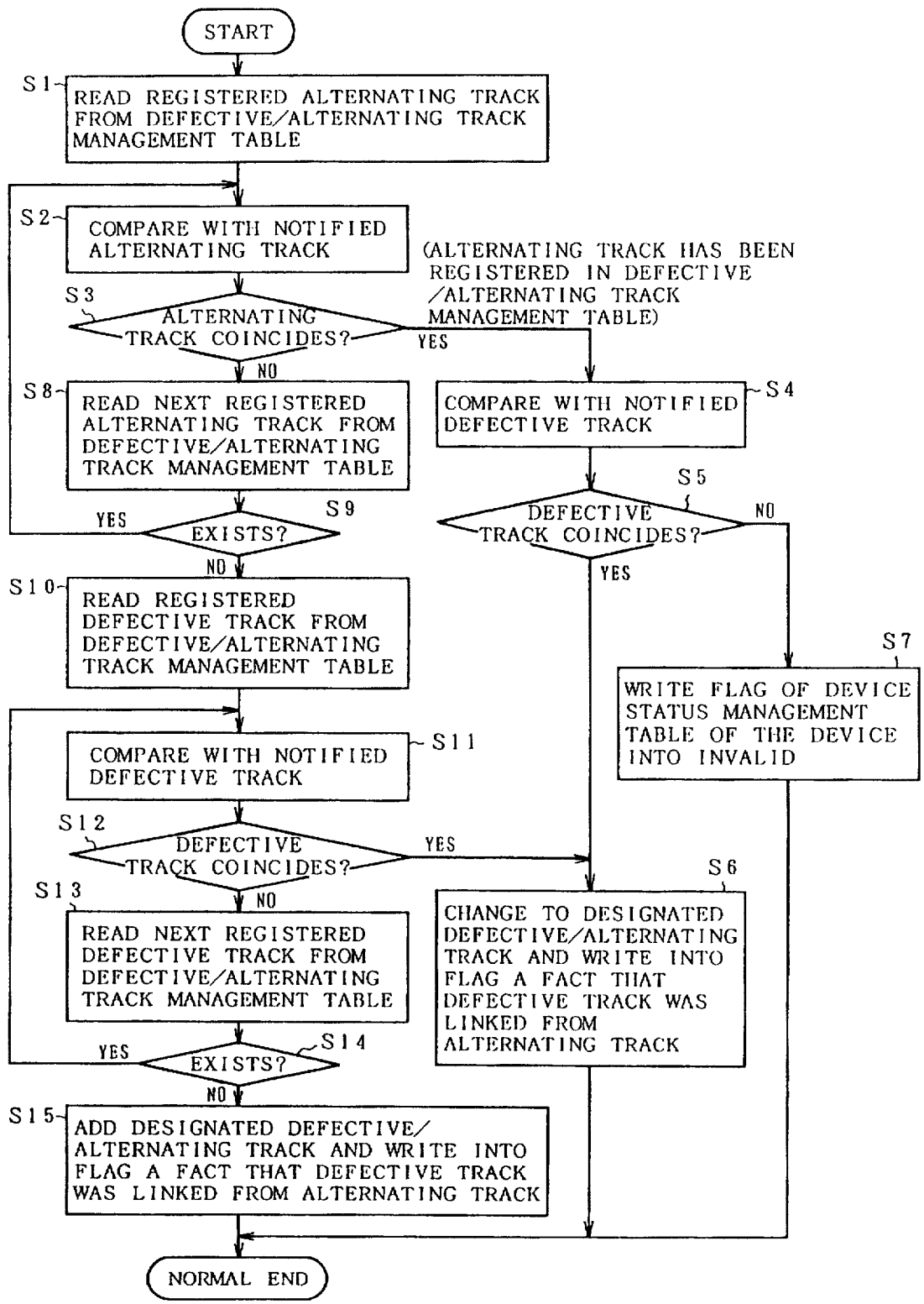
FIG. 20 is a flowchart for an updating process of the defective/alternating track management table in case of linking from the defective track to the alternating track.

FIG. 20 shows the details of a registering process of the defective/alternating track management table 200 in the case where the notification of the process for connecting a link from the defective track to the alternating track is received. First in step S1, the alternating track address registered is read out from the defective/alternating track management table 200. The read alternating track address is compared with the notified alternating track address in step S2. When the coincidence of the track address is discriminated in step S3, the alternating track address is compared with the notified defective track address in step S4. When the coincidence of the defective track address is discriminated in step S5, it is changed to the designated defective/alternating track in step S6 and a fact that the defective track was linked from the alternating track is registered into the flag information. Specifically speaking, any one of the processes in the modes 5 to 8 in FIG. 18A is executed. When the defective track address doesn't coincide in step S5, since the defective/alternating track management table 200 is wrong, the flag information of the device status management table 202 of the device is made invalid in step S7, thereby inhibiting the use of the table. On the other hand, when the alternating track doesn't coincide in step S3, the next registered alternating track is read out from the defective/alternating track management table 200. When it exists in step S9, it is again compared with the notified alternating track in step S2. A check is made in step S3 to see if the alternating track address coincides. When the notified alternating track doesn't exist in the defective/alternating track management table in step S9, step S10 follows. The defective track registered is read out from the defective/alternating track management table 200. The read defective track is compared with the notified defective track address in step S11. When the defective track address coincides in step S12, step S6 follows and the track is changed to the designated defective/alternating track and the flag information is changed to a status indicating that a link from the alternating track to the defective track was connected. Step S6 relates to the case where the defective track coincides and the alternating track doesn't coincide and any one of the processes in the modes 1 to 3 in FIG. 18A is executed. When the defective track doesn't coincide in step S12, step S13 follows and the next registered defective track is read out from the defective/alternating track management table 200. When the next registered defective track exists in step S14, the processing routine is returned to step S11 and the comparison with the notified defective track is repeated. When the comparing processes of all of the defective tracks are finished in step S14, step S15 follows. The designated defective/alternating track is added and a fact that the defective track was linked from the alternating track is registered into the link information. The registering process in step S14 corresponds to the process in the mode 4 in FIG. 18A because both of the alternating track and the defective track don't coincide.

Figure 21:
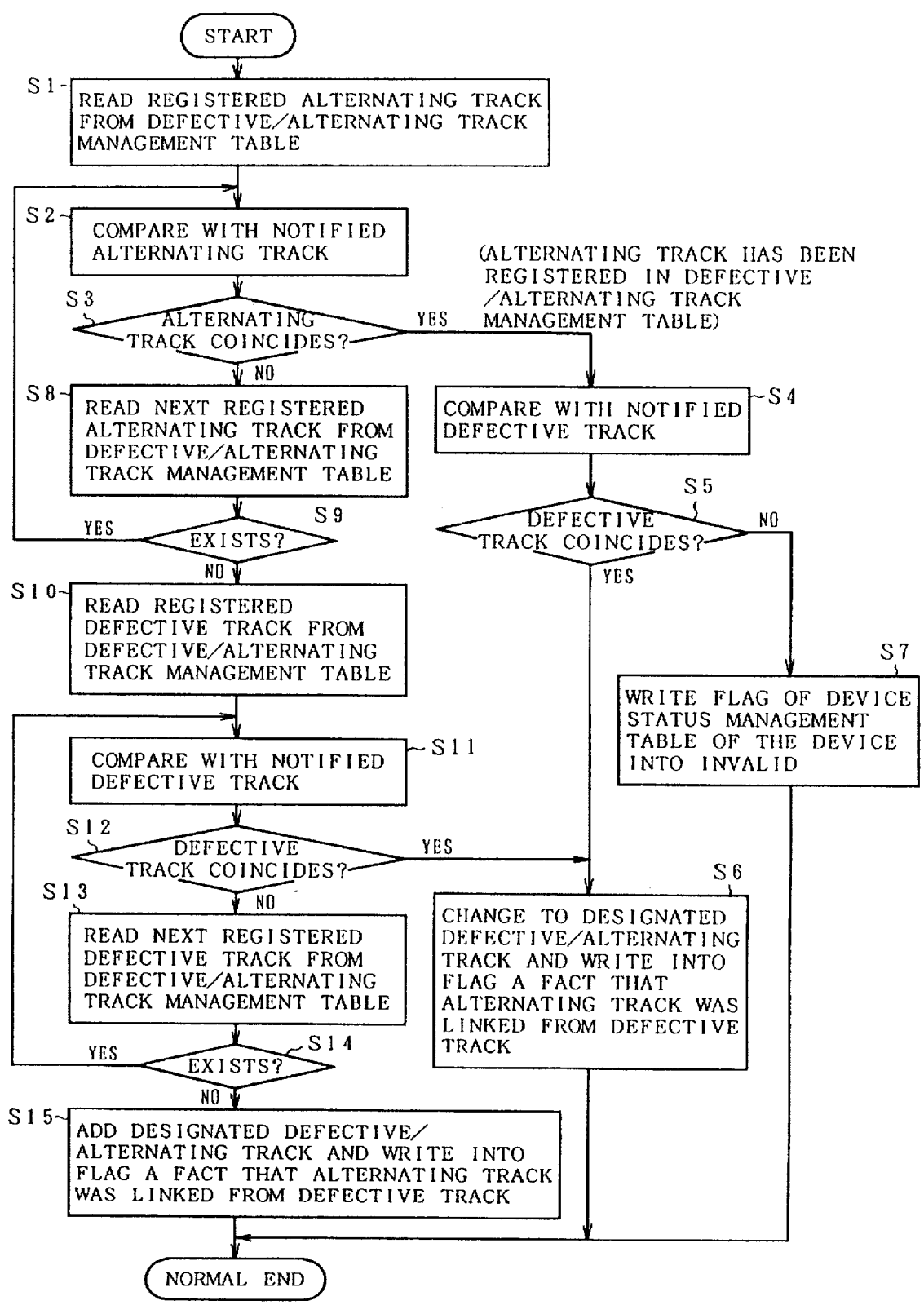
FIG. 21 is a flowchart for an updating process of the defective/alternating track management table in case of linking from the alternating track to the defective track.

The flowchart of FIG. 21 shows the details of the registering process of the defective/alternating track management table 200 when the notification of the link connection from the alternating track to the defective track was performed in step S6 in FIG. 19. The processes when the notification of the link connection from the alternating track to the defective track was performed are fundamentally similar to those in the case where the notification of the link connection from the defective track to the alternating track in FIG. 20 was performed except a different point that a fact that the link from the defective track to the alternating track was performed is written in the registration of the flag information in steps S6 and S15.

Figure 22:
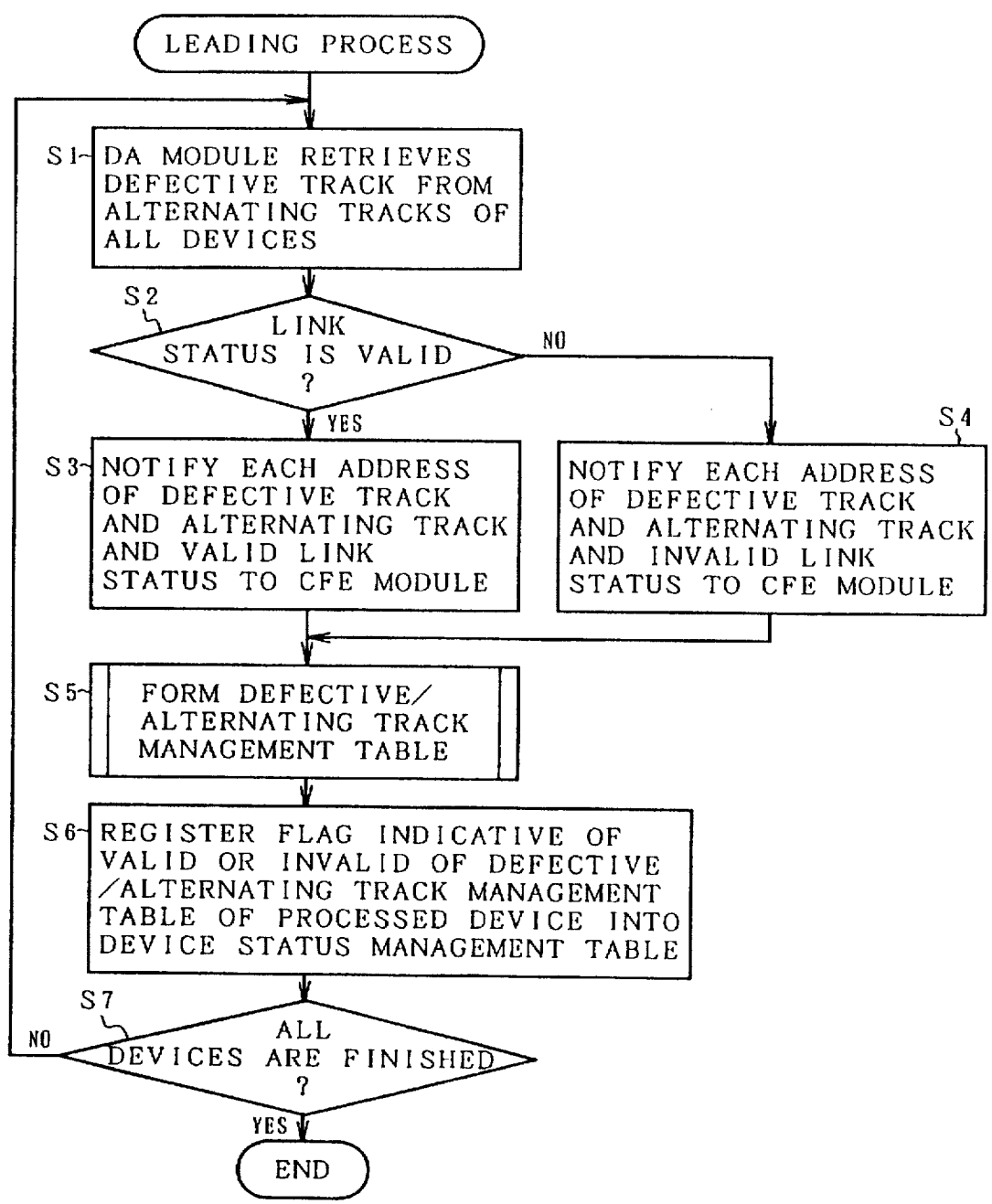
FIG. 22 is a flowchart for a table forming process upon leading of the apparatus.

A flowchart of FIG. 22 shows processes for forming table information regarding the defective/alternating track upon leading of the apparatus. When the apparatus is led by turning on the power source, first in step S1, the device adapter module 20 retrieves defective tracks from predetermined alternating tracks with respect to all of the devices. A check is made in step S2 to see if the link state between the retrieved defective track and the alternating track is valid. When it is valid, each address of the defective track and the alternating track and a fact that the link state is valid are notified to the cache function engine module 26. When the link state is invalid in step S2, each address of the defective track and the alternating track and a fact that the link state is invalid are notified to the cache function engine module 26 in step S4. As such an invalid status, there are the following three statuses: a perfect invalid status in which no link is connected and statuses of "invalid 1" and "invalid 2" in which the link is connected in only one direction between the defective track and the alternating track. In step S5, the defective/alternating track management table 200 is formed on the basis of the notification result in step S3 or S4. The details of the table forming process are as shown in the flowcharts of FIGS. 20 and 21. Subsequently, step S6 follows and a flag indicating whether the defective/alternating track management table formed in step S5 is valid or invalid is registered into the device status management table 202. That is, in the notification of the invalid status of the link state in step S4, a flag indicative of the invalid status is registered with respect to the device in which the link connection between the defective track and the alternating track is never performed, and a flag indicative of the valid status is registered with regard to the device in which the defective/alternating track management table was formed. The processes in steps S1 to S6 are repeated until the table forming processes of all of the devices are finished in step S7. In the case where the defective/alternating track management table 200 and device status management table 202 provided for the cache function engine module 26 in FIG. 14 have been stored in a non-volatile memory which is backed up by a battery, the table forming process upon leading of the apparatus of FIG. 22 can be made unnecessary.

Figure 23A:
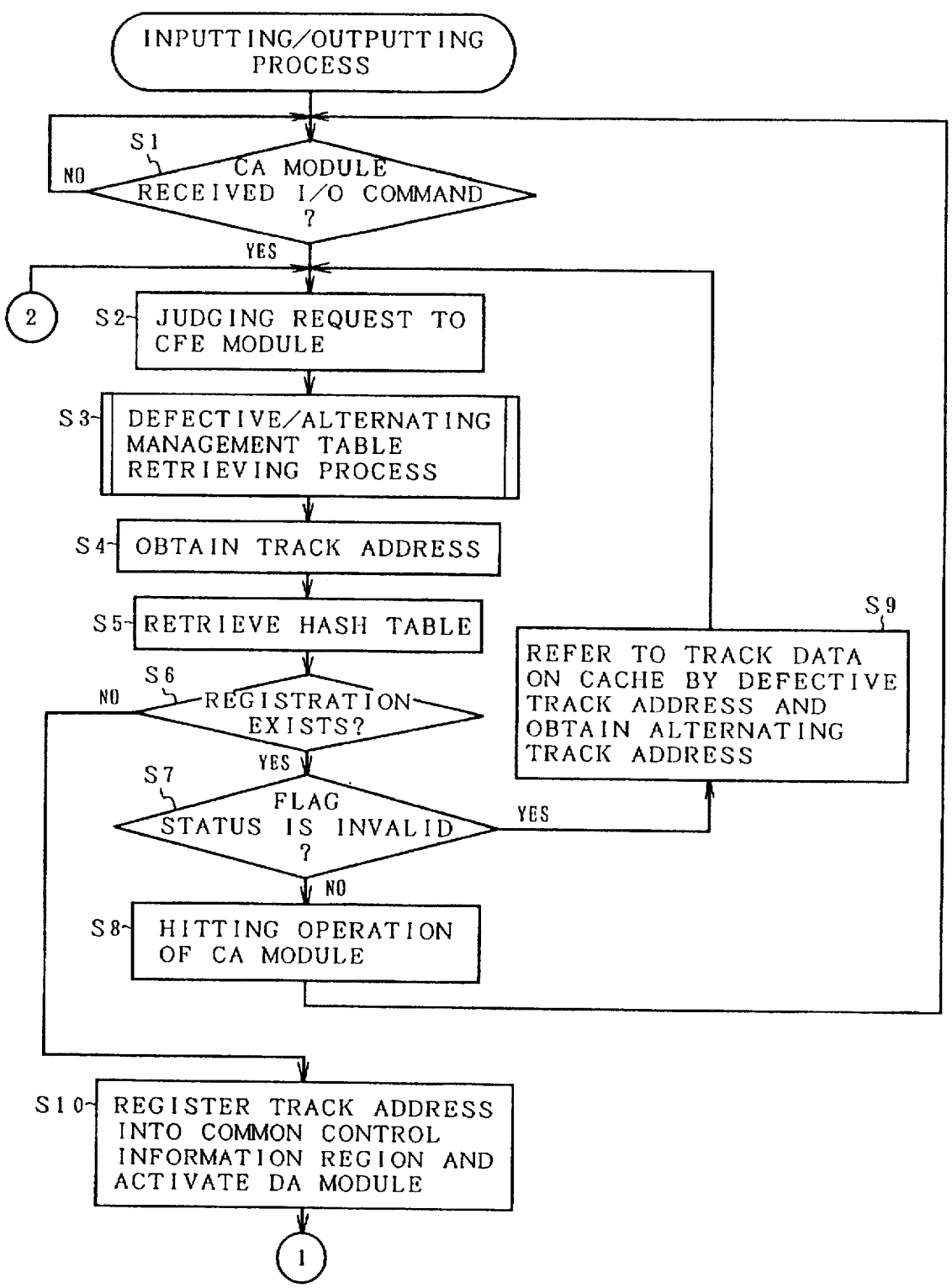
FIGS. 23A and 23B are flowcharts for an inputting/outputting process accompanied with the caching operation of a defective/alternating track.

The input/output processes in the disk controller 10 using the defective/alternating track management table 200 and device status management table 202 formed by the apparatus leading process will now be described with reference to flowcharts of FIGS. 23A and 23B. In FIG. 23A, in step S1, the channel adapter module 16 waits for the reception of an input/output command from the upper channel unit 18. When the input/output command is received, in step S2, the track address is notified and a judgment is requested to the cache function engine module 26. By receiving the judging request, the cache function engine module 26 executes a retrieving process of the defective/alternating track management table 200 in step S3. In step S4, the track address which is used to retrieve the hash table 58 is obtained. The hash table 58 is retrieved in step S5. When the presence of the registration of the hash table 58 is discriminated in step S6, step S7 follows and a check is made to see if the flag information obtained by the retrieval of the defective/alternating track management table 200 indicates "invalid 1" in which only the link from the defective track to the alternating track is valid. When the flag information doesn't indicate "invalid 1", namely, when it indicates the valid status or "invalid 2" in which only the link from the alternating track to the defective track is valid, a fact that the track data exists in the cache memory 44 is notified to the channel adapter module 16 in step S8, thereby allowing the hitting operation for the track data, as a target, in the cache memory 44 to be executed. When the flag status indicates "invalid 1" in which only the link from the defective track to the alternating track is valid in step S7, step S9 follows. The alternating track address is obtained by referring to the track data in the cache memory 44 by the defective track address. The processing routine is returned to step S2. The processes from step S3 by the alternating track obtained from the track data are repeated. Further, when the corresponding track address doesn't exist even after the retrieval of the hash table 58 was executed in step S6, step S10 follows. The track address which doesn't exist in the cache memory is registered into the common control information region 56 for CA-DA in the basic storage 42 in the common memory 28 and the device adapter module 20 is activated. In step S11 in FIG. 23B, the device adapter module 20 activated in step S10 requests the cache function engine module 26 so as to perform the judgment by the track address registered in the common control information region 56. By receiving the judging request, as shown in steps S12, S13, and S14, the retrieving process of the defective/alternating track management table, the getting of the track address, and the retrieval of the hash table 58 are performed. When there is no registration in the hash table 58 in step S15, the cache function engine module 26 registers the track address into the common control information region 56 and activates the device adapter module in step S16. On the basis of it, the device adapter module 20 reads out the track data of the device 14 and stages into the cache memory 44 in step S17. The retrieving process of the defective/alternating track management table 200 in step S12 by the judging request from the device adapter module 20 has processing contents of a flowchart of FIG. 24. FIG. 24 shows the details of the retrieving process of the defective/alternating track management table 200 which is executed in step S3 in FIG. 23A and in step S12 in FIG. 23B when the judging request is performed from the channel adapter module 16 or device adapter module 20 to the cache function engine module 26 by the designation of the track address. First in step S1, the device status management table 202 is read. In step S2, the flag status is checked from the requested device number. When the flag information is invalid in step S3, step S11 follows. A fact that the track as a target of the retrieval is the defective track and the alternating track exists and the link state is invalid is notified. When the defective/alternating track is valid in step S3, step S4 follows. The defective/alternating track management table 200 is read. The defective track is compared in step S5. When the coincidence of the defective track is obtained in step S6, the flag information of the defective/alternating track is read in step S8. In step S9, a check is made to see if the defective/alternating track is valid or invalid. When the link state indicates that only the link is connected in one direction and is invalid, a fact that the track is the defective track and the alternating track exists and the link state is invalid is notified in step S11. When the defective/alternating track is valid in step S9, step S10 follows and a fact that the track is the defective track and the alternating track exists and the link state is valid is notified. When the defective track doesn't coincide in step S6, step S7 follows. The reading operation of the defective track from the defective/alternating track management table in step S4 and the comparison are repeated until the end of retrieval is discriminated. After completion of the comparing process of the defective track, step S12 follows and the alternating track is read out from the defective/alternating track management table. The alternating track is compared in step S13. When the alternating track coincides in step S14, a fact that the track as a target of the retrieval is the alternating track is notified in step S16. When the alternating track doesn't coincide in step S14, the reading operation from the table is repeated until the comparing processes of all of the alternating tracks are finished in step S15. After completion of the retrieving process, a fact that the track is a normal track instead of the defective and alternating tracks is notified in step S17.

Processes for the judging request from the channel adapter module 16 in step S3 in FIG. 23A for the retrieval result in FIG. 24 are as follows.

I. In the case where the designated track is the defective track and the alternating track exists and the link state is valid (step S10 in FIG. 24), the cache function engine module 26 converts to the alternating track in place of the designated track and executes the confirmation on the cache.

II. In the case where the designated track is the defective track and the alternating track exists and the link state is invalid (step S11 in FIG. 24), the track data in the cache memory is read out while keeping the designated track held, the alternating track address is obtained, the judgment is again requested, and the retrieving process is performed.

III. In the case where the designated track is the normal track instead of the defective and alternating tracks (step S17 in FIG. 24), the confirmation on the cache is performed by the designated track.

IV. In the case where the designated track is the alternating track (step S16 in FIG. 24), the confirmation on the cache is performed by the designated track.

Figure 23B:
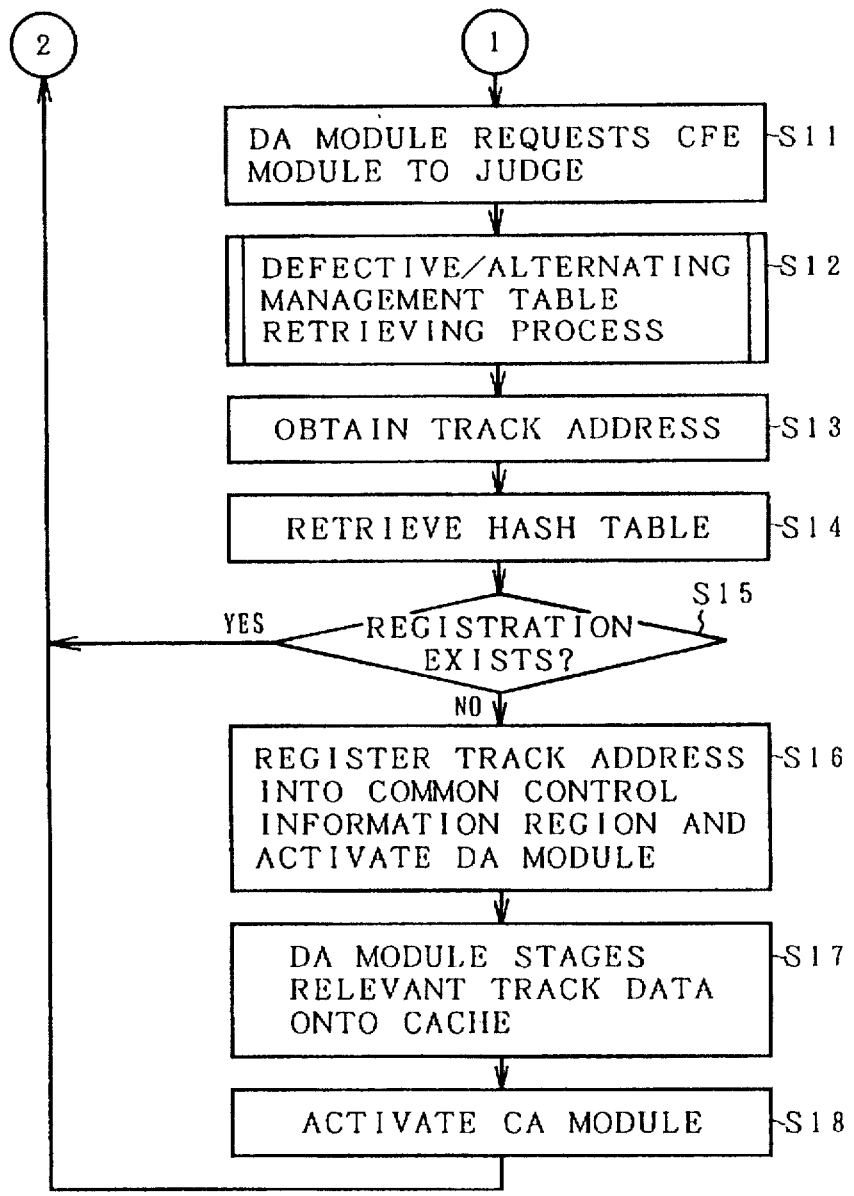
Figure 24:
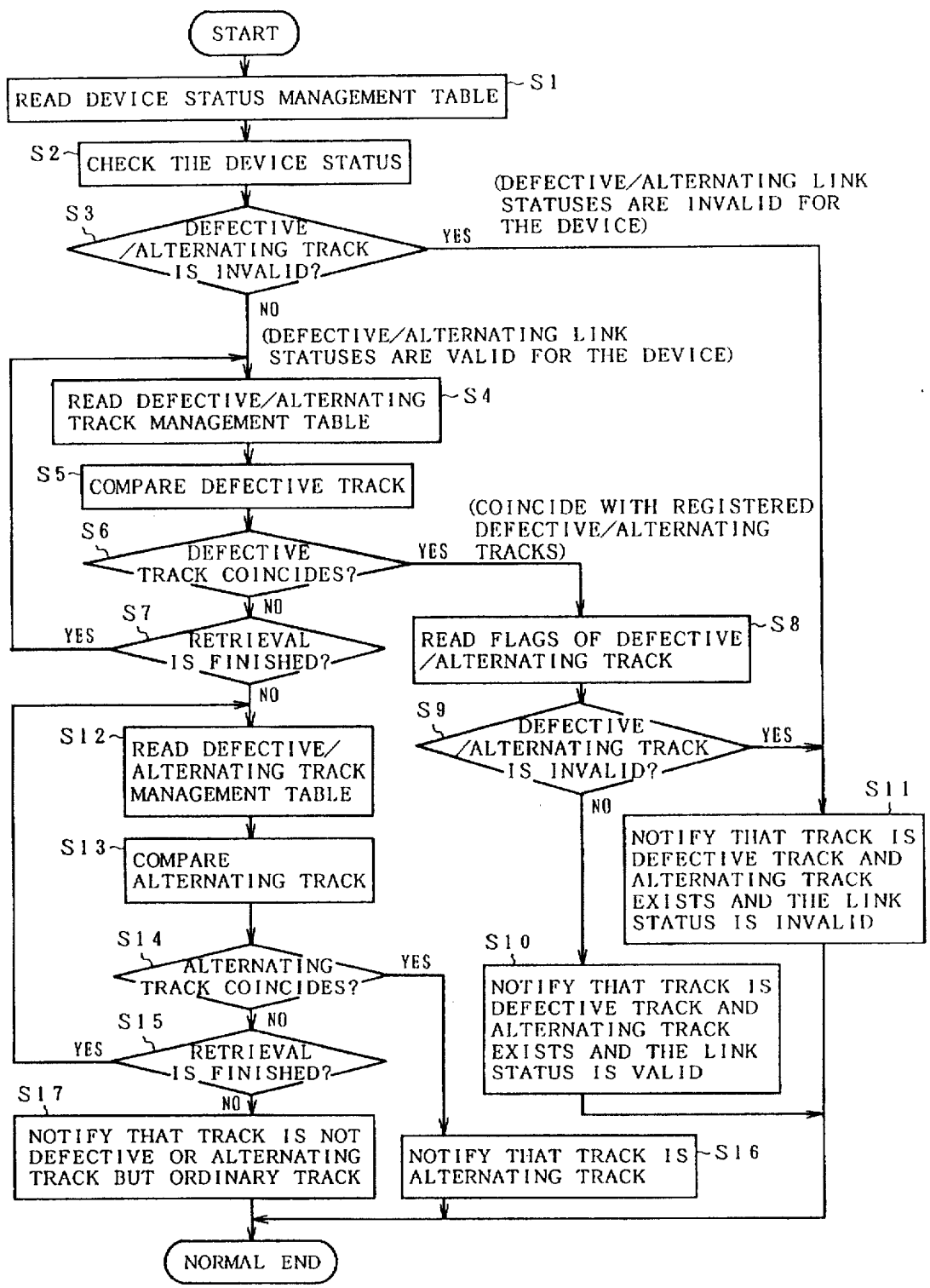
FIG. 24 is a flowchart for a retrieving process of the defective/alternating track in FIGS. 23A and 23B.

The confirmation on the cache denotes that as shown in the flowcharts of FIGS. 23A and 23B, the registration of the hash table 58 is confirmed by each of the converted track addresses and, in the case where the track addresses have been registered, the memory addresses in the cache memory 44 and the converted track addresses are set into the common control information region 56 for CA-DA and, after that, the track status is notified to the channel adapter module 16 by an internal command, thereby allowing the hitting operation to be executed. On the contrary, in the case where the track addresses are not registered in the hash table 58, the track status is likewise notified to the channel adapter module 16 by an internal command. In this case, the caching operation accompanied with the staging from the device 14 in the time charts of FIGS. 7 and 9 is executed.

Even in the case where the retrieving process of the defective/alternating track management table 200 in FIG. 24 was performed by the judging request from the device adapter module 20 in step S12 in FIG. 23B, as for the judgment result, the same processes as those in the cases of the above items I to IV for the judging request from the channel adapter module 16 are executed. The registration of the hash table 58 is confirmed by each of the converted track addresses obtained as results of the above items I to IV. When the track addresses are not registered, the memory addresses held in the cache memory 44 and the converted track addresses are set into the common control information region 56 for CA-DA. After that, the track status is notified to the device adapter module 20 by an internal command. When the device adapter module 20 which received the notification of the track status confirms that the designated track is not registered in the cache memory 44, the module 20 executes a staging process for reading the track data into the cache memory 44 from the device 14. After completion of the staging into the cache memory, the process is again handed to the channel adapter module 16. The channel adapter module 16 executes the hitting operation to the track data, as a target, which was staged in the cache memory 44.

[Synonym Control]

Figure 25:
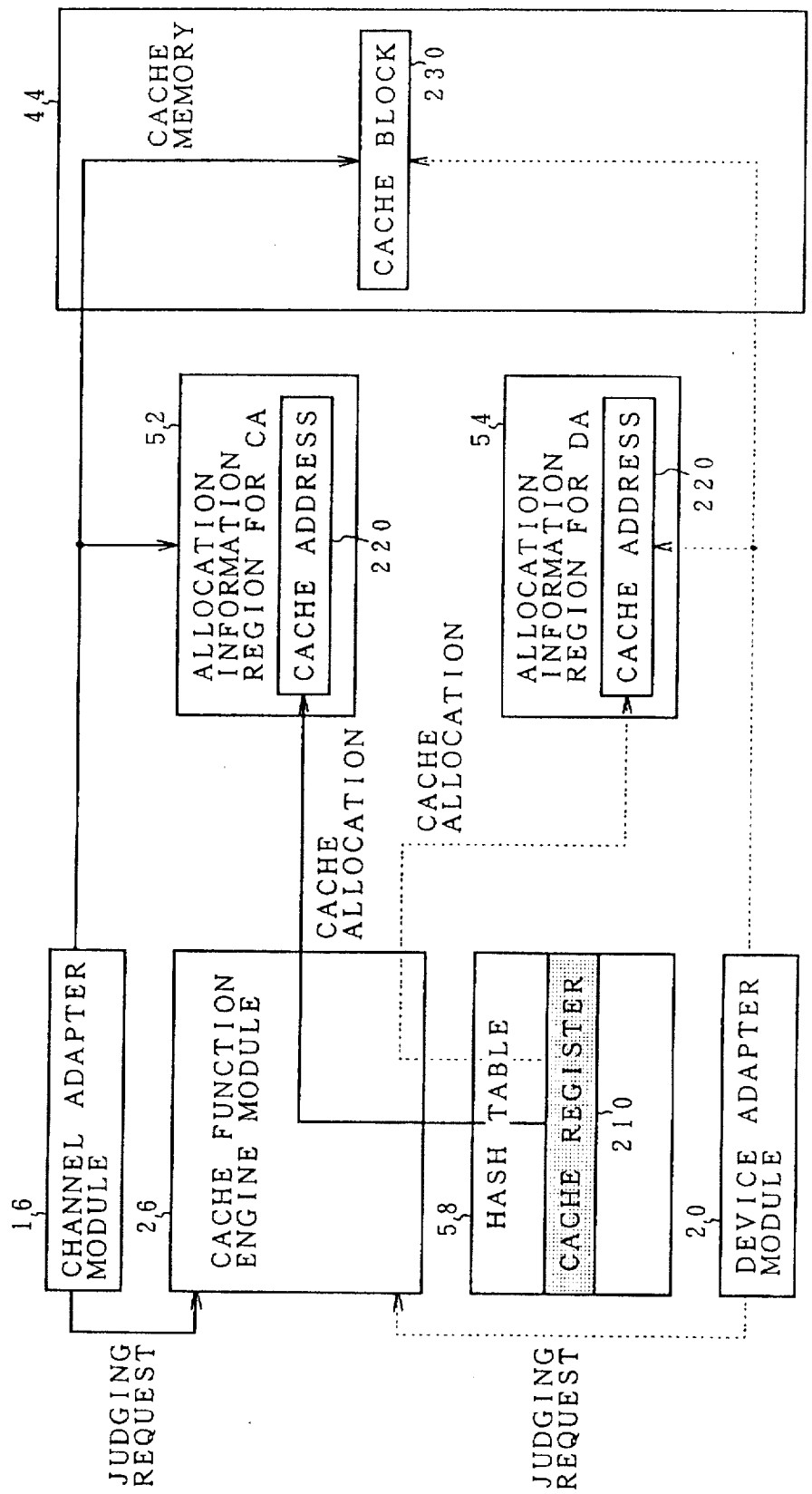
FIG. 25 is an explanatory diagram of the cache allocation by a hash table and the hitting operations of the channel adapter module and device adapter module according to the invention.

FIG. 25 shows the caching operation in the case where the allocation information region 52 for CA only for use by the channel adapter module 16 and the allocation information region 54 for DA only for use by the device adapter module 20 are individually provided. For example, when there is an input/output request to the channel adapter module 16 from the upper apparatus, the track address "CCHD" is designated and a judgment is requested to the cache function engine module 26. By transmitting the designated track address "CCHD" through the hash function, the cache function engine module 26 obtains the hash address and retrieves the registration in the hash table 58. When there is no registration in the hash table 58, a cache allocation shown by a cache block 230 is performed to the cache memory 44. At the same time, a cache registration 210 as shown in FIG. 5 is performed to the hash address in the hash table 58. Subsequently, the device adapter module 20 is activated and as shown by a dotted line, the same track address CCHD is designated and a judgment is requested to the cache function engine module 26. The cache registration 210 is recognized by the retrieval of the hash table 58 by the hash address obtained through the hash function. A cache address 220 which has already been allocated is stored in the allocation information region 54 for DA. The device adapter module 20 refers to the cache address 220 in the allocation information region 54 for DA, stages the track data which was read out from the device into the allocated cache block 230 in the cache memory 44, and sets the flag of the hash table 58 into a hit enable status. After completion of the staging, the channel adapter module 16 is again activated. The cache registration is recognized by the judging request to the cache function engine module 26. When the registration of the cache address 220 is notified to the allocation information region 52 for CA, the channel adapter module 16 knows the cache block 230 in the cache memory 44 with reference to the allocation information region 52 for CA and executes a write hitting operation to write the transfer data from the upper apparatus. As mentioned above, in the cache control of the invention, the channel adapter module 16 and device adapter module 20 execute the data transfer from the upper apparatus to the cache memory 44 and the staging from the device by using the exclusive-use allocation information regions 52 and 54 as if the hitting operation was executed, respectively. In the cache allocating process using the hash table 58, the track address "CCHD" which is sent at random is transmitted through a predetermined hash function, thereby converting into the indirect hash address. However, there is a case where a synonym state in which the hash address obtained by transmitting the different track address "CCHD" through the hash function becomes the same address occurs. When such a synonym state occurs, the cache registration to the hash table 58 cannot be performed. However, the allocation of the cache block 230 in the cache memory 44 can be performed. However, even if the cache block 230 could be allocated, since the hash table 58 cannot be registered, the cache function engine module 26 cannot retrieve the cache address 220 to which the cache block 230 was allocated for the judging request but enters a state in which the allocation of the cache memory 44 to the channel adapter module 16 and device adapter module 20 is impossible. According to the invention, therefore, the caching operation is enabled even in the synonym state of the hash table.

Figure 26:
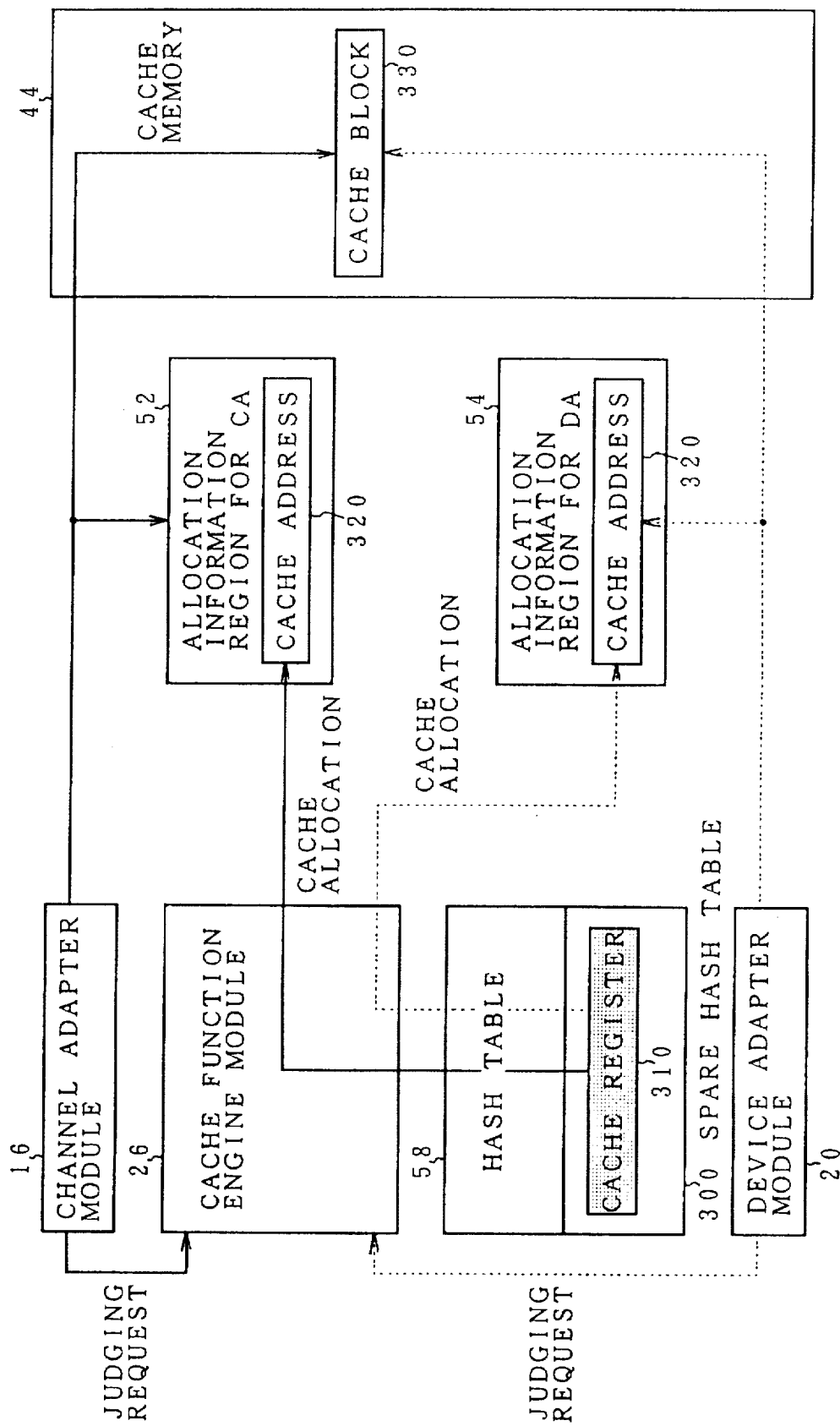
FIG. 26 is an explanatory diagram of the invention having a spare hash table for solving a synonym state of the hash table.

FIG. 26 is a functional block diagram of an input/output control apparatus of the invention having a spare hash table for a recovery for the synonym state of the hash table. The cache function engine module 26 has a spare hash table 300 in addition to the hash table 58. As shown in FIG. 27, in the spare hash table 300, one table region is provided for one device and is designated by the device number. Similar to the ordinary hash table 58 in FIG. 5, as for the contents of the hash table, the hash table has a hash address, a track address "CCHD", a flag indicative of the presence or absence of the hit enable status, and a pointer for the LRU table. Further, a job identifier showing a job code registered in the job table 50 which is managed by the resource manager module 22 in FIG. 5 is newly provided. When the end of job is recognized by the resource manager module 22, the job identifier is notified as an identifier indicative of the end job. When the identifier of the end job is received, it is used to delete the table contents corresponding to the spare hash table 300. As for the allocation of the cache memory 44 by the cache function engine module 26, the hash address is obtained from the track address "CCHD" for the judging request from the channel adapter module 16 and when the hash table 58 is retrieved, if the synonym state in which the two same hash addresses are calculated from the different track addresses is recognized, the spare hash table 300 corresponding to the device number at that time is assured. The allocation of the cache memory 44 using the spare hash table 300 is performed. The cache registration for the spare hash table 300 in the allocation of the cache memory 44 is substantially the same as that in case of the ordinary hash table 58 except that the job identifier at that time is registered. As for the spare hash table 300 in which the cache registration was once performed, when the processes for the series of input/output requests are finished, the registration contents of the spare hash table 300 of the corresponding job identifier are deleted on the basis of an end notification accompanied with the job identifier from the resource manager module 22. On the other hand, as for the caching operation based on the cache registration of the spare hash table 300, a write through control such that with regard to the writing of the transfer data from the channel adapter module 16 in the case where a cache block 330 is allocated to a non-volatile memory region in the cache memory 44, the cache block 330 which was rewritten is not left in the cache memory 44 but is written into the device 14 by activating the device adapter module 20 is executed. By the write through control of the cache memory 44, a writeback unable status to the device in the ordinary writeback process by deleting the cache registration of the spare hash table 300 due to the end of process of the input/output request is avoided. A coherence between the cache memory 44 and the device 14 is maintained.

Figure 28:
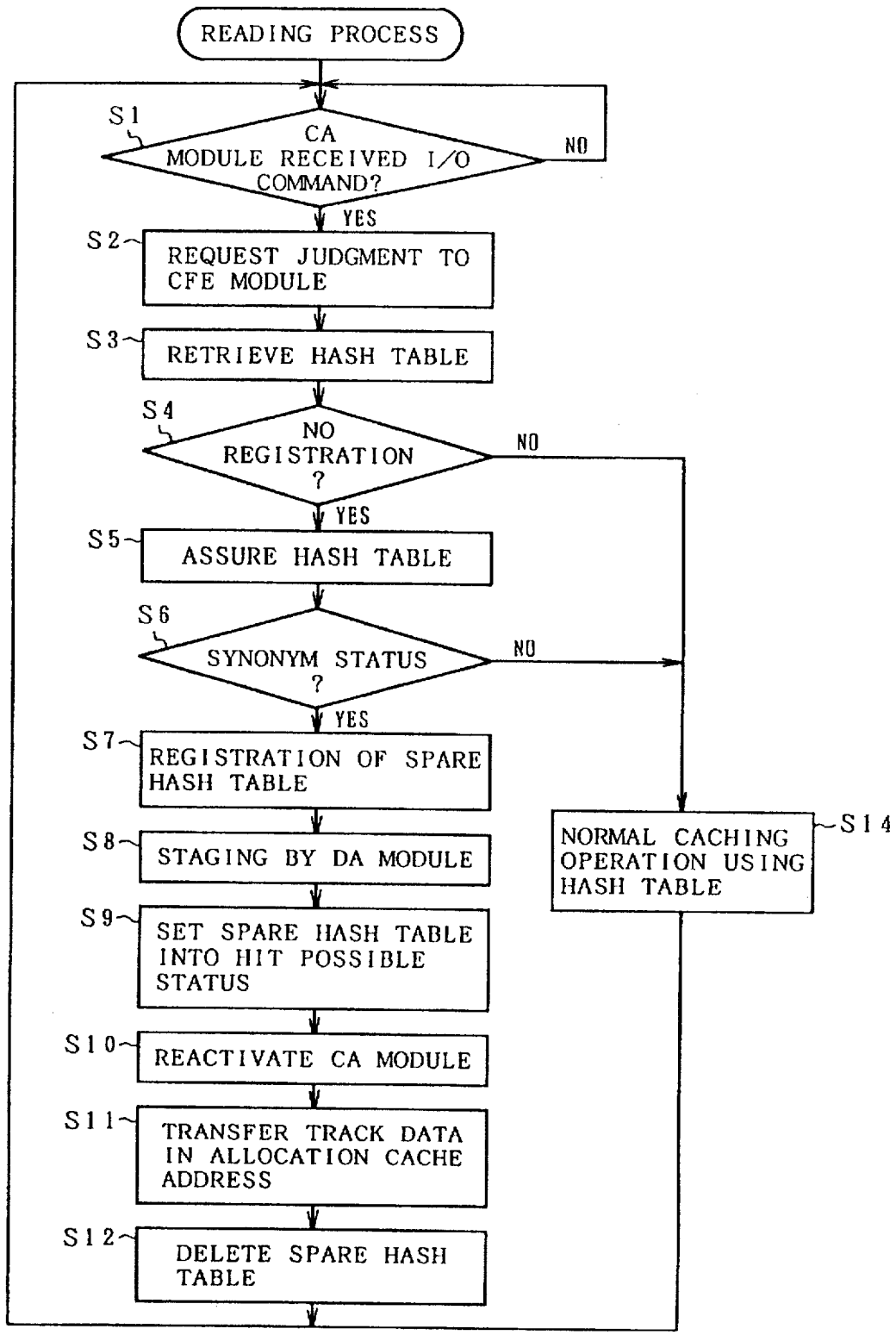
FIG. 28 is a flowchart for a reading process using the spare hash table.

FIG. 28 is a flowchart for a reading process of the caching operation using the spare hash table 300 in FIG. 26. First in step S1, when the channel adapter module 16 receives the input/output command from the upper apparatus, a check is made in step S2 to see if the track data designated by the internal command exists in the cache memory 44. When the judging request is received, the cache function engine module 26 converts the designated track address "CCHD" into the hash address by transmitting through the hash function and retrieves the hash table 58 and spare hash table 300. When the track address is not registered in both of the hash table 58 and spare hash table 300, no registration is judged in step S4. The hash table 58 is assured in step S5. However, now assuming that the synonym state in which the same hash address is obtained with respect to different track addresses occurs, the occurrence of the synonym state is recognized in step S6. In step S7, a cache registration 310, for example, a cache allocation as shown in the cache block 330 in the cache memory 44 is performed with respect to the spare hash table 300 corresponding to the device number designated by the input/output command at that time. When the channel adapter module 16 receives the end notification of the cache allocation of the cache function engine module 26, the module 16 requests the staging to the device adapter module 20 via the resource manager module 22 in step S8. The device adapter module 20 requests the judgment to the cache function engine module 26 by the designated track address "CCHD". Thus, there is executed the staging such that the cache registration 310 of the spare hash table 300 is recognized, an allocated cache address 320 is stored into the allocation information region 54 for DA, and with reference to the cache address 320, the track data in the designated track address is read out from the device 14 and stored into the cache block 330 of the cache memory 44. After completion of the staging by the device adapter module 20, in step S9, the spare hash table 300 is set into the hit enable status. In step S10, the channel adapter module 16 is again activated via the resource manager module 22. The channel adapter module 16 which was again activated performs the judging request by the designated track address "CCHD" to the cache function engine module 26. The cache function engine module 26 recognizes the cache registration 310 of the spare hash table 300 by the retrieval by the hash address and stores as a cache address 320 into the allocation information region 52 for CA. Therefore, in step S11, the channel adapter module 16 recognizes the allocation of the cache block 330 in the cache memory 44 with reference to the cache address 320 in the allocation information region 52 for CA and transfers the track data staged in the cache block 330 to the upper apparatus. After completion of the above processes, the cache function engine module 26 receives the end notification of the data transfer from the channel adapter module 16 by an internal command. At the same time, since the identifier of the end job is notified from the job table by the resource manager module 22. Therefore, a process for deleting the cache registration in the spare hash table of the corresponding job identifier is executed in step S12. A series of input/output processes in association with the reading request are finished. When the hash address has been registered in the hash table 58 in step S4, the reading operation at the time of the ordinary cache hit is performed in step S14. In this case, when the cache address exists in the spare hash table 300, the same processes as those in steps S7 to S12 are executed.

Figure 29:
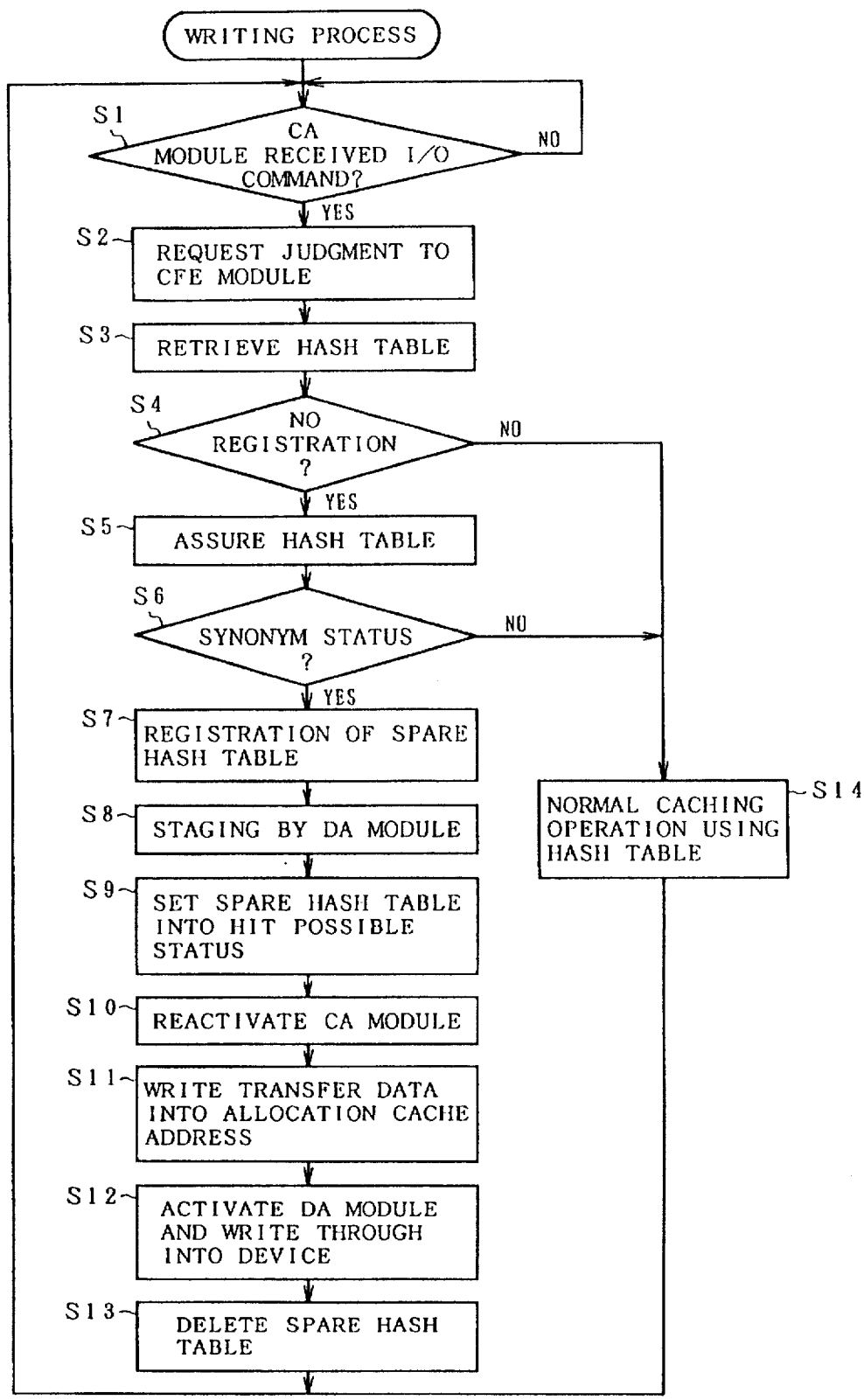
FIG. 29 is a flowchart for a writing process using the spare hash table.

FIG. 29 is a flowchart for the writing process using the spare hash table 300 which is registered in the synonym state of the hash table 58. Even in the writing process, the processes in steps S1 to S9 are the same as those in FIG. 28 such that there is no registration in the hash table and the synonym state occurs and the cache is registered in the spare hash table 300 and, after the staging was performed by the device adapter module, the spare hash table is set into the hit enable status. Subsequently in step S10, the channel adapter module 16 is reactivated. After that, the channel adapter module 16 writes the data into the cache block 330 which was staged in the cache memory 44 by the data transfer. In the ordinary writing operation, the processing routine is finished here. However, in the writing process using the spare hash table 300, further in step S12, a write through control such that the device adapter module 20 is activated and the track data of the cache block 330 is written into the device is executed. Specifically speaking, during the writing operation by the data transfer to the cache block 330 in the cache memory 44 by the channel adapter module 16, an activation for the write through is performed to the device adapter module 20 via the resource manager module 22. The device adapter module 20 which was activated executes the write through operation such that a judgment is requested to the cache function engine module 26 by an internal command, the cache registration 310 of the spare hash table is recognized, the cache address 320 is stored into the allocation information region 54 for DA, the cache block 330 is recognized with reference to the cache address 320, and the track data is read out from the cache memory 44 and written into the device 14. When the data transfer to the device 14 is finished, the device adapter module 20 notifies the end of processes to the cache function engine module 26. Finally, when the end of processes of the device adapter module 20 and channel adapter module 16 is recognized by the resource manager module 22, the end of processes is notified together with the job identifier to the cache function engine module 26. By receiving such a notification, the cache function engine module 26 deletes the cache registration of the spare hash table 300 having the corresponding job identifier. In the embodiment of FIG. 26 as mentioned above, even if the hash table enters the synonym state by the calculation of the hash address for the input/output request, the allocating process of the normal cache memory can be realized. By the storage of the cache allocation information to each of the allocation information regions of the channel adapter module and device adapter module based on the cache allocating process, the channel adapter module and device adapter module can synchronously perform the input/output processes for the cache memory in a state as if it was equivalent to the hit state.

[Preceding Staging]

Figure 30:
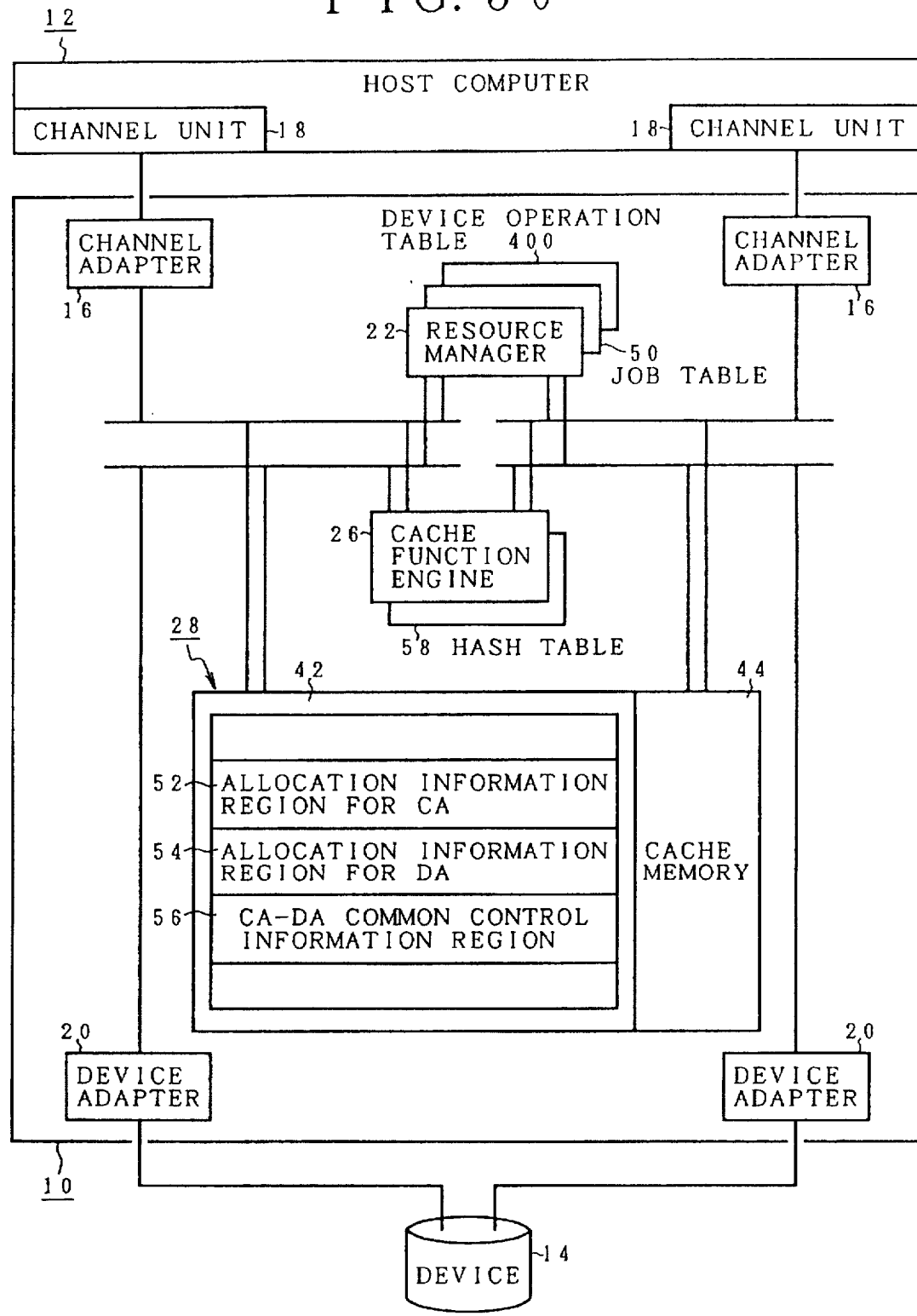
FIG. 30 is a block diagram of a processing function of a preceding staging of the invention.

FIG. 30 is a functional block diagram of a preceding staging in the input/output control apparatus of the invention. In the case where the channel unit 18 of the host computer 12 is based on the CKD command system, a sequential access for requesting an access of a plurality of continuous tracks cannot be declared at the time of the input/output request. Therefore, the input/output requests are sequentially generated form the channel unit 18 having the CKD command system every track data in accordance with the order even in case of the input/output request of the continuous track data. For such an input/output request of the continuous track data from the channel unit 18 as mentioned above, in the disk controller 10 of the invention, the device adapter module 20 discriminates the continuous track addresses by using a device table (Deviced Characteristic Table) 400 provided for the resource manager module 22, thereby judging that the input/output request is a sequential access. The preceding staging for the cache memory 44 is performed from the device 14. In the device operation table 400 provided for the resource manager module 22, a cylinder head value "CCH" as a track address value at the end of the staging is registered from the device 14 into the cache memory 44 by the device adapter module 20 in correspondence to device Nos. #00, #01, . . . as shown in FIG. 31. Therefore, when a staging request is received from the channel adapter module 16 through the resource manager module 22 by a cache mishit, the device adapter module 20 refers to the device operation table 400, reads out the cylinder head value of the track data which has been registered in correspondence to the designated device number and in which the preceding staging was performed, and compares with the cylinder head value as a track address designated by the present staging request. By this comparison, when the present cylinder head value is larger than the preceding cylinder head value by "+1", namely, when the cylinder head values are continuous, it is judged that the input/output request is a sequential access. When the device adapter module 20 discriminates the sequential access by referring to the device operation table 400, after completion of the staging which is at present requested, the continuous preceding stagings of a predetermined number (M) of tracks, for example, (M=3 tracks) are executed from the device 14 to the cache memory 44. Prior to the preceding staging, when the judging request is performed to the cache function engine module 26, the cache allocation for the staging of the track data which is at present requested and the cache allocation for the (M) track data in order to correspond to the sequential access which is subsequently performed are obviously executed.

In the device operation table 400 in FIG. 31, when the staging from the device 14 to the cache memory 44 is finished by the device adapter module 20, the registration contents are updated to the present cylinder head value after the end of the process. This process corresponds to the process in case of a mishit in which the requested track data doesn't exist in the cache memory 44. On the other hand, when the track data requested from the channel unit 18 exists in the cache memory 44, after completion of the input/output process for the track data in the cache memory 44 by the channel adapter module 16, the notification from the channel adapter module 16 is received. The resource manager module 22 updates the cylinder head value in the device operation table 400.

Further, the hash table 58 provided for the cache function engine module 26 has a table structure of FIG. 32 in correspondence to the preceding staging of the invention. Although the hash address, track address "CCHD", flag, and pointer in the hash table 58 are the same as those in the embodiment of FIG. 5, a registration area of a preceding staging identifier is newly provided for performing the preceding staging. When the continuous preceding stagings of (M) tracks which have been preset by the device adapter module 20 are finished, the cache allocation of the last Mth track data is set to "1" and registered in the registration area of the preceding staging identifier. For example, assuming that subsequent to the input/output request of a track TR0, the input/output request of the track of No. 1 is performed by the device adapter module 20 and, subsequent to the input/output request of a track TR1, the sequential access is discriminated from the continuous track addresses, the preceding stagings of (M=3 tracks) including the track TR1 are executed. When the staging of a last track TR3 is finished, the preceding staging identifier of a hash address A3 of "CCHD" of the track TR3 is set to "1", thereby indicating that the track data in the cache memory 44 that is designated by the hash address A3 is the last track data which was subjected to the preceding staging. By the preceding staging in which a partial access was discriminated, when the cache registration of the tracks TR1 to TR3 of the hash addresses A1 to A3 in the hash table 58 can be performed, with respect to the track TR1 that is being processed at present, the cache hitting operation is performed by the reactivation of the channel adapter module 16. The channel adapter module 16 executes the input/output process for the track data, as a target, corresponding to the cache memory 44. Subsequently, when the input/output request of the track TR2 is received, a cache hit status similarly occurs and the data transfer for the cache memory 44, as a target, by the channel adapter module 16 is executed. When there is an input/output request of the last track TR3, the channel adapter module 16 similarly transfers the track data in the cache memory 44. After completion of the data transfer, it is recognized that the preceding staging identifier has been set to "1". A next preceding staging is requested to the device adapter module 20 via the resource manager module 22. Namely, when the sequential accesses of the number exceeding the number (M) of tracks of one preceding staging are executed, the preceding staging identifier registered in the hash table 58 is used to repetitively perform the preceding staging for every (M) tracks.

Figure 33:
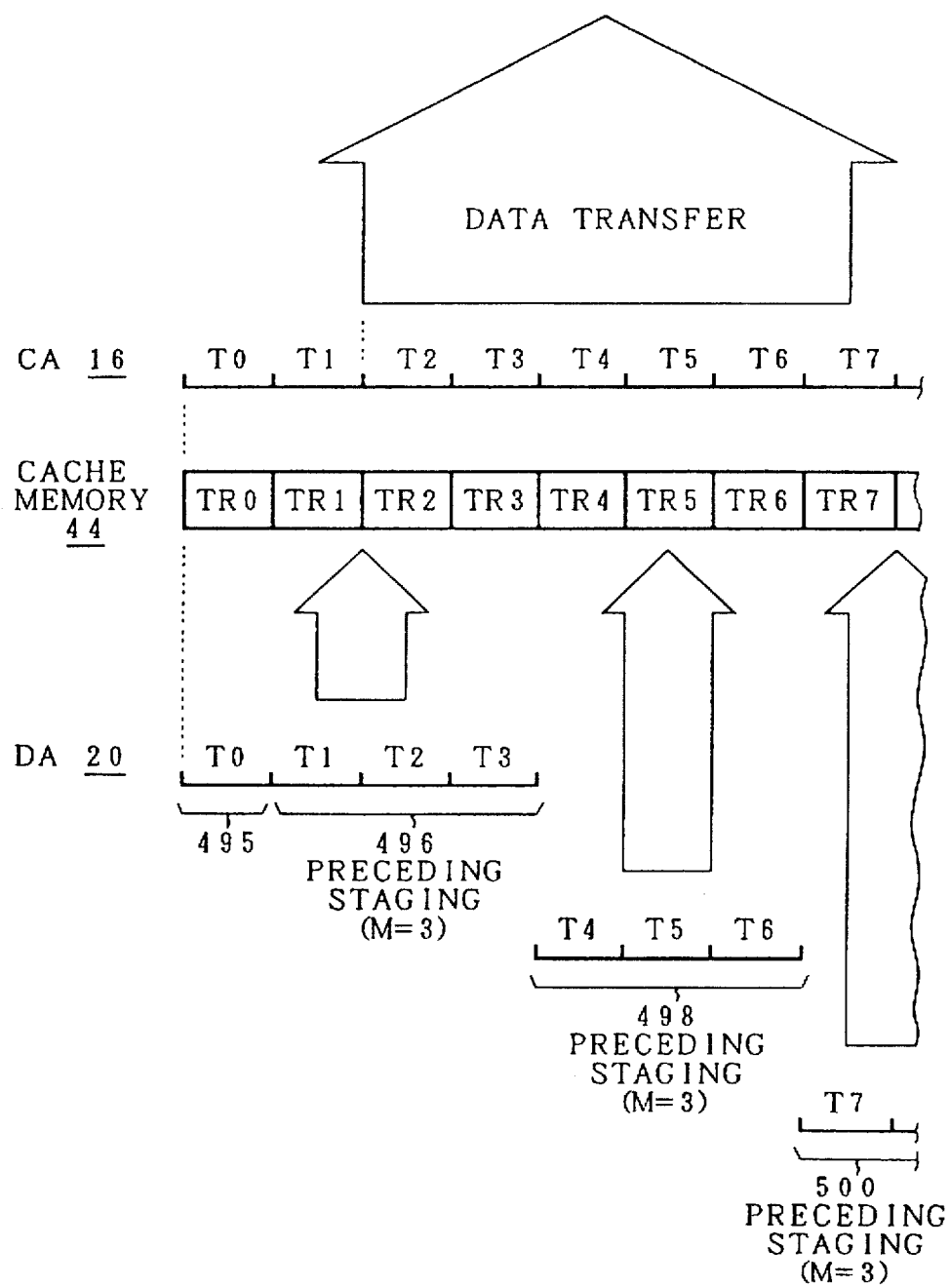
FIG. 33 is a time chart for a preceding staging in a sequential access of tracks TR0 to TR7.

FIG. 33 shows a data transfer and timings among the device adapter module 20, cache memory 44, and channel adapter module 16 in the case where partial accesses of, further, tracks TR4 to TR7 including the continuous tracks TR0 to TR3 in the hash table 58 in FIG. 32 are executed. For the continuous sequential input/output requests of the tracks TR0 to TR7 from the upper channel unit 18, at a first period T0, the device adapter module 20 executes the staging of the data of the track TR0 for the cache memory 44. At a next period T1, when a staging request is performed to the device adapter module 20, by referring to the device operation table 400 of the resource manager module 22, a continuity is judged from the present staging track TR1 for the preceding staging track TR0. A preceding staging 496 of (M=3) is executed. After completion of the staging of the track TR3 of (M=3) at a period T3, as shown in FIG. 32 at this stage, the preceding staging identifier of the track TR3 of the hash table 58 is set to "1". On the other hand, at periods T0, T1, T2, and T3 of the channel adapter module 16, the staging is executed asynchronously with that on the device adapter module 20 side. When the track data of the track TR3 is transferred from the cache memory 44 at a period T4, the preceding staging identifier 1 stored in the area of the track TR3 in the hash table 58 in FIG. 32 is recognized. A preceding staging 498 of next (M=3 tracks) is requested to the device adapter module 20. Thus, the device adapter module 20 executes the preceding staging 498 of (M=3 tracks) shown at periods T4 to T6. Subsequent to the preceding staging 498, the channel adapter module 16 sequentially transfers the track data of the corresponding tracks TR4 to TR6 to the upper channel unit 18 from the cache memory 44. Similarly, by receiving an activation request by the end of staging at a period T6, the device adapter module 20 likewise repeats a preceding staging 500 of (M=3 tracks) from a period T7.

Figure 34:
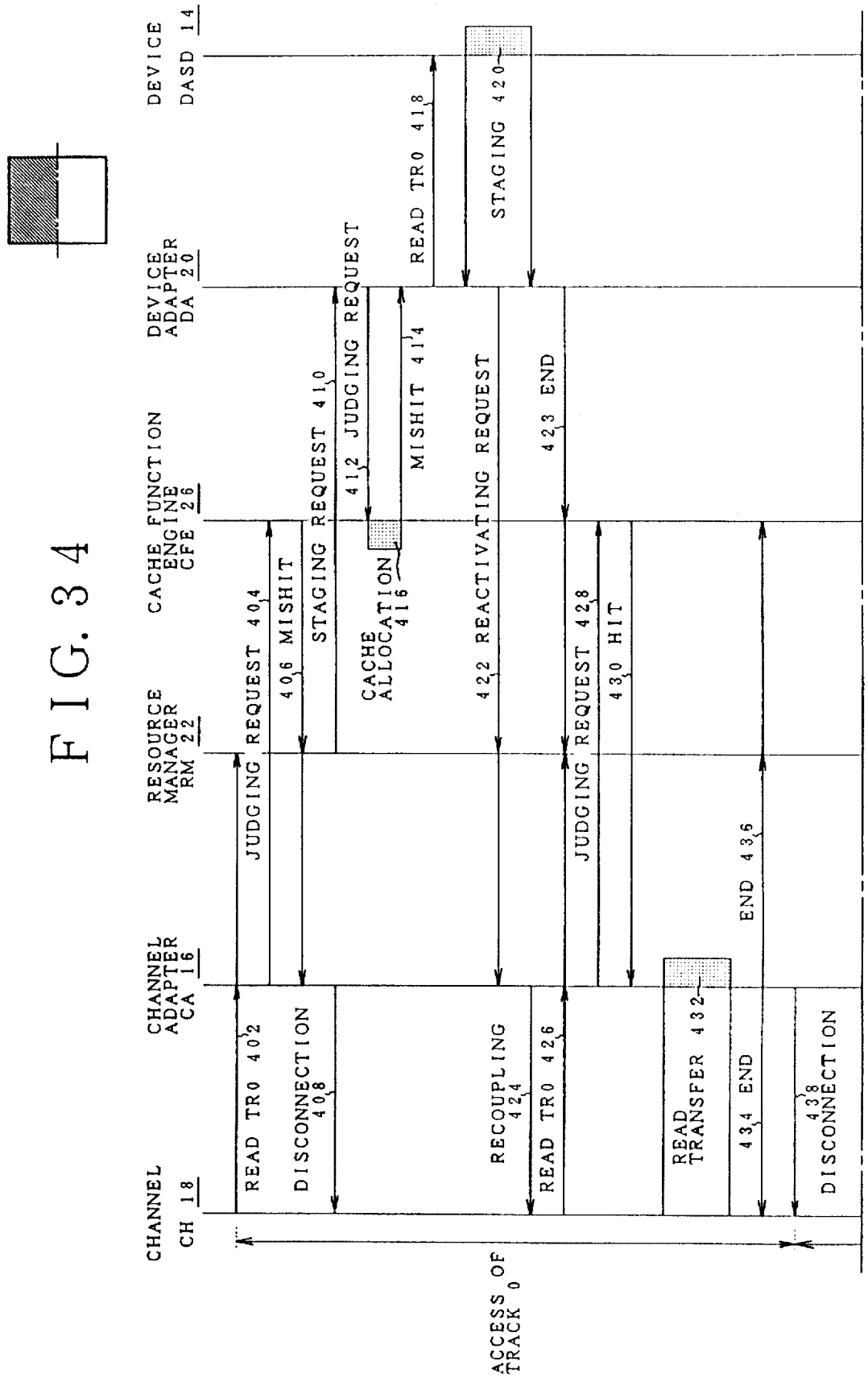
FIG. 34 is a time chart for a preceding staging process in FIG. 30.
Figure 34A:
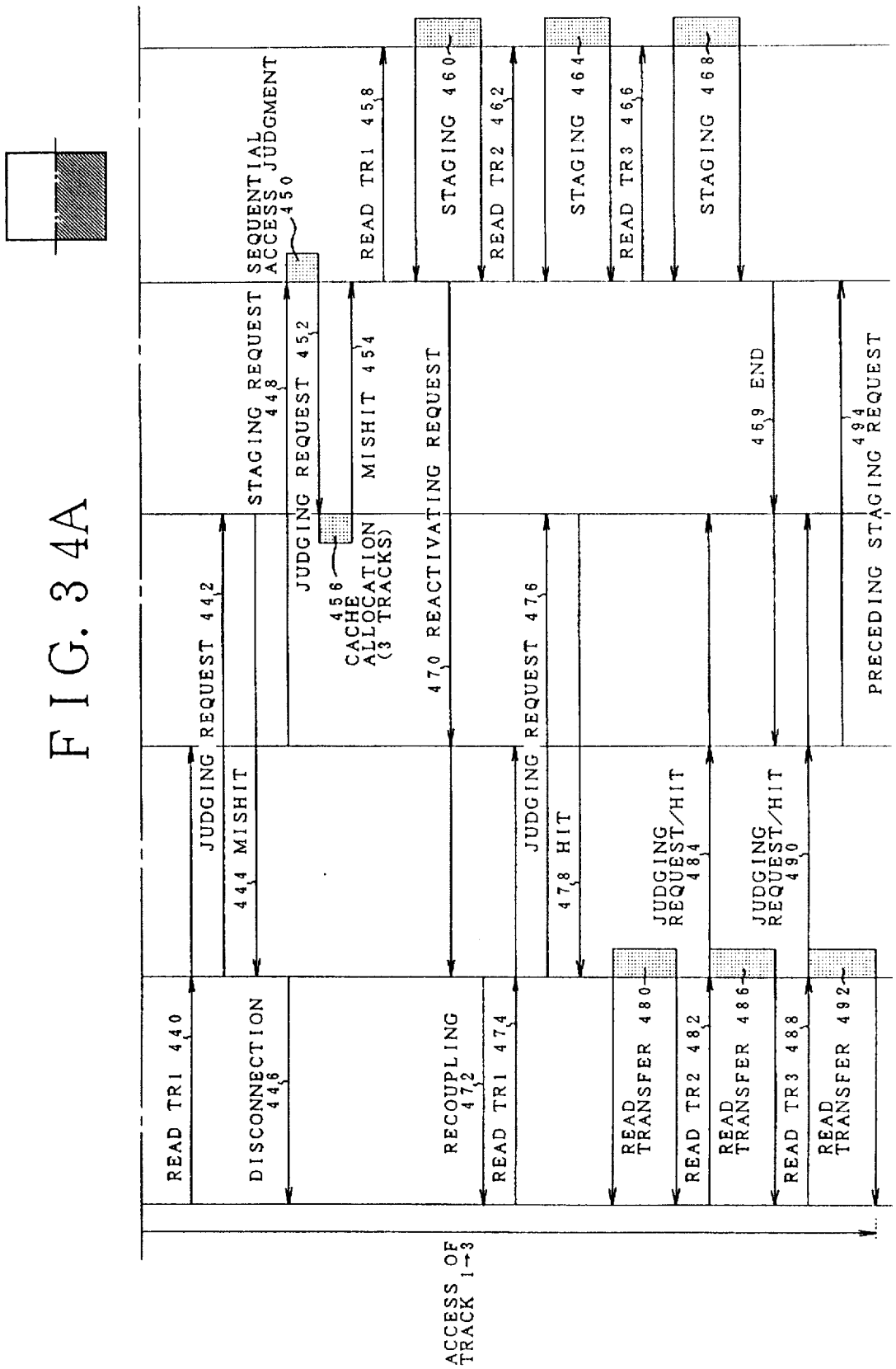

FIG. 34 is a time chart for a control process of the preceding staging in the disk controller 10 in FIG. 30. First, it is assumed that the reading request is continuously performed from the channel CH18 as input/output requests of the tracks TR0 to TR3. It is also assumed that each of the track data of the tracks TR0 to TR4 doesn't exist in the cache memory 44. The channel unit 18 performs a reading request 402 of the track No. TR0 to the channel adapter module 16. The reading request 402 is also notified to the resource manager module 22 and a corresponding job TR is registered into the job table 50. The channel adapter module which received the reading request 402 executes a judging request 404 to the cache function engine module 26. In the cache function engine module 26, the track address "CCHD" in which the hash table 58 was designated by the input/output request is retrieved by the hash address obtained through the hash function. In this case, since the track data of the track TR0 doesn't exist in the cache memory 44, a mishit 406 is responded. In response to it, the channel adapter module 16 performs a disconnection 408 from the channel unit 18. The channel adapter module 16 which received the response of the mishit 406 performs a staging request 410 to the device adapter module 20 via the resource manager module 22 by an internal command. The device adapter module 20 performs a judging request 412 to the cache function engine module 26 by the requested track address "CCHD". The cache function engine module 26 responds a mishit 414 by the retrieval of the hash table 58 by the hash address obtained through the hash function. In this instance, the cache allocation to store the track data of the track TR0 is performed to the hash table 58. A cache allocation 416 includes a registration of the cache address after completion of the allocation to the allocation information region 54 for DA in FIG. 32. The channel adapter module 20 which received the response of the mishit 414 performs a reading request 418 of the track TR0 to the device 14 on the basis of the cache address in the allocation information region 54 for DA and the track address "CCHD" of the device 14 which was designated by the staging request. A staging 420 of the track data of the track TR0 is started from the device 14. When a predetermined amount of data is staged by the staging 420, a reactivating request 422 is performed from the device adapter module 20 to the channel adapter module 16 via the resource manager module 22. Thus, the channel adapter module 16 performs a recoupling 424 with the channel unit 18 and a reading request 426 of the track TR0 is again generated. The channel adapter module 16 which received the reading request 426 of the track TR0 at the second time executes a judging request 428 to the cache function engine module 26. At this time, since the hash table 58 is in the cache allocating state of the track TR0, a response of a hit 430 is obtained. The flag of the cache allocation of the track TR0 of the hash table 58 is set to the hit enable status by receiving an end 423 of staging 420. Simultaneously with the response of the hit 430, the cache function engine module 26 registers the cache address allocated to the track TR0 into the allocation information region 52 for CA in FIG. 32. Therefore, the channel adapter module 16 which received the response of the hit 430 recognizes the data position of the track TR0 in the cache memory 44 with reference to the cache address in the own allocation information region 52 for CA and executes a read transfer 432 of the track data of the track No. TR0 in a state as if it was the same as the cache hit. When the read transfer 432 is finished, an end 434 is performed to the channel unit 18. At the same time, an end 436 is performed to the resource manager module 22 and cache function engine module 26. A disconnection 438 is executed and the access of the track TR0 is finished. When the end 423 of the staging 420 is notified to the resource manager module 22 by the device adapter module 20, the track address value in the area of the relevant device number in the device operation table 400 provided for the resource manager module 22, namely, the cylinder head value "CCH" is updated to the value of the track TR0 after completion of the staging. Subsequently, the channel unit 18 generates a reading request 440 of the track TR1. With respect to this reading request 440 as well, in a manner similar to the case of the track TR0, a judging request 442 is performed and it causes a mishit 444 and a disconnection 446 from the channel is performed. In response to the mishit 444, a staging request 448 is performed to the channel adapter module 20. The channel device adapter module 20 which received the staging request 448 reads the cylinder head value "CCH" which was registered by the preceding sequential access from the area of the relevant device number in the device operation table 400 of the resource manager module 22. The read cylinder head value "CCH" is compared with the cylinder head value "CCH" of the track No. TR1 of the staging request 448 that was requested at this time. Since the present cylinder head value is larger than the preceding cylinder head value by "+1", a sequential access judgment 450 is executed. The device adapter module 20 subsequently performs a judging request 452 to the cache function engine module 26. By receiving the judging request 452, the cache function engine module 26 converts the track addresses of a predetermined number (M=3 tracks) including the track TR1 that is requested at present into the hash addresses by transmitting the hash function and retrieves the hash table 58. In this case, since no registration exists in the hash table 58 with respect to all of the tracks TR1 to TR3, the cache allocation as many as three tracks is executed. Further, the cache addresses in the cache memory 44 to store the track data of three tracks TR1 to TR3 obtained by the cache allocation are registered into the allocation information region 54 for DA in FIG. 30. After completion of a cache allocation 456, a mishit 454 is notified to the channel adapter module 20. The channel adapter module 20 executes a reading request 458 for staging the track data of the first track TR1 to the device 14. A staging 460 of the track data of the track TR0 is performed. During the staging 460, a reactivating request 470 to the channel adapter module 16 is executed via the resource manager module 22. A reading request 474 of the track TR1 is again executed by the channel unit 18 via a recoupling 472. In the channel adapter module 20, when the staging 460 of the track No. TR1 is finished, a reading request 462 of the track TR2 is subsequently performed. After completion of a staging 464, when a reading request 466 of the track TR3 is executed, a staging 468 is performed. After completion of the stagings 460, 464, and 468 of the three continuous tracks, an end 469 is performed to the cache function engine module 26 and resource manager module 22. The setting of the cache hit status and the updating of the device operation table 400 are performed. In the channel adapter module 16, a judging request 476 is performed to the cache function engine module 26 for the reading request 474 of the track TR1 by the recoupling 472. In this instance, since the cache registration has been finished, a response to a hit 478 is obtained. In association with the response of the hit 478, the cache address of the track No. TR1 is registered into the allocation information region 52 for CA in FIG. 30. Therefore, the channel adapter module 16 recognizes that the cache address of the track No. TR1 in the allocation information region 52 for CA exists at the position of the track data in the cache memory 44, and executes a read transfer 480 to the channel unit 18. After completion of the read transfer 480, a reading request 482 of the next track TR2 is performed. In a manner similar to the case of the reading request 474 of the track TR1, a read transfer 486 is executed through a process of a judging request/hit 484. Further, when a reading request 488 of the track TR3 is received, a judging request/hit 490 is similarly obtained and a read transfer 492 is performed. When the cache function engine module 26 retrieves the hash table by the judging request for the reading request 488, the preceding staging identifier in the registration area of the track TR3 is set to "1" as shown in FIG. 32. Therefore, the cache function engine module 26 performs a preceding staging request 494 to the channel adapter module 20 via the resource manager module 22. The device adapter module 20 which received the preceding staging request 494 executes the staging to the cache memory 44 from the device 14 of the track data of the continuous track Nos. TR4 to TR6 in a manner similar to the case of the preceding staging of the tracks TR1 to TR3. When the input/output request by the partial access from the channel unit is finished, there is a possibility such that the staging of up to (M=3 tracks) has been additionally performed. However, after the staging of three times was finished, since the device path is opened, an influence on the next staging can be minimized.

Figure 35:
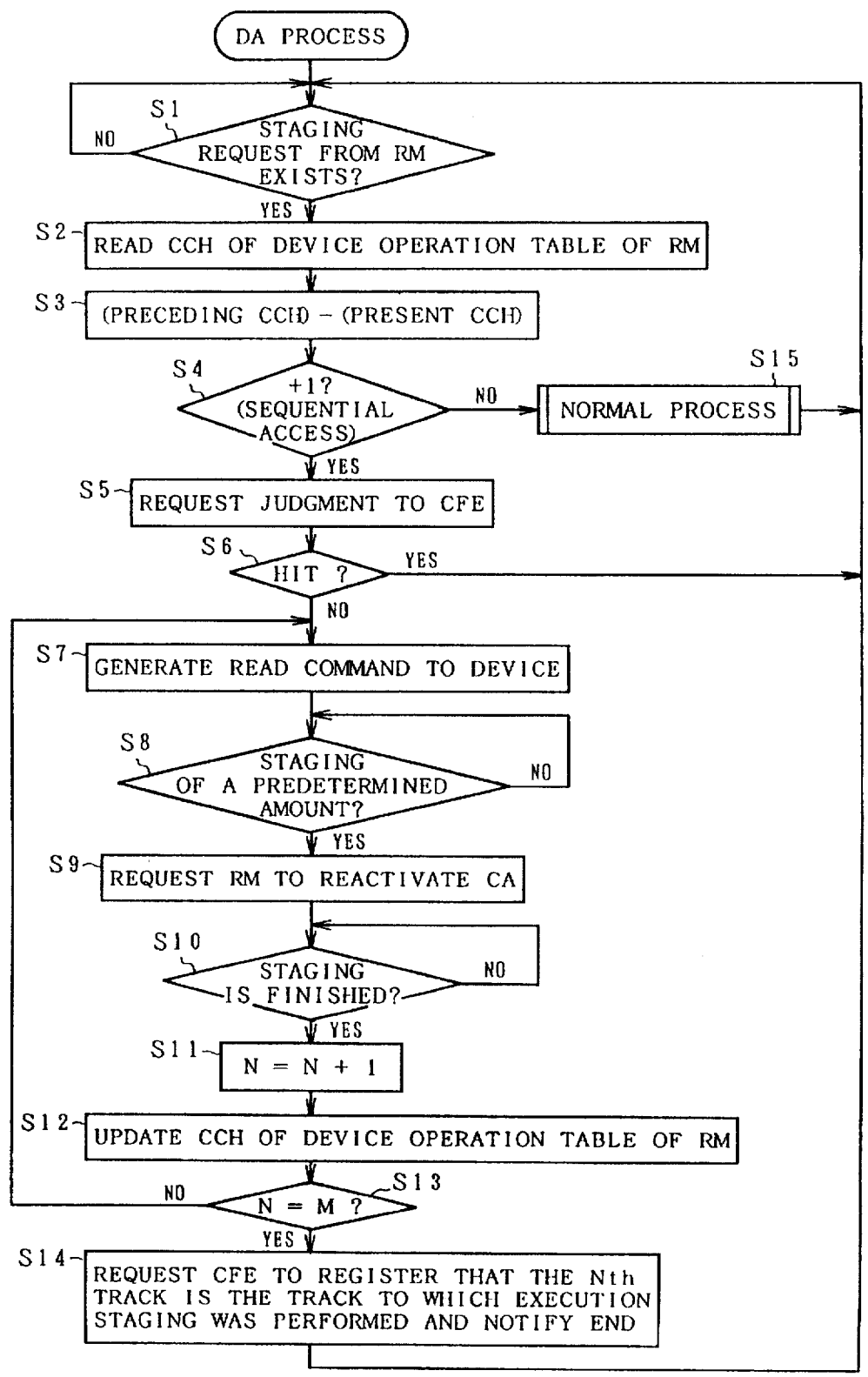
FIG. 35 is a flowchart for the preceding staging process of the device adapter module in FIG. 30.

FIG. 35 is a flowchart for the processing operation of the device adapter module 20 to execute the preceding staging process in FIG. 30. First in step S1, when a staging request is received from the resource manager module 22, the cylinder head value "CCH" in the device operation table 400 of the resource manager module 22 is read in step S2. A difference between the preceding and present cylinder head values is obtained in step S3. When the difference is equal to +1 in step S4, it is judged that the input/output request is the sequential access. When it is judged to be the sequential access, in step S5, the judging request of the track address to which the staging request was performed is executed to the cache function engine module 26. In step S6, when no hit is obtained, a read command is generated to the device 14 in step S7 and the staging is started. During the staging, a check is made in step S8 to see if the staging of a predetermined amount is executed. If YES, a reactivation is requested to the channel adapter module 16 via the resource manager module 22 in step S9. When the end of staging is judged in step S10, step S11 follows and a count value (N) of a counter to count the number of times of preceding staging is set to (N+1). The counter (N) is set to 0 in the initial state and is set to (N=1) by the first staging. In subsequent step S12, the cylinder head value in the device operation table 400 of the resource manager module 22 is updated to the present value in association with the end of staging. In step S13, a check is made to see if the number (N) of times of preceding staging has reached a predetermined value (M), for example, (M=3). If NO, step S7 follows and the read command of the next track address is generated to the device 14. By repeating the staging operations in steps S7 to S12, when it is assumed that the number (N) of times of staging coincides with the predetermined value (M) in step S13, the registration of the preceding staging identifier into the area of the hash table 58 of the track data in which the Nth (= Mth) staging was performed is requested to the cache function engine module 26 and the end is notified in step S14. When the difference between the preceding and present values is not equal to +1 in step S4, since the input/output request is not the sequential access, step S15 follows. The ordinary staging process of a track unit is performed. The ordinary staging process is as shown in the flowchart of FIG. 12. In the hit status in which the track data exists in the cache in step S6, the staging after step S7 is not performed.

In the embodiment of FIG. 30, the CKD command system has been described as an example of a command system in which the sequential access cannot be performed. However, another proper command system can be also used. With respect to the command system in which the sequential access can be declared, it is also possible to substantially similarly cope with such a system without particularly recognizing the declaration of the sequential access. In this case, for the number of continuous tracks designated by the declaration of the sequential access, according to the invention, it is limited to the staging of a predetermined number (M) of tracks, for example, continuous (M=3) times. A situation such that the excessive sequential access is executed in the command system in which the sequential access can be declared and the device path enters a busy status can be avoided.

[Selection of Device Path]

FIG. 36 shows an embodiment of a selecting process in the case where a plurality of device paths for the disk array control as a device which is used in the input/output control of the invention are provided. In the disk controller 10, two device paths 602-1 and 602-2 using, for example, SCSI buses are coupled to the disk array control logics 34-1 and 34-2. The disk array control logics 34-1 and 34-2 individually have the cache mechanisms 36-1 and 36-2. The disk array control logics 34-1 and 34-2 have a preceding staging function such that when it is judged that commands which are continuously sent from the device adapter modules 20-1 and 20-2 are the sequential access, before the next command comes, the track data in which the access is requested next is staged for the cache mechanisms 36-1 and 36-2. In this case, if the resource manager module 22 selects the device adapter module 20 of the device path in the vacant state and generates a command, the data in the cache which was staged cannot be used and an efficient device process cannot be performed. Therefore, in the case where the process for the disk array unit 14-1 is sequential, by first continuously accessing by using the device path which accessed the device, the disk processing speed is raised. Therefore, a path number 604 of the device path which generated the command to the device for the first time of the sequential access is registered in a task control block table 600 of the resource manager module 22. When the access to the device from the disk controller 10 is sequential, a sequential flag 606 indicative of such a fact is set into the task control block table 600. Therefore, the path number 604 of the selected device path, for example, the path number of the device path 602-1 and the sequential flag 606 are registered into the task control block table 600 of the resource manager module 22 at the first time of the sequential access for the device. With respect to the second and subsequent times, the resource manager module 22 selects the same device path 602-1 by referring to the path number 604 of the task control block table 600 and continuously accesses to the disk array control logic 34-1 which generated the command for the first time. Therefore, the data in the cache which was precedingly staged into the cache mechanism 36-1 is effectively used and the efficient device process can be performed.

Although the above embodiment has been shown and described with respect to the example of the disk array unit using the magnetic disk drive as a device, a proper direct access device such as optical disk drive, magnetic tape drive, or the like can be also used. Although one host computer has been used as an example of the upper apparatus on the channel adapter side, by increasing the number of channel adapters, input/output controls with a plurality of host computers can be also performed. Further, the present invention is not limited by the numerical values shown in the embodiment.

What is claimed is:

1. An input/output control apparatus which has a channel adapter module coupled to a channel unit, a device adapter module coupled to a device, and a cache control module for managing a cache memory on the basis of a hash table and asynchronously executes an input/output control between said channel unit and said cache memory by said channel adapter module and an input/output control between said cache memory and said device by said device adapter module via a resource manager module, wherein:

said cache control module has a control unit for controlling in a manner such that in the case where no track data exists in the cache memory for an inquiry from said channel adapter module, a mishit is responded to said channel adapter module and, further, a storage area of the track data is newly allocated to the cache memory and information in said storage area is stored into an information region only for use by said channel adapter module and in the case where no track data exists in the cache memory for an inquiry from said device adapter module, a mishit is responded to said device adapter module and, further, a storage area of the track data is newly allocated to the cache memory and information in said storage area is stored into an information region only for use by said device adapter module;

said channel adapter module has a control unit for controlling in a manner such that when the mishit response is received from said cache control module, a staging is requested to said device adapter module via said resource manager module, the channel unit is disconnected, when a reactivation request from said device adapter module is received during the staging, said channel adapter module is recoupled to the channel unit and inquires of said cache control module, and in the case where a hit response and a response indicative of a state during the staging are obtained, an input/output to/from the channel unit is executed in parallel with the staging of said device adapter module while confirming an amount of staged data with reference to a common control information region of said channel adapter module and said device adapter module; and said device adapter module has a control unit for controlling in a manner such that when the mishit response is received from said cache control module, said device adapter module requests said device to read track data and to stage the track data into said cache memory, and when an amount of data obtained by said staging reaches a predetermined value, a reactivation is requested to said channel adapter module via said resource manager module.

2. An apparatus according to claim 1, wherein said control unit of said device adapter module notifies an end of the staging to said cache control module, thereby setting contents of said hash table corresponding to the track data which was staged into a hit enable status.

3. An apparatus according to claim 1, wherein said control unit of said channel adapter module notifies an end of the input/output control with said channel unit to said cache control module, thereby setting link information of an LRU control into contents of an LRU table corresponding to the track data which was inputted and outputted.

4. An apparatus according to claim 3, wherein when the link information of the LRU control is set into said hash table, in the case where another track data in a write hit status is swept out, said control unit of said cache control module requests said device adapter module to write said swept-out data into said device via said resource manager module.

5. An apparatus according to claim 1, wherein said channel adapter module, said device adapter module, said cache control module, and said resource manager module are connected to a common memory through a bus, said common memory is divided into a main storage and a cache memory, and the exclusive-use allocation information region for the channel adapter module, the exclusive-use allocation information region for said device adapter module, and the common control information region of said channel adapter module and said device adapter module are allocated to said main storage.

6. An apparatus according to claim 5, wherein said cache memory is constructed by a non-volatile memory and a volatile memory, the track data in which a write hit occurred is stored into said non-volatile memory, and the track data in which a read hit occurred is stored into said volatile memory.

7. An apparatus according to claim 1, wherein a data transfer speed between said device adapter module and said device is sufficiently higher than a data transfer speed between said channel unit and said channel adapter module.

8. An apparatus according to claim 1, wherein said device is a disk array unit.

9. An apparatus according to claim 8, wherein said disk array unit has a plurality of ranks each of which is constructed by disk modules connected to a plurality of ports.

10. An apparatus according to claim 8, wherein said disk array unit is connected by two paths through at least two device adapter modules.

11. An apparatus according to claim 9, wherein said disk array unit is constructed by a control module and a disk array having a plurality of disk modules, and said control module has a cache mechanism.

12. An input/output control method of an input/output control apparatus which has a channel adapter module coupled to a channel unit, a device adapter module coupled to a device, and a cache control module for managing a cache memory on the basis of a hash table and asynchronously executes an input/output control between said channel unit and said cache memory by said channel adapter module and an input/output control between said cache memory and said device by said device adapter module via a resource manager module, wherein:

for an inquiry of a cache status from said channel adapter module based on an input/output request of the channel unit, in the case where no track data exists in the cache memory, said cache control module responds a mishit to said channel adapter module and, further, newly allocates a storage area of the track data into the cache memory and stores information in said storage area into an information region only for use by said channel adapter module;

said channel adapter module which received the mishit response from said cache control module requests a staging to said device adapter module via said resource manager module and disconnects the channel unit;

said device adapter module which received the staging request from said channel adapter module side inquires of said cache control module a cache status;

in the case where no track data exists in the cache memory, said cache control module which received the inquiry from said device adapter module responds a mishit to said device adapter module and, further, newly allocates a storage area of the track data to the cache memory and stores allocation information in said storage area into an allocation information region only for use by said device adapter module;

said device adapter module which received the mishit response from said cache control module requests said device to read the track data and to stage the track data into said cache memory and, when an amount of data obtained by said staging reaches a predetermined value, a reactivation is requested to said channel adapter module via said resource manager module; and said channel adapter module which received the reactivation request from said device adapter module side is recoupled to said channel unit and inquires of said cache control module, and in the case where a hit response and a response indicative of a state during the staging are obtained, said channel adapter module executes an input/output control with the channel unit and the staging of said device adapter module in parallel while confirming the amount of data which was staged with reference to a common control information region of said channel adapter module and said device adapter module.

13. A method according to claim 12, wherein when the staging from said device adapter module is finished, said cache control module sets contents of the hash table corresponding to the track data which was staged into a hit enable status.

14. A method according to claim 12, wherein when the input/output control between said channel adapter module and said channel unit is finished, said cache control module sets link information of an LRU control into contents of an LRU table corresponding to the track data which was inputted and outputted.

15. A method according to claim 14, wherein when the link information of the LRU control is set into said hash table, in the case where another track data in a write hit status is swept out, said cache control module requests said device adapter module to write said swept-out data into said device via said resource manager module.

16. A method according to claim 12, wherein said device adapter module, said cache control module, and said resource manager module are connected to a common memory through a bus, said common memory is divided into a main storage and a cache memory, and said exclusive-use allocation information region of said channel adapter module, said exclusive-use allocation information region of said device adapter module, said common control information region of said channel adapter module and said device adapter module, and said cache memory are stored in said main storage.

17. A method according to claim 16, wherein said cache memory is constructed by a non-volatile memory and a volatile memory, said non-volatile memory is used to store the track data in which a write hit occurred, and said volatile memory is used to store the track data in which a read hit occurred.

18. A method according to claim 12, wherein a data transfer speed between said device adapter module and said device is sufficiently higher than a data transfer speed between said channel unit and said channel adapter module.

19. A method according to claim 18, wherein said device is a disk array unit.

* * * * *